US012803261B2

(12) United States Patent
Coenegracht et al.

(10) Patent No.: US 12,803,261 B2
(45) Date of Patent: Nov. 17, 2026

(54) SEALANT ACTUATOR WITH PRESSURIZATION LIMIT

(71) Applicant: CommScope Technologies LLC, Hickory, NC (US)

(72) Inventors: Philippe Coenegracht, Hasselt (BE); Matthew Campsteyn, Hoeselt (BE); Samory De Zitter, Mechelen (BE); Ward Declercq, Kontich (BE); Olivier C. Roche, Schaerbeek (BE)

(73) Assignee: CommScope Technologies LLC, Claremont, NC (US)

( * ) Notice: Subject to any disclaimer, the term of this patent is extended or adjusted under 35 U.S.C. 154(b) by 215 days.

(21) Appl. No.: 18/725,288

(22) PCT Filed: Dec. 30, 2022

(86) PCT No.: PCT/US2022/082661
§ 371 (c)(1),
(2) Date: Jun. 28, 2024

(87) PCT Pub. No.: WO2023/130092
PCT Pub. Date: Jul. 6, 2023

(65) Prior Publication Data

US 2025/0087984 A1 Mar. 13, 2025

Related U.S. Application Data

(60) Provisional application No. 63/435,710, filed on Dec. 28, 2022, provisional application No. 63/401,960, filed on Aug. 29, 2022, provisional application No. 63/323,970, filed on Mar. 25, 2022, provisional application No. 63/294,997, filed on Dec. 30, 2021.

(51) Int. Cl.
*H02G 15/013* (2006.01)
*H02G 3/22* (2006.01)

(52) U.S. Cl.
CPC ............. *H02G 15/013* (2013.01); *H02G 3/22* (2013.01)

(58) Field of Classification Search
CPC . H02G 15/013; G02B 6/44775; G02B 6/4444
See application file for complete search history.

(56) References Cited

U.S. PATENT DOCUMENTS 9,753,237 B2 * 9/2017 Coenegracht .......... H02G 3/088
10,996,414 B1 5/2021 Kimbrell et al.
(Continued)

FOREIGN PATENT DOCUMENTS

EP 0 442 941 B1 1/1995
EP 0 587 616 B1 7/1996
(Continued)

OTHER PUBLICATIONS

International Search Report and Written Opinion for Application No. PCT/US2022/082661 mailed May 8, 2023.
(Continued)

*Primary Examiner* — Sung H Pak
(74) *Attorney, Agent, or Firm* — Merchant & Gould P.C.

(57) ABSTRACT

The present disclosure relates to a cable sealing unit having an actuator for applying spring pressure to a sealant of the cable sealing unit. The actuator is adapted to prevent over compression of the sealant.

29 Claims, 36 Drawing Sheets

(56) References Cited

U.S. PATENT DOCUMENTS

| | | | | |
|---|---|---|---|---|
| 2009/0058018 | A1* | 3/2009 | Mullaney ............. | H02G 15/113 277/625 |
| 2015/0380919 | A1 | 12/2015 | Aznag et al. | |
| 2017/0329095 | A1 | 11/2017 | Coenegracht | |
| 2020/0249407 | A1 | 8/2020 | Aznag et al. | |
| 2020/0389007 | A1 | 12/2020 | Coenegracht et al. | |
| 2021/0141185 | A1 | 5/2021 | Geens et al. | |

FOREIGN PATENT DOCUMENTS

| | | | |
|---|---|---|---|
| EP | 3 480 636 | A1 | 5/2019 |
| WO | 2014/005916 | A2 | 1/2014 |
| WO | 2014/005917 | A2 | 1/2014 |
| WO | 2014/005919 | A2 | 1/2014 |
| WO | 2014/095462 | A1 | 6/2014 |
| WO | 2014/095660 | A1 | 6/2014 |

OTHER PUBLICATIONS

Extended European Search Report for Application No. 22917618.5 mailed Nov. 14, 2025.

* cited by examiner

SEALANT ACTUATOR WITH PRESSURIZATION LIMIT

CROSS-REFERENCE TO RELATED APPLICATION

This application is a National Stage Application of PCT/US2022/082661, filed on Dec. 30, 2022, which claims the benefit of and priority to U.S. Patent Application Ser. No. 63/294,997, filed on Dec. 30, 2021, and claims the benefit of U.S. Patent Application No. 63/323,970 filed on Mar. 25, 2022, and claims the benefit of U.S. Patent Application No. 63/401,960 filed on Aug. 29, 2022, and claims the benefit of U.S. Patent Application No. 63/435,710 filed on Dec. 28, 2022 the disclosures of which are hereby incorporated by reference in their entireties. To the extent appropriate, a claim of priority is made to each of the above disclosed applications.

TECHNICAL FIELD

The present disclosure relates generally to telecommunications equipment. More particularly, the present disclosure relates to sealed enclosures used in telecommunications systems.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures.

Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by European patent Nos. EP 0442941B1 and EP 0587616B1 as well as PCT International Publication Nos. WO 2014/005919; WO 2014/005917: WO 2014/005916; and WO 2014/095462.

SUMMARY

One aspect of the present disclosure relates to a cable sealing unit having an actuator for applying spring pressure to a sealant of the cable sealing unit. The actuator includes a ratchet arrangement adapted to slip once a predetermined level of spring compression has been achieved to prevent over compression of the sealant.

Another aspect of the present disclosure relates to an enclosure including a housing defining an opening into an interior of the housing. The enclosure also includes a cable sealing unit that mounts within the opening for sealing about one or more cables desired to be routed into the interior of the housing through the opening. The cable sealing unit includes an actuator shaft that includes exterior threads. The actuator shaft defines a shaft axis that extends through the opening into the interior of the housing when the cable sealing unit is mounted within the opening. The cable sealing unit also includes inner and outer sealant pressurization members and sealant adapted to be pressurized between the inner and outer pressurization members. The cable sealing unit further includes a linear drive component mounted on the actuator shaft. The linear drive component includes a drive nut including interior threads that mate with the exterior threads of the actuator shaft. Rotation of the linear drive component in a first rotational direction about the actuator shaft drives the linear drive component axially in a sealant pressurization direction along the shaft axis, and rotation of the linear drive component in a second rotational direction about the actuator shaft drives the linear drive component axially in a sealant de-pressurization direction along the shaft axis. The sealant is pressurized between the inner and outer sealant pressurization members when the linear drive component is driven in the sealant pressurization direction along the shaft axis, and the sealant between the inner and outer sealant pressurization members is de-pressurized when the linear drive component is driven in the sealant de-pressurization direction along the shaft axis. The cable sealing unit additionally includes a handle mounted to be axially carried with the linear drive component as the linear drive component moves axially along the shaft axis, and a ratchet arrangement defined between the handle and the linear drive component. The ratchet arrangement is operable in a first torque-transfer mode and a second torque-transfer mode. The ratchet arrangement is configured to allow the handle to drive the linear drive component in the first and second rotational directions relative to the actuator shaft when in the first torque-transfer mode, and the ratchet arrangement is configured to allow the handle to drive the linear drive component only in second rotational direction and not in the first rotational direction relative to the actuator shaft when in the second torque-transfer mode.

Another aspect of the present disclosure relates to a handle arrangement for use in applying torque to pressurize sealant for sealing a cable-pass-through location of an enclosure. The handle arrangement includes a first handle portion including an axially inner end for transferring torque to an arrangement for pressurizing the sealant. The first handle portion also includes an axially outer end defining a first torque-transfer feature. The handle also includes a second handle portion including a second torque-transfer feature that mates in torque-transmitting relation with respect to the first torque-transfer feature. The second handle portion is detachably secured to the first handle portion by a threaded fastener that threadingly engages the first handle portion and that extends axially through the second handle portion. The second handle portion can be detached from the first handle portion by unthreading the threaded fastener from the first handle portion.

Another aspect of the present disclosure relates to an enclosure including a dome including a dome body having a unitary, one-piece molded plastic construction that extends between an open end and a closed end. The enclosure also includes a cable sealing unit that mounts within the open end of the dome body. The cable sealing unit includes: a) inner and outer sealant pressurization members: b) sealant adapted to be pressurized between the inner and outer pressurization members for providing cable sealing and also for providing radial sealing with an interior surface of the dome body; c) an actuator for moving at least one of the first and second pressurization members to pressurize the sealant; and e) a base frame arrangement for retaining the cable sealing unit in the dome, the base frame arrangement including a dome seating arrangement including a plurality of dome seat locations for supporting the open end of the dome body at intermittent locations about a perimeter of the dome body.

A further aspect of the present disclosure relates to an enclosure including a housing defining an opening into an interior of the housing. The enclosure also includes a cable sealing unit that mounts within the opening for sealing about one or more cables desired to be routed into the interior of the housing through the opening. The cable sealing unit includes: a) an actuator shaft that includes exterior threads, the actuator shaft defining a shaft axis that extends through the opening into the interior of the housing when the cable sealing unit is mounted within the opening: b) inner and outer sealant pressurization members: c) sealant adapted to be pressurized between the inner and outer pressurization members: d) a linear drive component mounted on the actuator shaft, the linear drive component including a drive nut including interior threads that mate with the exterior threads of the actuator shaft, wherein rotation of the linear drive component in a first rotational direction about the actuator shaft drives the linear drive component axially in a sealant pressurization direction along the shaft axis, and wherein rotation of the linear drive component in a second rotational direction about the actuator shaft drives the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis: e) a rotational drive component mounted to be axially carried with the linear drive component as the linear drive component moves axially along the shaft axis; and f) a ratchet arrangement defined between the rotational drive component and the linear drive component, the ratchet arrangement being operable in a first torque-transfer mode and a second torque-transfer mode, the ratchet arrangement being configured to allow the rotational drive component to drive the linear drive component in the first and second rotational directions relative to the actuator shaft when in the first torque-transfer mode; and the ratchet arrangement being configured to allow the rotational drive component to drive the linear drive component only in second rotational direction and not in the first rotational direction relative to the actuator shaft when in the second torque-transfer mode.

Still another aspect of the present disclosure relates to an enclosure including a housing defining an opening into an interior of the housing. The enclosure also includes a cable sealing unit that mounts within the opening for sealing about one or more cables desired to be routed into the interior of the housing through the opening, The cable sealing unit includes: a) an actuator shaft that includes exterior threads, the actuator shaft defining a shaft axis that extends through the opening into the interior of the housing when the cable sealing unit is mounted within the opening: b) inner and outer sealant pressurization frames; and c) a sealing module that mounts at a mounting location between the inner and outer pressurization frames, the sealing module including a volume of sealant contained between inner and outer sealant containment walls of the sealing module, the sealing module including a latch structure for latching the sealing module within the mounting location, the latch structure having an elongate beam construction that is connected to the inner or outer sealant containment wall by a centrally located connection location located at a mid-region of the elongate beam construction, the elongate beam construction including a pair of resilient cantilever latches that project in opposite directions from the centrally located connection location, the resilient cantilever latches having free end portions including latch surfaces that oppose catch surfaces of the inner or outer pressurization frame to retain the sealing module in the mounting location.

A further aspect of the present disclosure relates to a cable sealing module adapted to be mounted at a mounting location of a sealing unit. The cable sealing module includes a volume of sealant contained between inner and outer sealant containment walls of the sealing module. The sealing module also includes a latch structure for latching the sealing module within the mounting location. The latch structure has an elongate beam construction that is connected to the inner or outer sealant containment wall by a centrally located connection location located at a mid-region of the elongate beam construction. The elongate beam construction includes a pair of resilient cantilever latches that project in opposite directions from the centrally located connection location. The resilient cantilever latches have free end portions including latch surfaces adapted to oppose catch surfaces at the mounting location to retain the sealing module in the mounting location.

A further aspect of the present disclosure relates to an enclosure including a dome including a dome body that extends between an open end and a closed end. The enclosure also includes a cable sealing unit that mounts within the open end of the dome body. The cable sealing unit includes: a) inner and outer sealant pressurization members: b) sealant adapted to be pressurized between the inner and outer pressurization members for providing cable sealing and also for providing sealing with an interior surface of the dome body: d) an actuator for moving at least one of the first and second pressurization members to pressurize the sealant; and e) a base for retaining the cable sealing unit in the dome body, the base including a dome seating arrangement for supporting the open end of the dome body, the base including a fastening arrangement for securing the base to the open end of the dome such that the base is axially fixed relative to the dome body. The inner and outer pressurization members, when in a state in which the sealant is pressurized, are free to move axially relative to the base and the dome body in response to relative pressure changes between the inside and the outside of the enclosure.

Another aspect of the present disclosure relates to an enclosure including a housing defining an opening into an interior of the housing and a cable sealing unit that mounts within the opening for sealing about one or more cables desired to be routed into the interior of the housing through the opening. The cable sealing unit includes: a) an actuator shaft that includes exterior threads, the actuator shaft defining a shaft axis that extends through the opening into the interior of the housing when the cable sealing unit is mounted within the opening: b) inner and outer sealant pressurization members: c) sealant adapted to be pressurized between the inner and outer pressurization members; and d) a drive arrangement including a linear drive component mounted on the actuator shaft, the linear drive component including a drive nut including interior threads that mate with the exterior threads of the actuator shaft, the drive arrangement including a torque input structure for allowing torque to be applied to the linear drive component for rotating the linear drive component about the actuator shaft, the drive arrangement being operable in a first state in which rotation of the torque input structure in a first rotational direction about the shaft axis drives the linear drive component axially in a sealant pressurization direction along the shaft axis and rotation of the torque input structure in a second rotational direction about the shaft axis drives the linear drive component axially in a sealant de-pressurization direction along the shaft axis, the drive arrangement also being operable in a second state in which rotation of the torque input structure in the first rotational direction about the shaft axis does not drive the linear drive component axially in a sealant pressurization direction along the shaft axis and rotation of the torque input structure in the second rotational direction about the shaft axis does drive the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

DETAILED DESCRIPTION

Aspects of the present disclosure relate to an actuator system for pressurizing sealant used to seal an enclosure opening through which one or more cables can be routed. The actuator system can include pressurization members (e.g., walls, plates, parts, components, elements, frames, structures, etc.) between which sealant can be axially contained and pressurized. In certain examples, the each of the pressurization members can include one or more parts and can be referred to as pressurization structures. In certain examples, a pressurization member can include a frame structure and sealant containment walls coupled to the frame structure. The sealant containment walls can be integrated as part of sealing modules and can function to provide containment of sealant of the sealing modules. The actuator system can include a spring for biasing the pressurization members together to pressurize the sealant. The actuator system can include actuator arrangements for compressing the spring to bias the pressurization members together, and a pressure limiting arrangement for limiting the amount of compression of the spring to prevent over pressurization of the sealant. In one example, the pressure limiting arrangement includes a ratchet arrangement configured to slip once the spring has been compressed to a predetermined level to prevent further compression of the spring.

Figure 1:
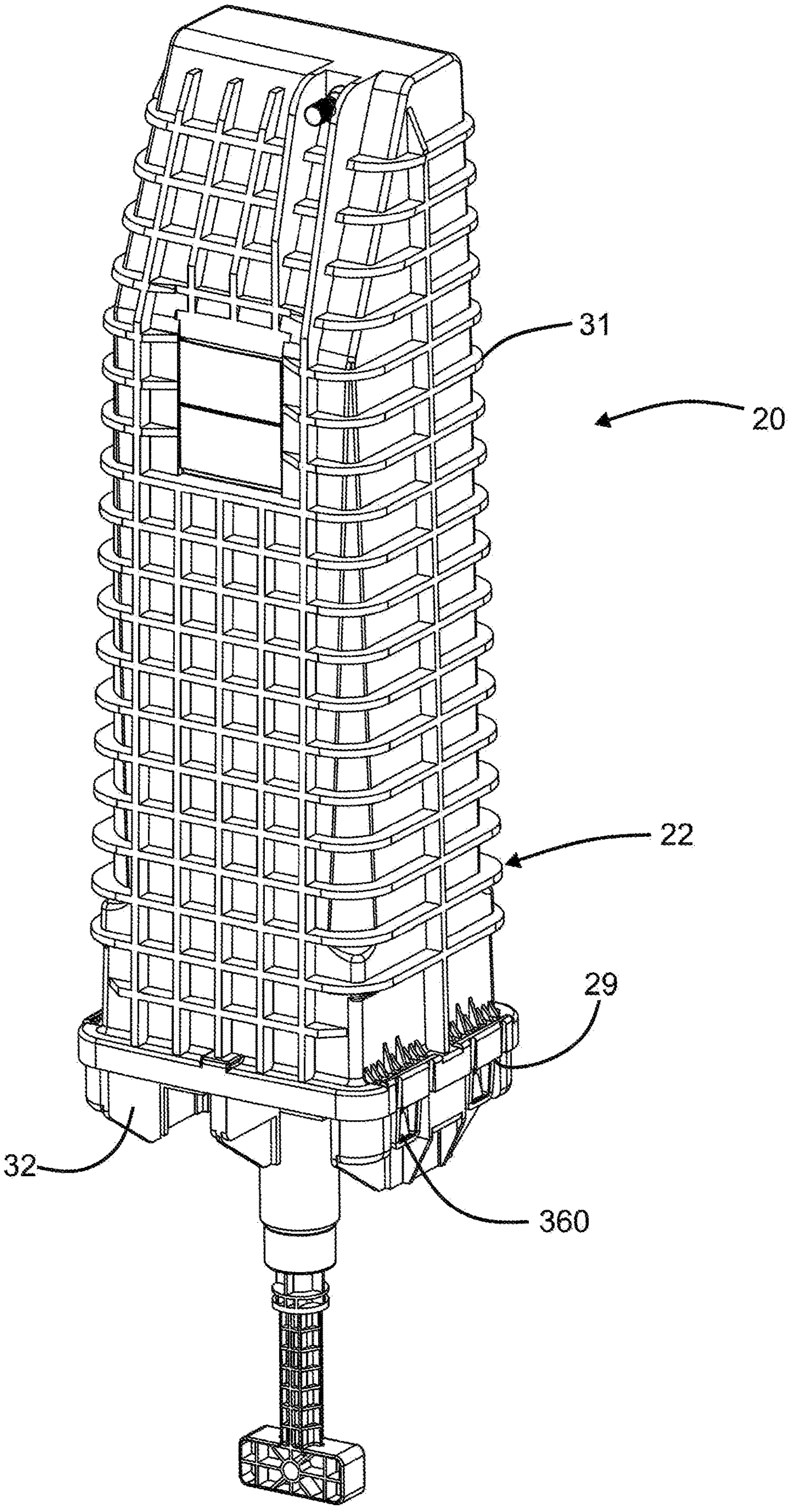
FIG. 1 depicts an enclosure (e.g., a telecommunications enclosure) in accordance with the principles of the present disclosure.
Figure 2:
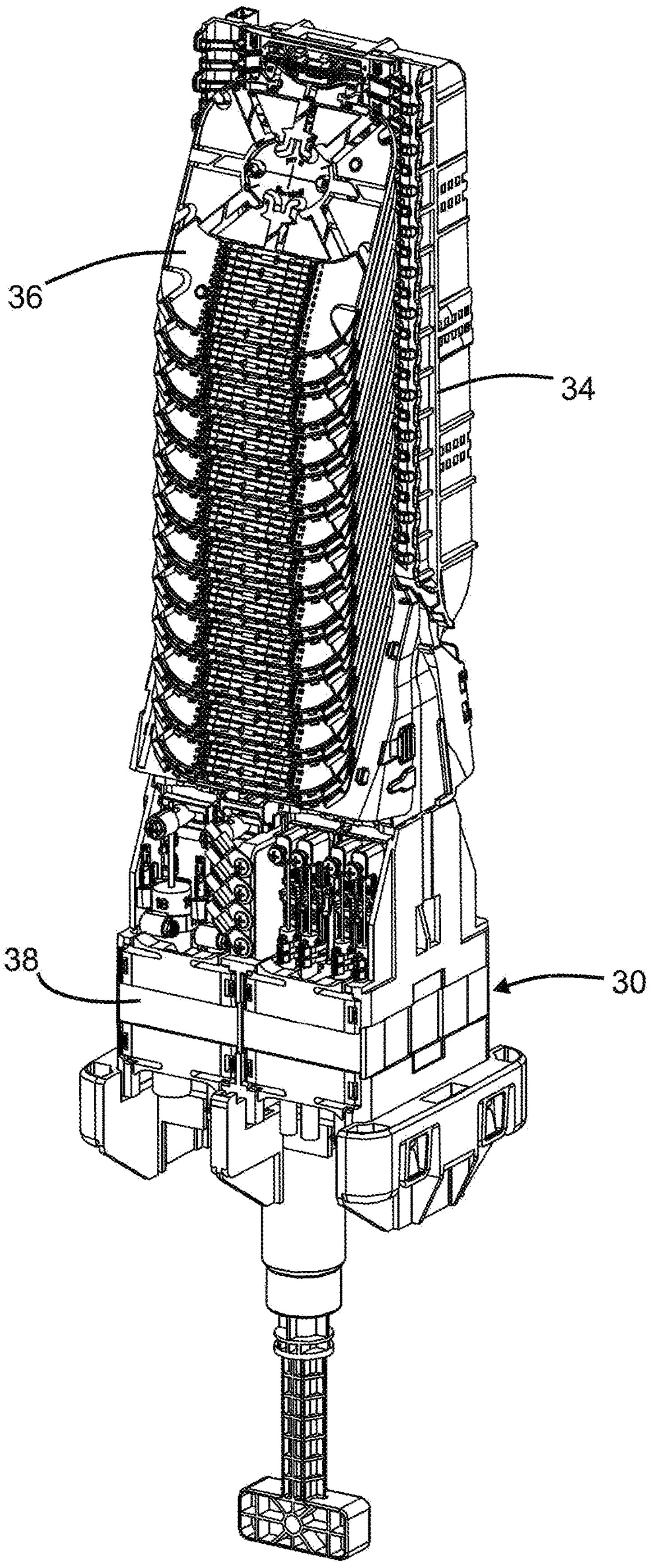
FIG. 2 depicts the enclosure of FIG. 1 with a cover (e.g., a dome-style cover) of the enclosure removed.

FIG. 1 shows an enclosure 20 (e.g., a telecommunications enclosure) in accordance with the principles of the present disclosure. The enclosure 20 includes a housing 22 having an opening 26 into an interior 27 of the housing 22. The enclosure includes a cable sealing unit 30 (see FIGS. 2, 4 and 6) that mounts within the opening 26 for sealing about one or more cables desired to be routed into the interior 27 of the housing 22 through the opening 26. The cable sealing unit 30 can also provide peripheral sealing with the housing 22 about a perimeter of the opening 26. In the example shown, the housing 22 includes a cover 31 (e.g., a dome style cover) defining the opening 26 at one end 29, and a base 32 that mounts to the end 29 of the cover 31. In certain examples, the base 32 can be detachably secured to the cover 31 by a mechanical fastening arrangement that can include latches, clamps, fasteners, or the like. The cable sealing unit 30 can be retained in the opening 26 by the base 32. A frame 34 (see FIG. 2) supporting fiber optic components 36 (e.g., optical splice trays, optical splitter trays, etc.) can be carried with the sealing unit 30. In one example, cable sealing unit 30 includes sealant 38 (e.g., a sealant arrangement, a volume of sealant that may be formed by one or more sections or blocks of sealant (e.g., sealing modules), etc.) defining a plurality of cable pass-through locations (e.g., ports, interfaces between adjacent sections of sealant, etc.). When pressurized, the sealant 38 is configured for providing seals about structures (e.g., cables, plugs, etc.) routed though the pass-through locations of the sealant 38 and is also configured for providing a peripheral seal between the housing 22 (e.g., the interior of the cover 31) and the cable sealing unit 30 about the boundary (e.g., perimeter, profile, etc.) of the opening 26. In a preferred example, the sealing unit 30 is loaded into the cover (e.g., a dome-style cover) through an open end of the cover 31 and is retained in the cover 31 by the base 32 which is secured (e.g., latched, fastened, clamped, etc.) to the open end of the cover 31. In one example, the sealant 38 of the sealing unit 30 does not provide radial/peripheral sealing with respect to the base 32, but instead only provides radial/peripheral sealing with respect to the within the interior of the cover 31. In certain examples, the sealant 38 does not make sealing contact with the base 32 when the base 32 is secured to the cover 31 and functions to retain the sealing portion of the sealing unit 30 within the cover 31.

The cable sealing unit 30 includes an actuator arrangement for pressurizing the sealant 38 within the opening 26 once cables have been routed through the sealant during installation of the enclosure 20 in the field. In one example, referring to FIGS. 4-7, the actuator arrangement includes an actuator shaft 40, inner and outer pressurization members 42, 44 between which the sealant 38 is pressurized, a linear drive component 46, a handle 48, a spring 49 and a ratchet arrangement 50 for transferring torque from the handle to the drive component 46 to compress the spring 49 and apply spring load to the pressurization members 42, 44 for pressurizing the sealant 38.

Figure 4:
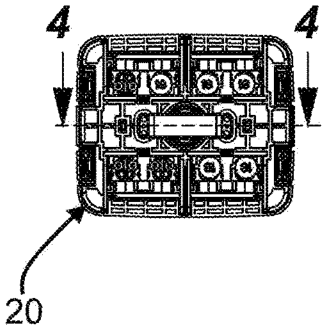
FIG. 4 is a cross-sectional view taken along section line 4-4 of FIG. 3.
Figure 3:
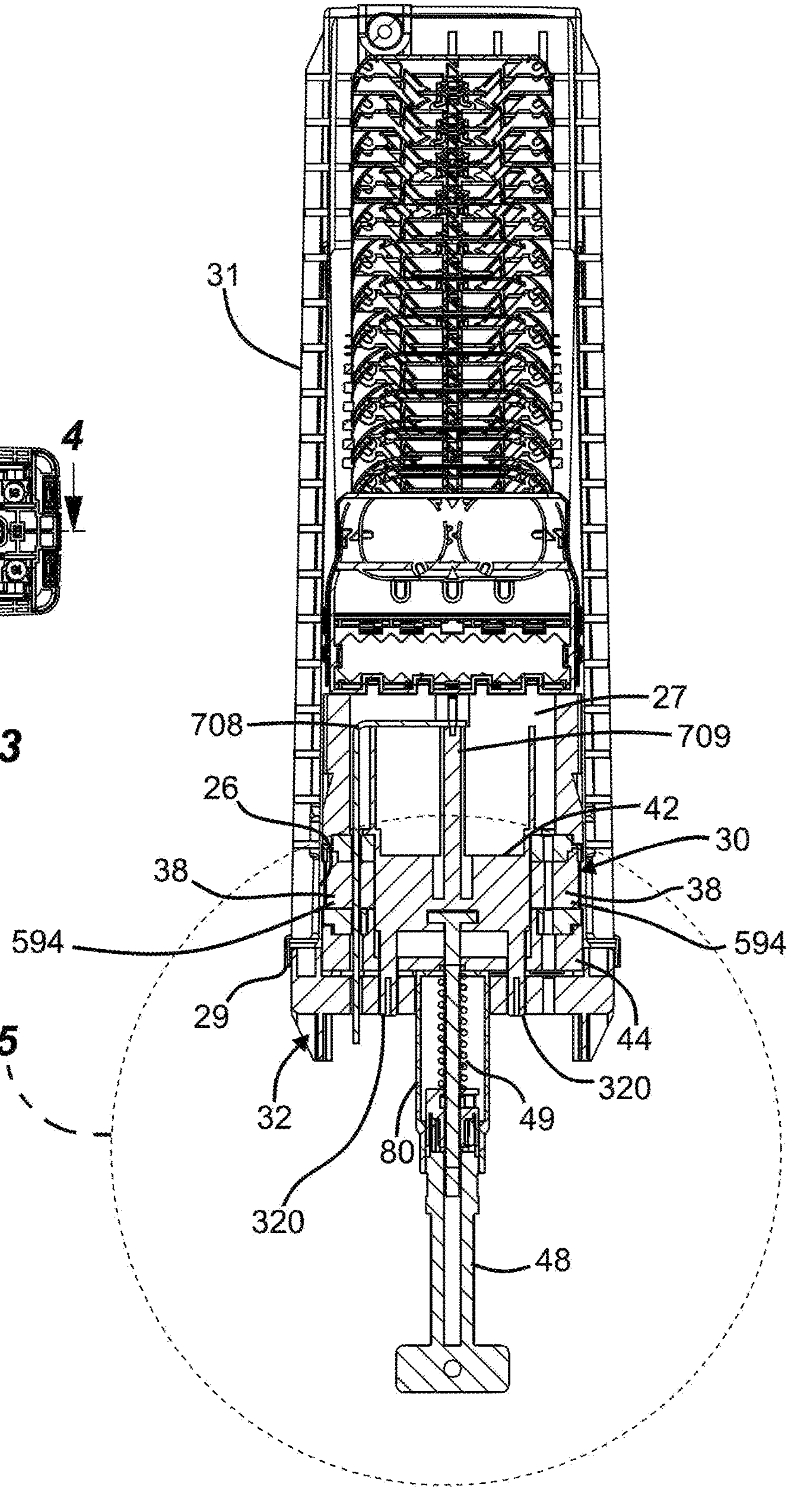
FIG. 3 is a bottom view of the enclosure of FIG. 1.
Figure 5:
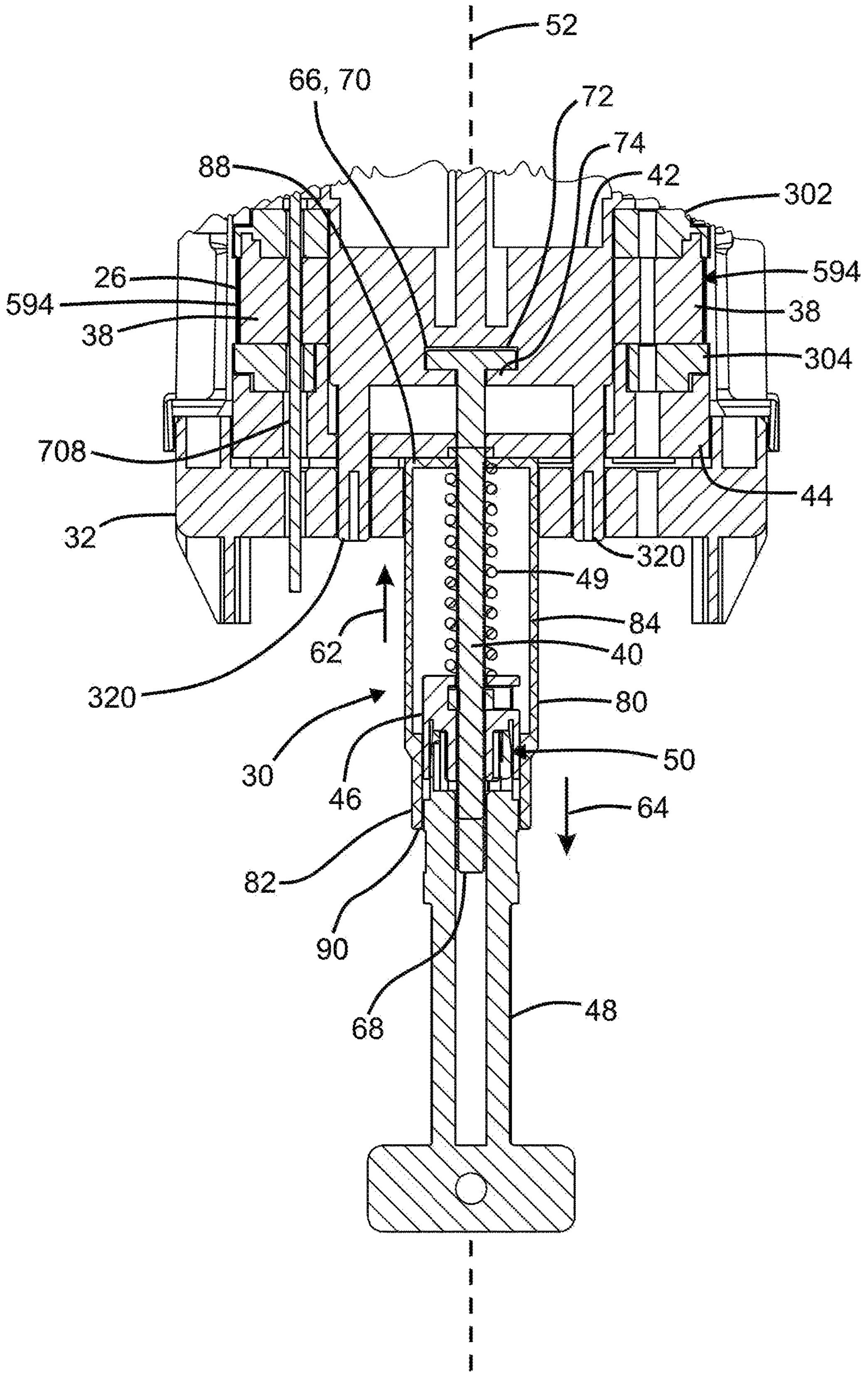
FIG. 5 is an enlarged view of a portion of FIG. 4.
Figure 6:
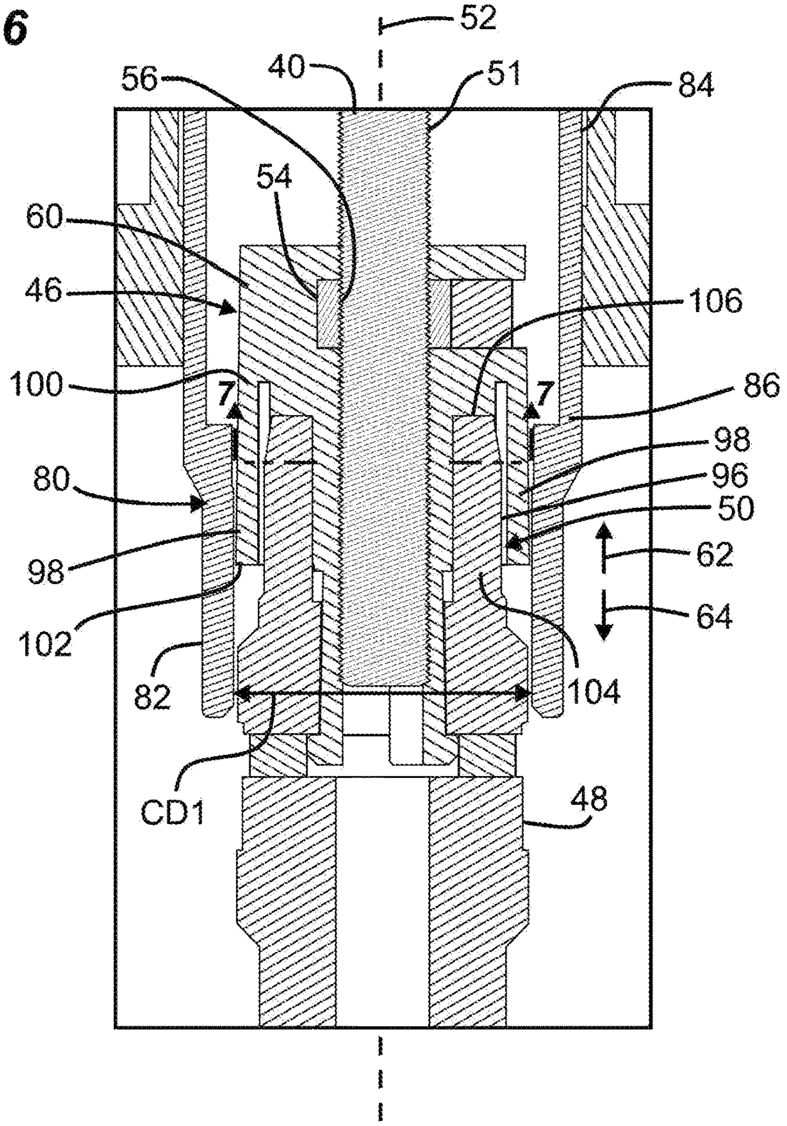
FIG. 6 is an enlarged view of a ratchet arrangement of an actuator for pressurizing sealing of a cable sealing unit of the enclosure of FIG. 1.

Referring to FIGS. 4-6, the actuator shaft 40 includes exterior threads 51 and defines a shaft axis 52 that extends through the opening 26 into the interior 27 of the housing 22 when the cable sealing unit 30 is mounted within the opening 26. The linear drive component 46 is mounted on the actuator shaft 40 and includes a drive nut 54 including interior threads 56 that mate with the exterior threads 51 of the actuator shaft 40. In one example, the linear drive component 46 includes a molded plastic body 60 to which the drive nut 54 is secured (e.g., the drive nut 54 can be insert molded within the plastic body 60). In one example, the drive nut 54 can include a metal construction. The drive nut 54 is secured to the plastic body 60 such that the drive nut 54 rotates with the plastic body 60 as the plastic body is rotationally driven about the shaft axis 52.

The linear drive component 46 is mounted on the actuator shaft 42 such that rotation of the linear drive component 46 in a first rotational direction about the actuator shaft 42 drives the linear drive component 46 axially in a sealant pressurization direction 62 along the shaft axis 52, and rotation of the linear drive component 46 in a second rotational direction about the actuator shaft drives the linear drive component axially in a sealant de-pressurization direction 64 along the shaft axis 52. The axial movement is the result of the interaction of the threads 56 of the drive nut 54 and the threads 51 of the actuator shaft 42. The first and second rotational direction are opposite from one another (e.g., clockwise verses counterclockwise). The sealant is pressurized between the inner and outer sealant pressurization members 42, 44 when the linear drive component 46 is driven in the sealant pressurization direction 62 along the shaft axis 52, and the sealant 38 is de-pressurized when the linear drive component 46 is driven in the sealant de-pressurization direction 64 along the shaft axis 52. As used herein an axial direction or orientation is in an orientation along the shaft axis 52.

The handle 48 is mounted to be axially carried with the linear drive component 46 as the linear drive component 46 moves axially along the actuator shaft 40. The ratchet arrangement 50 is defined between the handle 48 and the linear drive component 46 and is adapted to transfer torque from the handle 48 to the linear drive component 46 such that the linear drive component 46 can be rotated by manually turning the handle 48 about the shaft axis 52. The ratchet arrangement 50 is operable in a first torque-transfer mode and a second torque-transfer mode. The ratchet arrangement 50 is configured to allow the handle 48 to drive the linear drive component 46 in the first and second rotational directions relative to the actuator shaft 40 when in the first torque-transfer mode; and is configured to allow the handle 48 to drive the linear drive component 46 only in second rotational direction and not in the first rotational direction relative to the actuator shaft 40 when in the second torque-transfer mode. The ratchet arrangement 50 transitions from the first torque-transfer mode to the second torque-transfer mode when a predetermined spacing between the first and second pressurization members 42, 44 is reached.

Referring to FIG. 5, the actuator shaft 40 includes an inner end 66 and an outer end 68. The handle 48 is mounted over the outer end 68 of the actuator shaft 40 and projects axially outwardly from the outer end 68 of the actuator shaft 40. The inner end 66 of the actuator shaft 40 is non-rotatably connected to the inner pressurization member 42 such that relative rotation is prevented between the actuator shaft 40 and the inner pressurization member 42 about the shaft axis 52. The inner end 66 is also configured to transfer outward axial load from the shaft 40 to the inner pressurization member 42. In one example, the inner end 66 includes a head 70 that fits within a receptacle 72 defined by the inner pressurization member 42. The head 70 can include a non-circular shape that fits within a non-circular shape of the receptacle 72. In one example, the head can include one or more flats (e.g., a rectangular head, a hexagonal head, etc.) that oppose corresponding flats of the receptacle to prevent rotation of the shaft 40 relative to the inner pressurization member 42. The head 70 opposes a shoulder 74 of the receptacle 72 to allow outward axial load to be applied from the shaft 40 to the inner pressurization member 42. The head 70 opposes the shoulder 74 to prevent relative axial movement between the shaft and the inner pressurization member 42 in the axial outward direction when the head 70 is in engagement with the shoulder 74. In this way, outward axial load can be transferred from the head 70 of the shaft 40 to the inner pressurization member 42. The head 70 can be slid laterally into the receptacle 72 or in other examples the inner pressurization member 42 can be molded over the head 70. In one example, the shaft 40 has a metal construction and the inner and outer pressurization structures 42, 44 each have a molded plastic construction.

The actuator shaft 40 extends through the outer pressurization member 44 and relative axial movement is permitted between the actuator shaft 40 and the outer pressurization member 44 to allow the pressurization members 42, 44 to be forced together by the actuator arrangement to pressurize the sealant 38 between the pressurization members 42, 44. The spring 49 is mounted on the actuator shaft 40 axially between the linear drive component 46 and the outer pressurization member 44. The spring 49 is compressed between the outer pressurization member 44 and the linear drive component 46 when the linear drive component 46 is moved in the sealant pressurization direction 62 thereby causing the actuator shaft 40 to be tensioned and the inner and outer pressurization members 42, 44 to be forced axially together such that pressurization loading is applied to the sealant 38 by the inner and outer pressurization members 42, 44. The ratchet arrangement 50 transitions from the first torque-transfer mode to the second torque-transfer mode when the spring 49 reaches a predetermined amount of axial compression (e.g., is compressed to a pre-determined length).

Referring to FIGS. 5 and 6, the cable sealing unit 30 includes a sleeve 80 positioned around the actuator shaft 40, the spring 49, the linear drive component 46 and an inner portion of the handle 48. The sleeve 80 has a first portion 82 (e.g., an axial outer portion) for constraining outward radial movement of the ratchet arrangement 50 such that the ratchet arrangement 50 operates in the first torque-transfer mode and a second portion 84 (e.g., an axial inner portion) for allowing outward radial movement of the ratchet arrangement 50 such that the ratchet arrangement operates in the second torque-transfer mode. The ratchet arrangement 50 is adapted to move axially relative to the sleeve 80 to transition between the first and second torque-transfer modes. Axial movement of the ratchet arrangement 50 with respect to the actuator shaft 40 causes axial movement of the ratchet arrangement 50 relative to the sleeve 80. The first portion 82 of the sleeve 80 has a first interior cross-dimension CD1 and the second portion 84 of the sleeve 80 has a second interior cross-dimension CD2. The first interior cross-dimension CD1 is smaller than the second interior cross-dimension CD2. The sleeve 80 includes an interior radial step 86 where an interior of the sleeve 80 changes from the first cross-dimension CD1 to the second cross-dimension CD2. An inner end 88 of the sleeve 80 is biased against the outer pressurization member 44 by the spring 49, and the handle 48 projects axially outwardly from an outer end 90 of the sleeve 80.

The ratchet arrangement 50 transitions from the first torque-transfer mode to the second torque transfer mode when the ratchet arrangement 50 reaches an axial position relative to the sleeve 80 in which the ratchet arrangement 50 is no longer constrained by the first portion 82 of the sleeve 80 and is permitted to move radially outwardly by radial clearance space provided by the second portion 84 of the sleeve 80. In one example, the axial position is determined by the location of the radial step 86.

Figure 7:
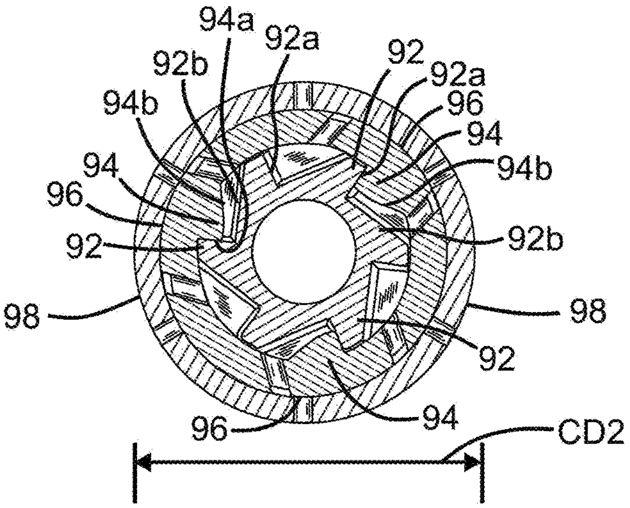
FIG. 7 is a cross-sectional view taken along section line 7-7 of FIG. 6.

Referring to FIG. 7, the ratchet arrangement 50 includes first ratchet teeth 92 carried with the linear drive component 46 and second ratchet teeth 94 carried with the handle 48. The second ratchet teeth 94 are positioned radially outside the first ratchet teeth 92. The second ratchet teeth 94 include resilient ratchet cantilevers 96 that flex to allow the second ratchet teeth 94 to each move between an inward radial position and an outward radial position. The resilient ratchet cantilevers 96 bias the second ratchet teeth 94 toward the inward radial position.

Referring still to FIG. 7, the first ratchet teeth 92 and the second ratchet teeth 94 respectively have locking engagement surfaces 92*a*, 94*a* configured such that when the handle 48 is rotated in the second rotational direction the first and second ratchet teeth 92, 94 engage each other in a manner that does not encourage the second ratchet teeth 94 to ride over the first ratchet teeth 92 regardless of whether the ratchet arrangement 50 is in the first or second torque-transfer mode. Hence, torque for rotating the linear drive component 46 in the second rotational direction is transferrable from handle 48 to the linear drive component 46 through the locking engagement surface 92*a*, 94*a* regardless of whether the ratchet arrangement 50 is in the first or second torque-transfer mode.

The first ratchet teeth 92 and second ratchet teeth 94 also respectively have ramp engagement surfaces 92*b*, 94*b* configured such that when the handle 48 is rotated in the first rotational direction the first and second ratchet teeth 92, 94 engage each other in a manner that encourages the second ratchet teeth 94 to ride over the first ratchet teeth 92 regardless of whether the ratchet arrangement 50 is in the first or second torque-transfer mode. When the handle 48 is rotated in the first rotational direction while the ratchet arrangement is in the first torque-transfer mode radial constraint provided by the first portion 82 of the sleeve 80 prevents the second ratchet teeth 94 from moving from the inward radial position to the outward radial position to ride over the first ratchet teeth 92 such that torque for rotating the linear drive component 46 in the first rotational direction is transferrable from handle 48 to the linear drive component 46 through the ratchet arrangement 50 via engagement between the ramp engagement surfaces 92*b*, 94*b*. When the handle 48 is rotated in the first rotational direction while the ratchet arrangement 50 is in the second torque-transfer mode, radial clearance provided by the second portion 84 of the sleeve 80 allows the second ratchet teeth 94 to move from the inward radial position to the outward radial position to ride over the first ratchet teeth 92 such that sufficient torque for rotating the linear drive component in the first rotational direction is not transferrable from handle 48 to the linear drive component 46 through the ramp engagement surfaces 92*b*, 94*b* of the ratchet arrangement 50.

Referring to FIG. 6, the plastic body 60 of the linear drive component 46 includes constraint cantilevers 98 positioned radially between the ratchet cantilevers 96 and the sleeve 80. The constraint cantilevers 98 extend in an axial outward direction from base ends 100 to free ends 102. The ratchet arrangement 50 changes from the first torque-transfer mode to the second torque-transfer mode when the free ends 102 of the constraint cantilevers 98 move axially inwardly past the radial step 86 of the sleeve 80. In the depicted example, the ratchet cantilevers 96 extend in an axial inward direction from base ends 104 to free ends 106. The locking and ramp surfaces of the second ratchet teeth 94 can be located adjacent the free ends 106 of the ratchet cantilevers 96.

Figure 22:
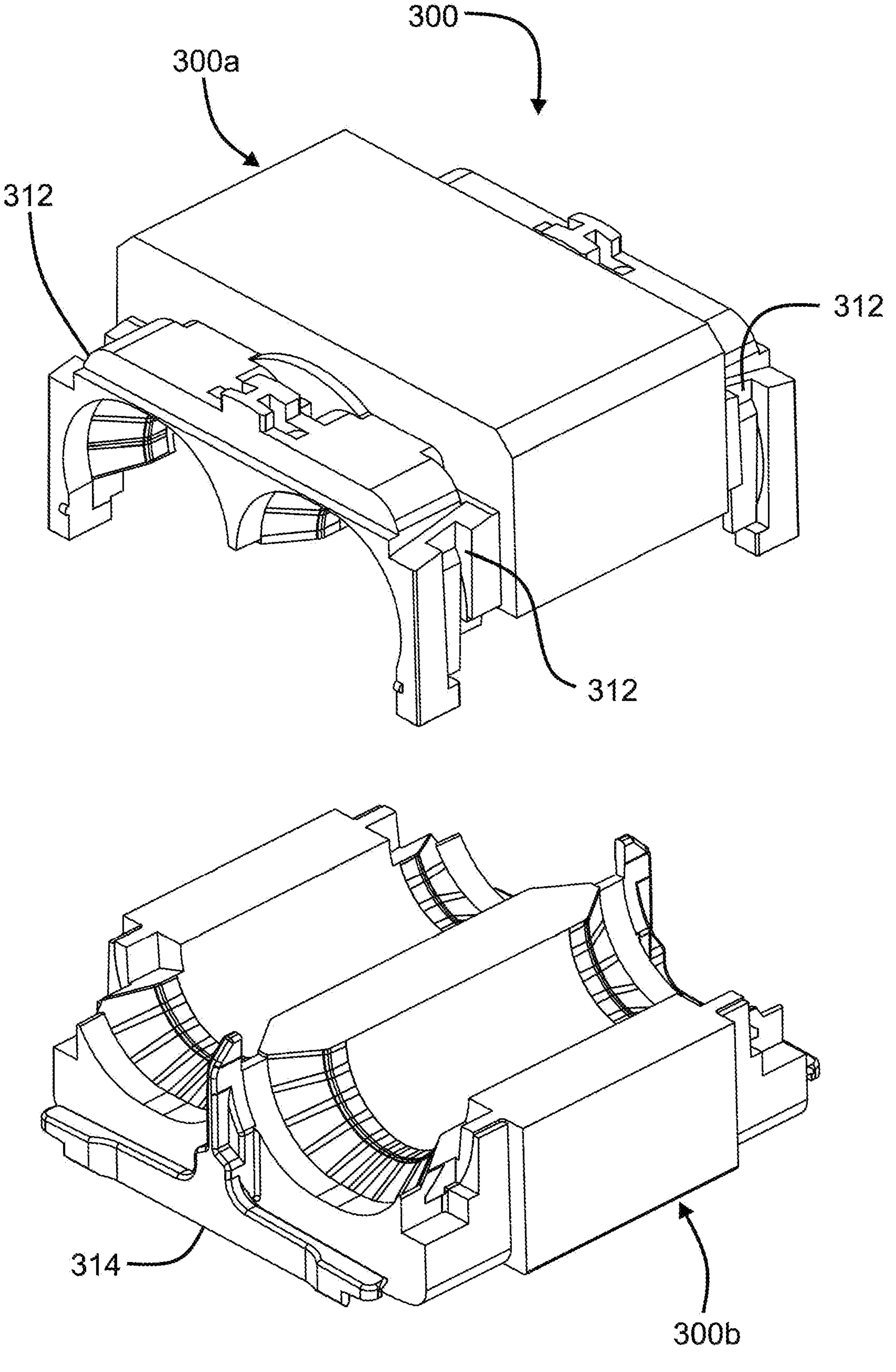
FIG. 22 is an exploded view of an example cable sealing module usable with enclosures in accordance with the principles of the present disclosure.
Figure 23:
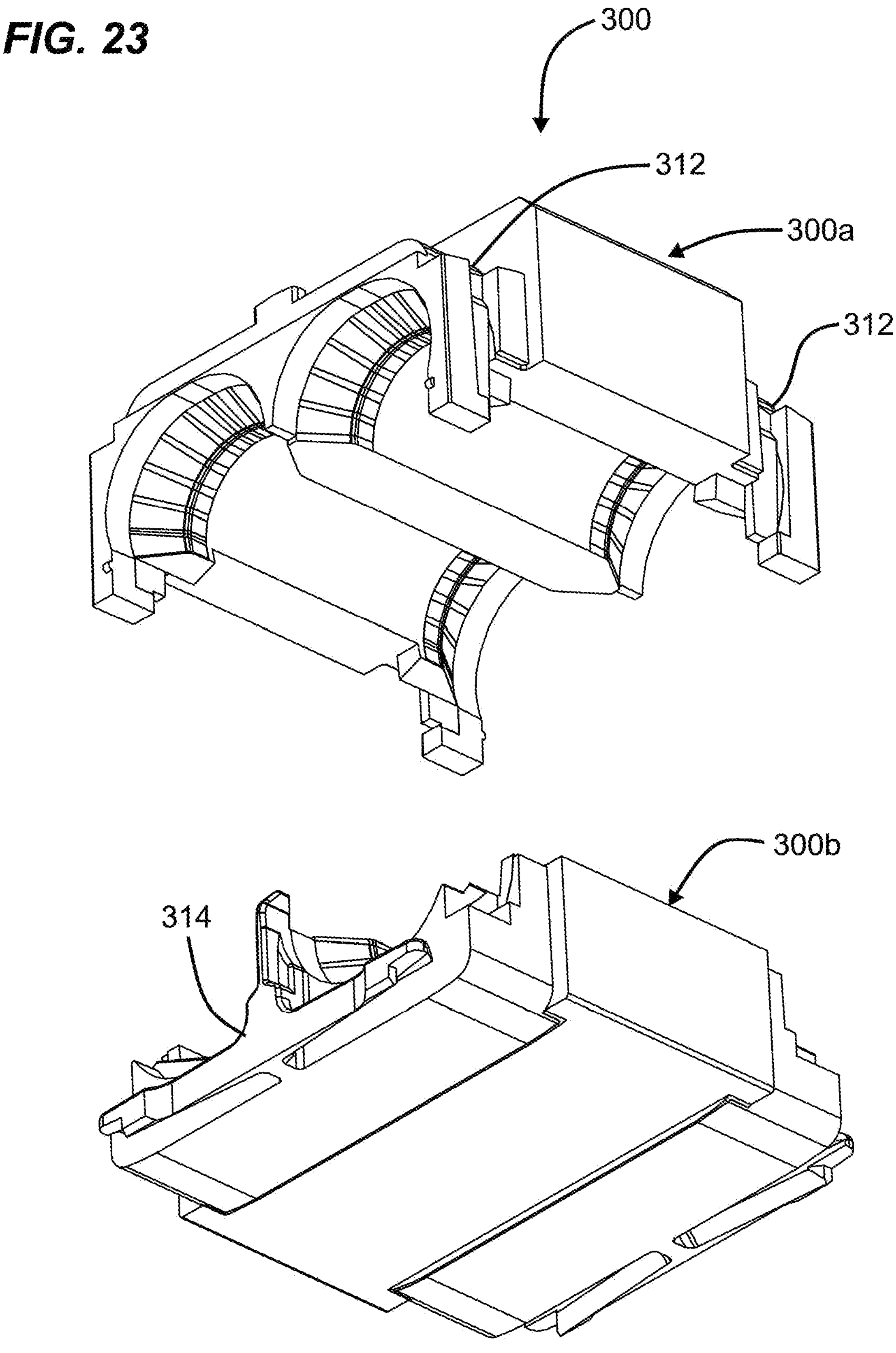
FIG. 23 is another exploded view of the cable sealing module of FIG. 22.
Figure 24:
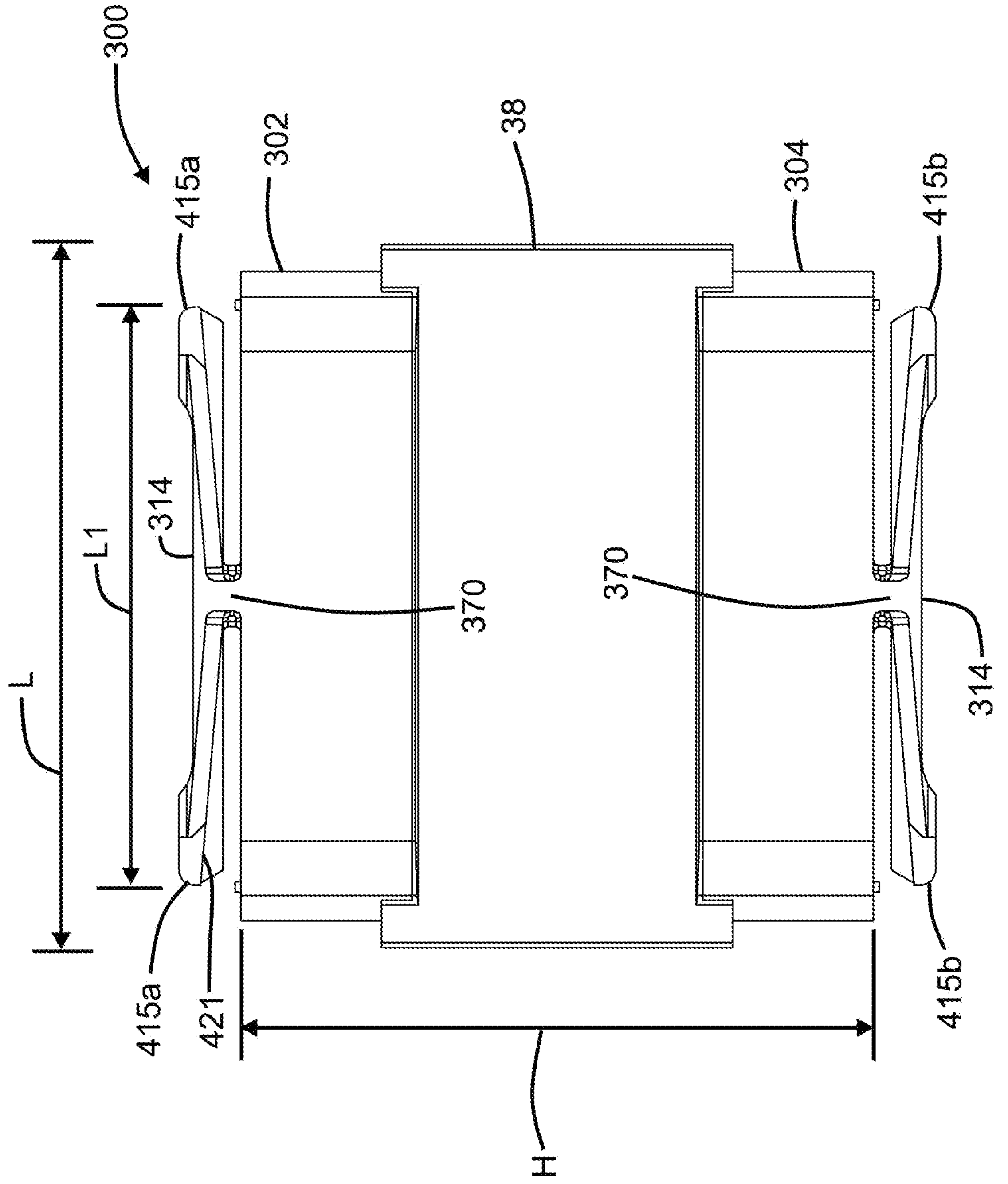
FIG. 24 is a view depicting an exterior lateral side of the cable sealing module of FIGS. 22 and 23.
Figure 25:
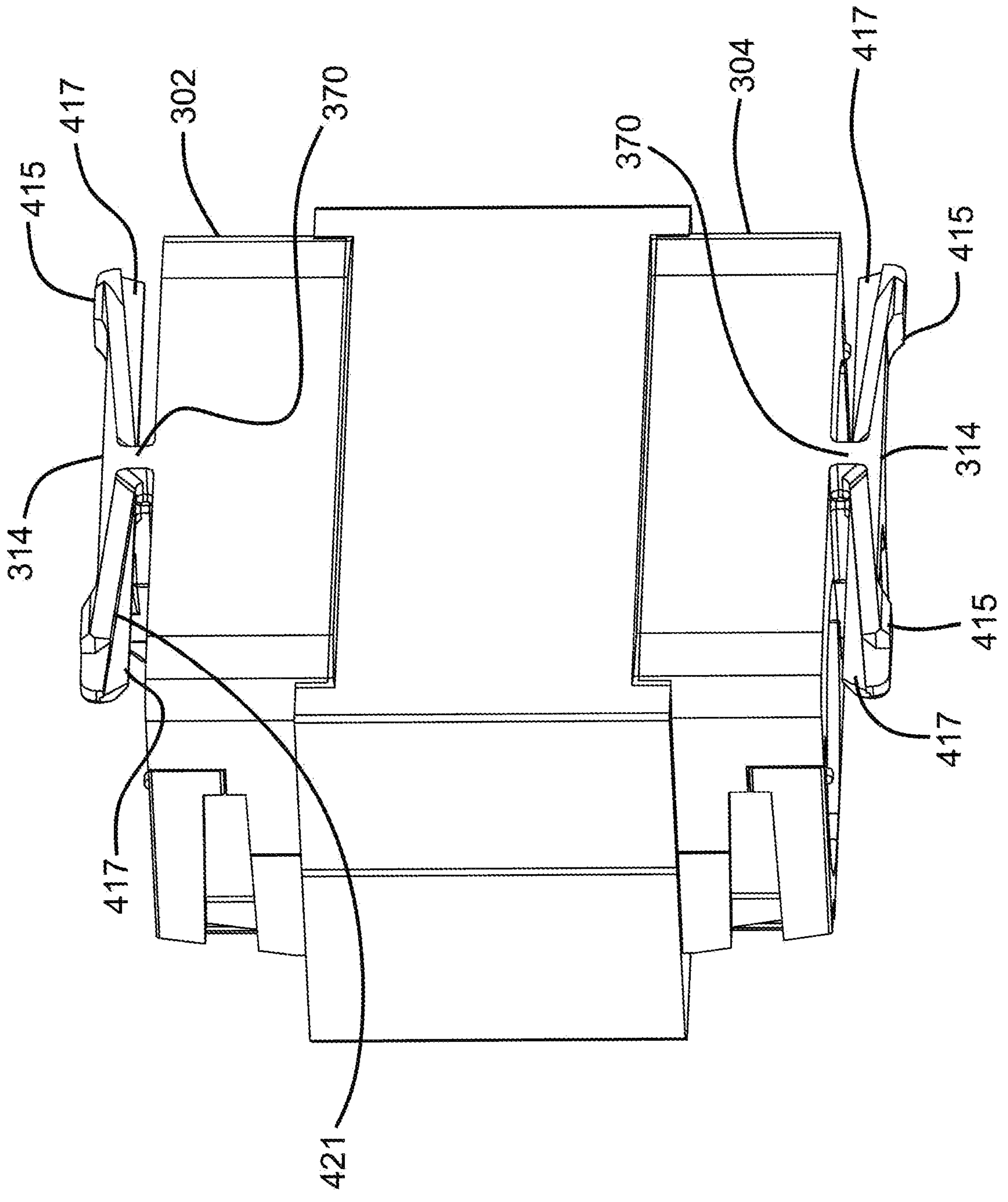
FIG. 25 is another view of the exterior lateral side of the cable sealing module of FIG. 24.
Figure 26:
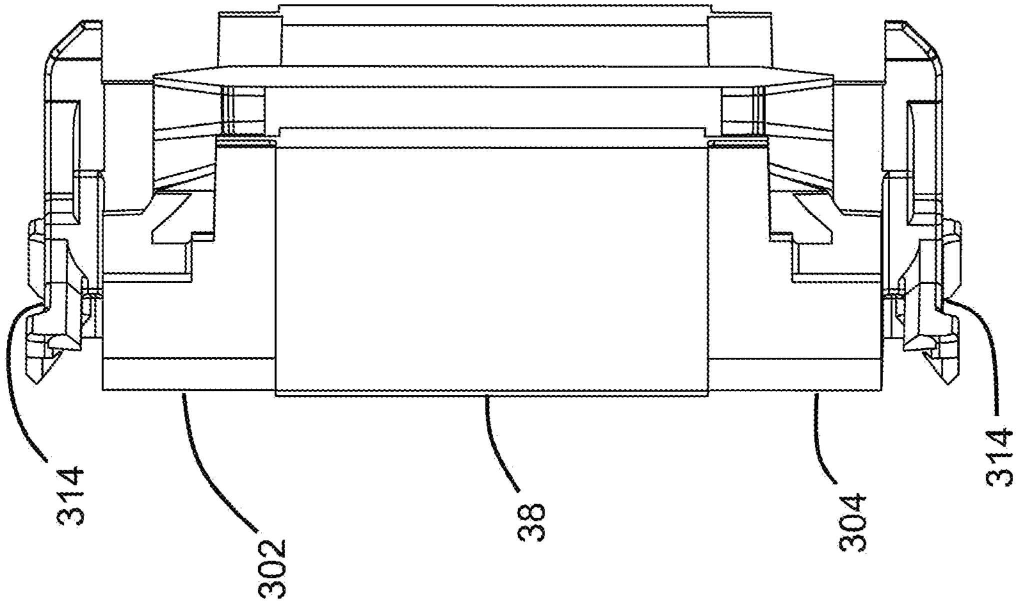
FIG. 26 an interior side of an exterior half of the cable sealing module of FIGS. 22 and 23.

Referring to FIGS. 4, 5 13 and 14, the sealant 38 is provided as part of sealing modules 300 that removably mount between the inner and outer pressurization members 42, 44. The sealing modules 300 each include a volume of sealant 38 positioned axially between inner and outer sealant containment walls 302, 304. The inner pressurization member 42 includes an inner pressurization frame 306 (see FIGS. 5, 14, 15, 17 and 18). The outer pressurization member 44 includes an outer pressurization frame 308 (see FIGS. 5, 14 and 15). The sealing modules 300 mount between the inner and outer pressurization frames 306, 308. When the sealing modules 300 are mounted between the inner and outer pressurization frames 306, 308, the inner sealant containment walls 302 mechanically engage (e.g., interlock, intermate, etc.) with the inner pressurization frame 306 and the outer sealant containment walls 304 mechanically engage with the outer pressurization frame 308 such that axial load is transferable between the pressurization frames 306, 308 and their respective containment walls 302, 304. The inner pressurization member 42 includes the combination of the inner pressurization frame 306 and the inner containment walls 302 while the outer pressurization member 44 includes the combination of the outer pressurization frame 308 and the outer containment walls 304. In the depicted example, mechanical engagement between the containment walls 302, 304 and the pressurization frames 306, 308 is provided by rails 310 that fit within slots 312 when the sealing modules 300 are slid between the inner and outer pressurization frames 306, 308. The inner and outer containment walls 302, 304 include resilient sealing module latch structures 314 that latch with respect to the inner and outer pressurization frames 306, 308 to retain the sealing modules 300 in fully inserted positions between the inner and outer pressurization frames 306, 308. Each of the modules 300 can include two parts **300*a*, 300*b* (see FIGS. 22 and 23) that can be separated to facilitate routing cables through the modules 300** with the cables sealed between opposing sealant portions of the modules after assembly.

The inner pressurization frame 306 couples with the interior frame 34 supporting or forming a tower for mounting fiber management trays for holding excess fiber, optical splices, optical taps, passive optical power splitters, wavelength division multiplexers or other structures. The interior frame 34 also includes cable anchoring locations for anchoring cables (e.g., via straps, clamps, blades, ties or other structures) routed into the interior of the enclosure through the cable sealing unit 30. The interior frame 34 and the inner pressurization frame 306 are configured to move together as a unit in an axial direction relative to the base 32 and the cover 31. Thus, the cables anchored to the interior frame 34 are adapted to move axially with the interior frame 34 and the inner pressurization frame 306 relative to the base 32 and the cover 31.

Figure 17:
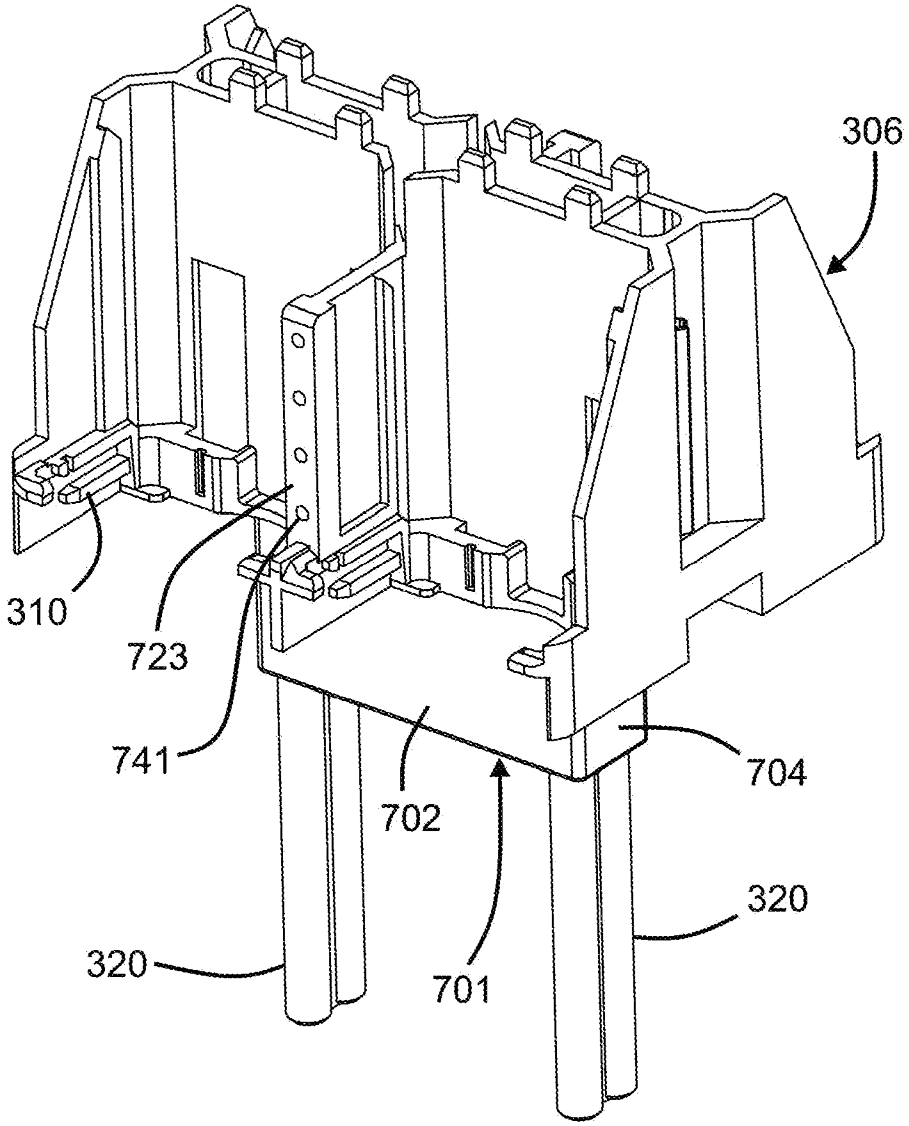
FIG. 17 is a perspective view of the inner pressurization member of the sealing unit of the enclosure of FIG. 1.
Figure 18:
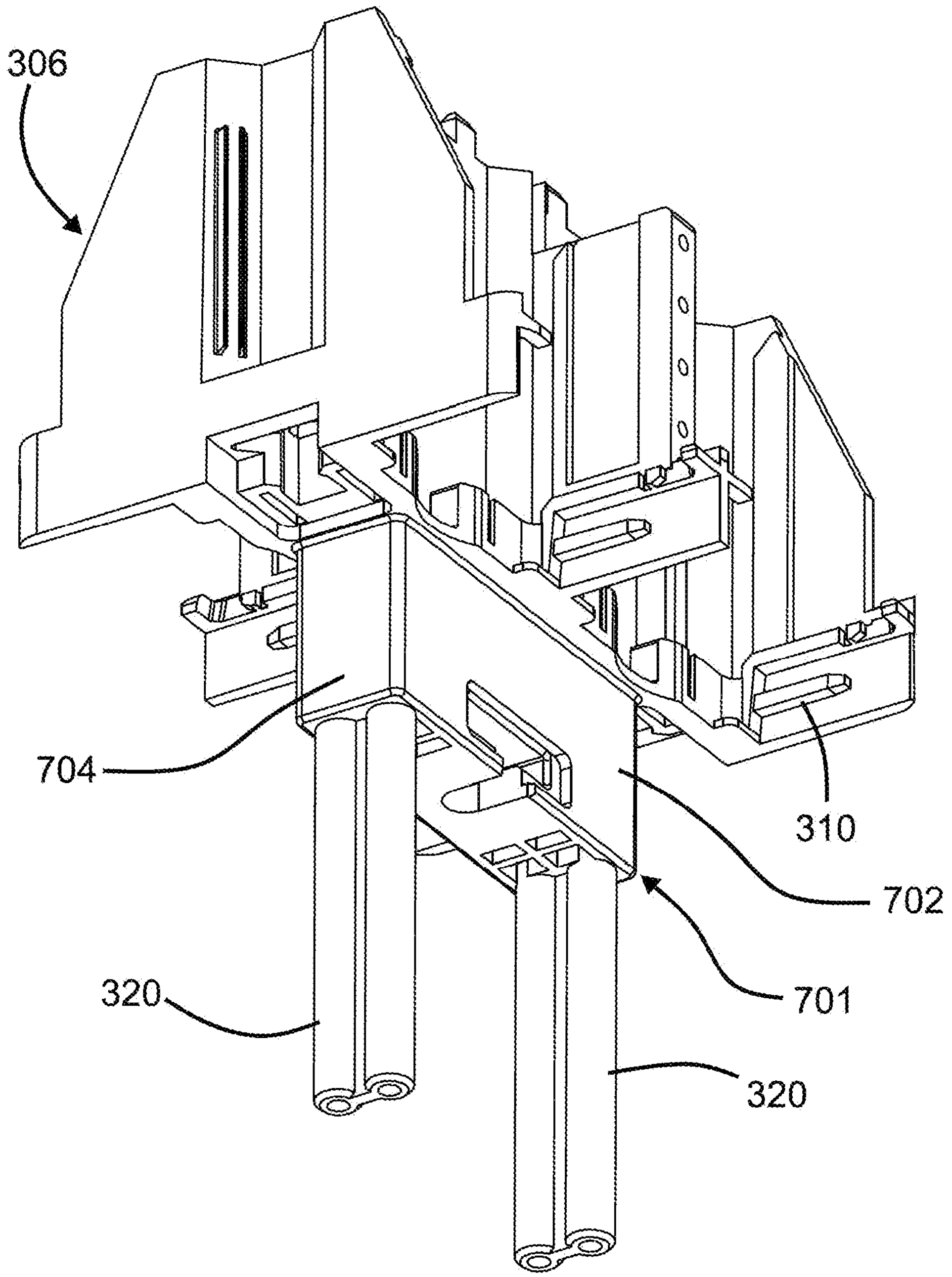
FIG. 18 is another perspective view of the inner pressurization member of FIG. 17.
Figure 19:
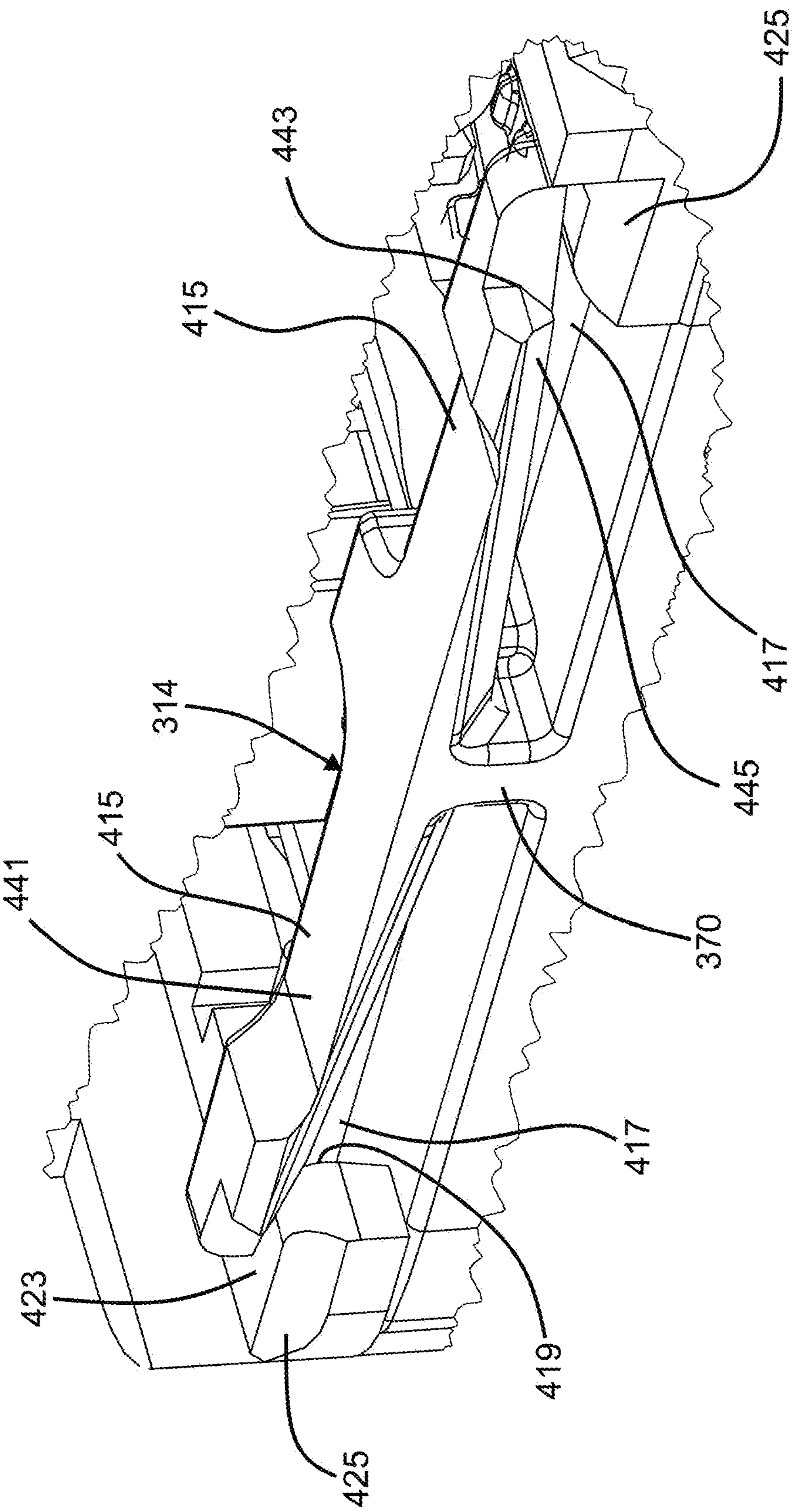
FIG. 19 is a perspective view showing a sealing module latch for securing a cable sealing module of the enclosure of FIG. 1 between the inner and outer pressurization members of the cable sealing unit of the enclosure.
Figure 20:
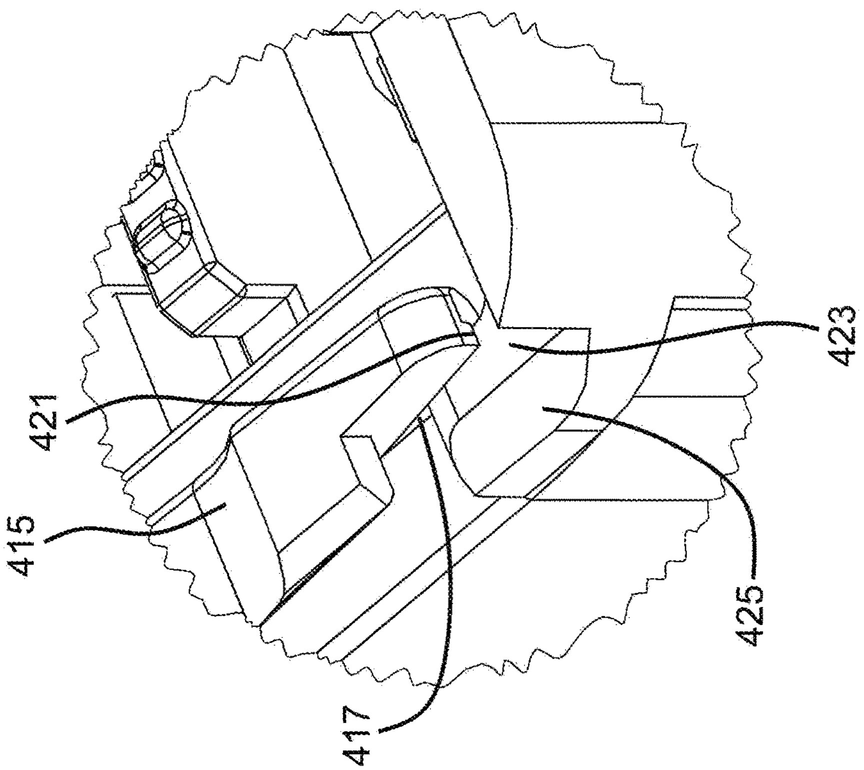
FIG. 20 is an enlarged view showing a latching portion of one of the sealing module latches in a latched state.
Figure 21:
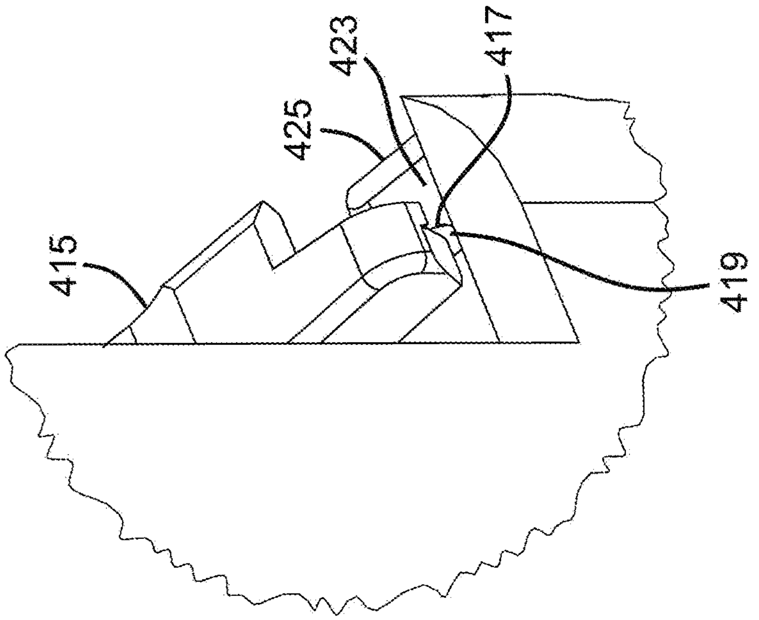
FIG. 21 is another enlarged view showing a latching portion of one of the sealing module latches in a latched state.
Figure 34:
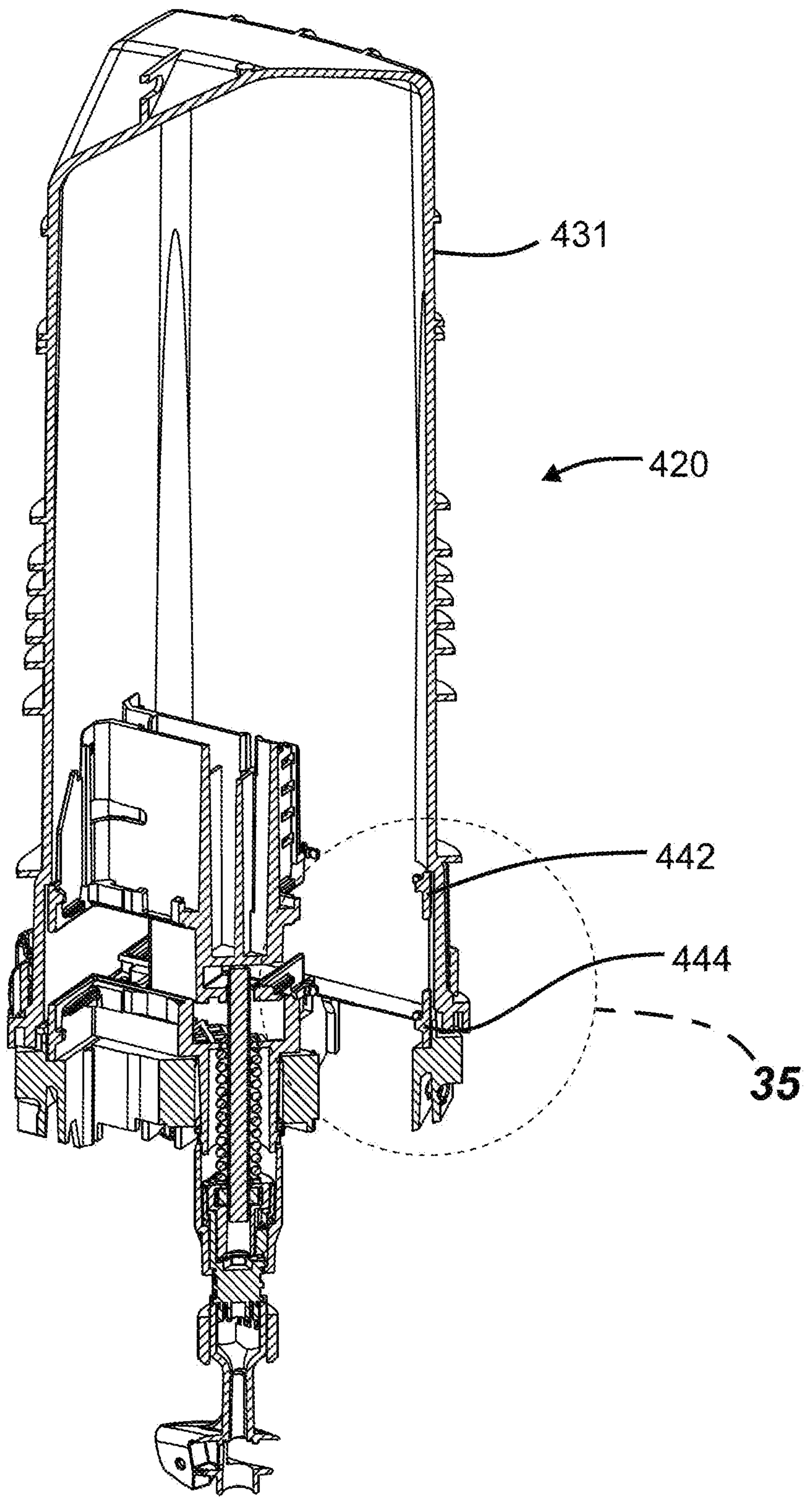
FIG. 34 is another cross-sectional view of the enclosure of FIG. 27.
Figure 35:
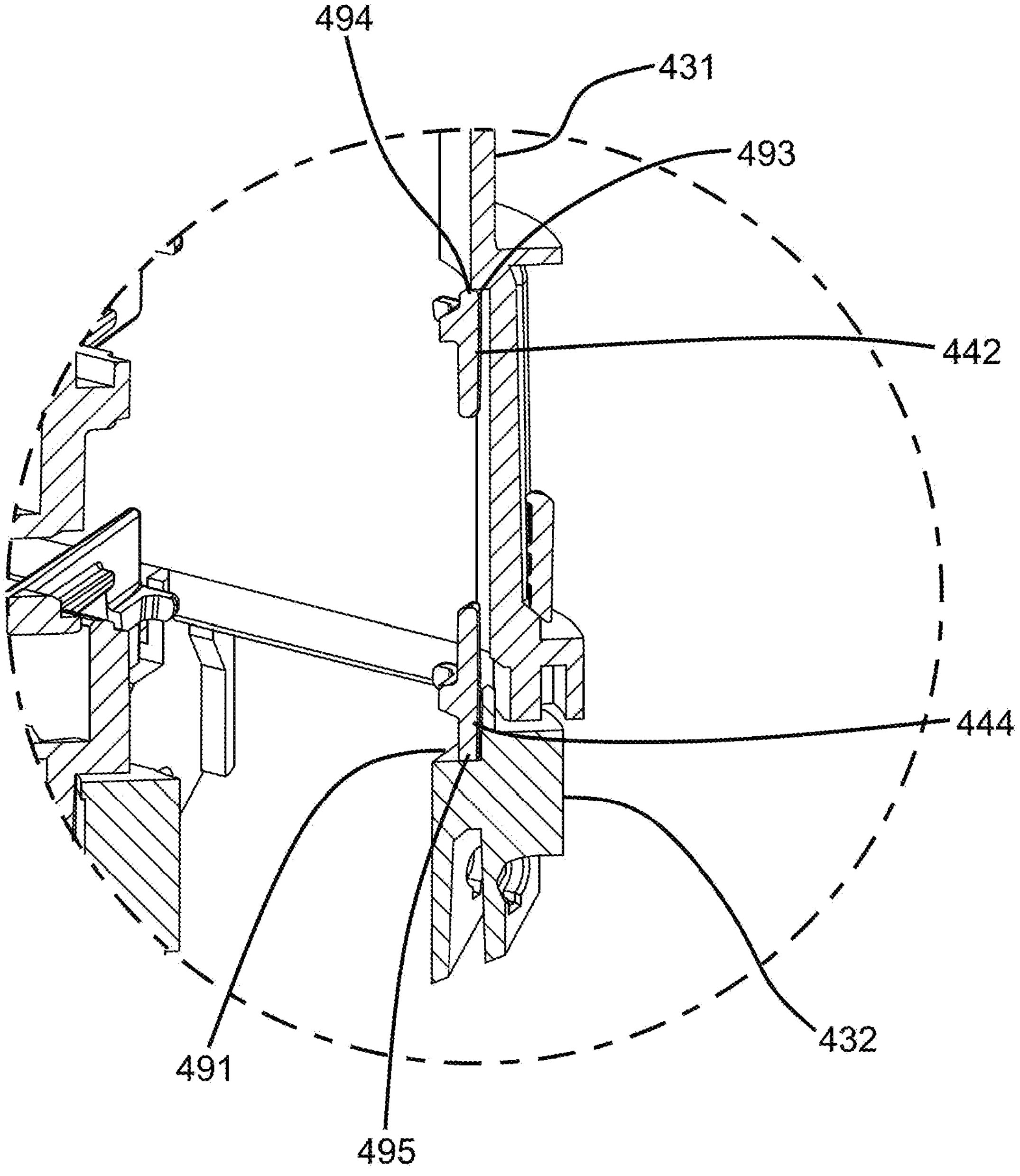
FIG. 35 is an enlarged view of a portion of FIG. 34.

The inner pressurization frame 306 includes slide members 320 (e.g., pins, rods, etc.) that project axially outwardly from the inner pressurization frame 306 (see FIGS. 5, 17 and 18). The slide members 320 extend axially through the outer pressurization frame 308 and are in slidable engagement with outer pressurization frame 308 such that relative axial movement is permitted between the inner and outer pressurization frames 306, 308. The slide members 320 can assist in guiding the relative axial movement between the inner and outer pressurization frames 306, 308 and in maintaining alignment between the inner and outer pressurization frames 306, 308. The slide members 320 also extend axially through the base 32 and are in slidable engagement with the base 32 such that relative axial movement is permitted between the inner and outer pressurization frames 306, 308 and the base 32. In the depicted example, the slide members 320 allow the entire cable sealing unit 30 as well as the interior frame 34 coupled to the sealing unit 30 and cables anchored to the interior frame 34 to axially move relative to the base 32. Since the base 32 is axially fixed relative to the cover 31 (e.g., by latches 360 or other securement technique), the slide members 320 also allow the entire cable sealing unit 30 as well as the interior frame 34 coupled to the sealing unit 30 and cables anchored to the interior frame 34 to axially move relative to the cover 31. Axial movement of the sealing unit 30 relative to the base 32 and the cover 31 is limited to a range of axial movement by a stop structure on the base 32 and a stop structure within the cover 31. The inner and outer pressurization frames 306, 308 are captured between the stop structures with contact between the inner pressurization frame 306 and the stop structure of the cover 31 limiting inward axial movement of the sealing unit 30 and contact between the outer pressurization frame 308 and the stop structure of the base 32 limiting outward axial movement of the sealing unit 30. When the sealant 38 is pressurized, the ability of the slide members 320 to slide relative to the base 32 permits the inner and outer pressurization members 42, 44 as well as the entire cable sealing unit 30 to float axially relative to the base 32 and the cover 31 in response to changes in relative pressure between the inside and the outside of the enclosure. Example stop structures are depicted at FIGS. 34 and 35.

Figure 14:
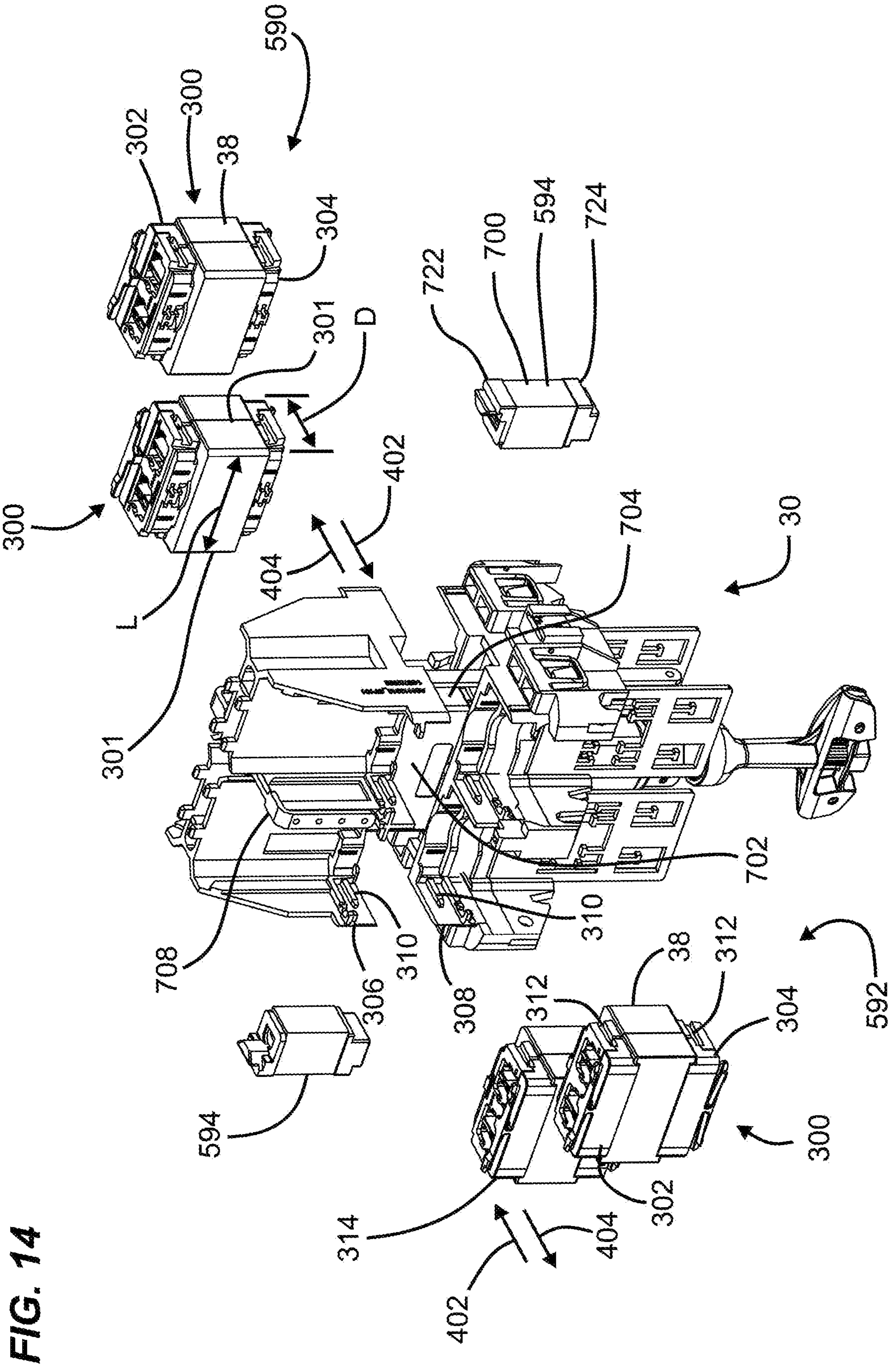
FIG. 14 depicts the base and sealing unit of FIG. 13 with sealing modules exploded from between the pressurization frames of the sealing unit.
Figure 15:
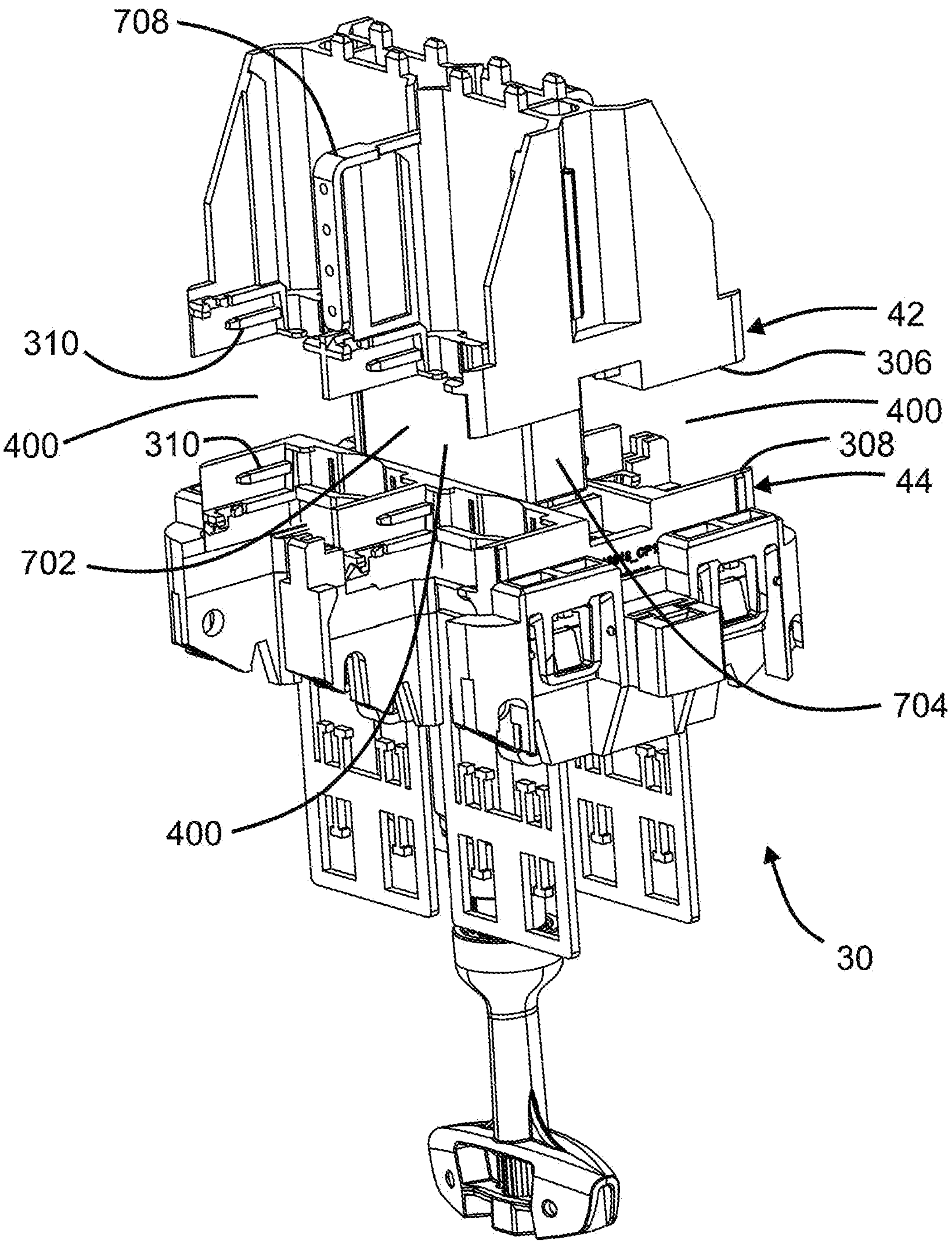
FIG. 15 depicts the base and sealing unit of FIG. 13 with the sealing modules removed.
Figure 16:
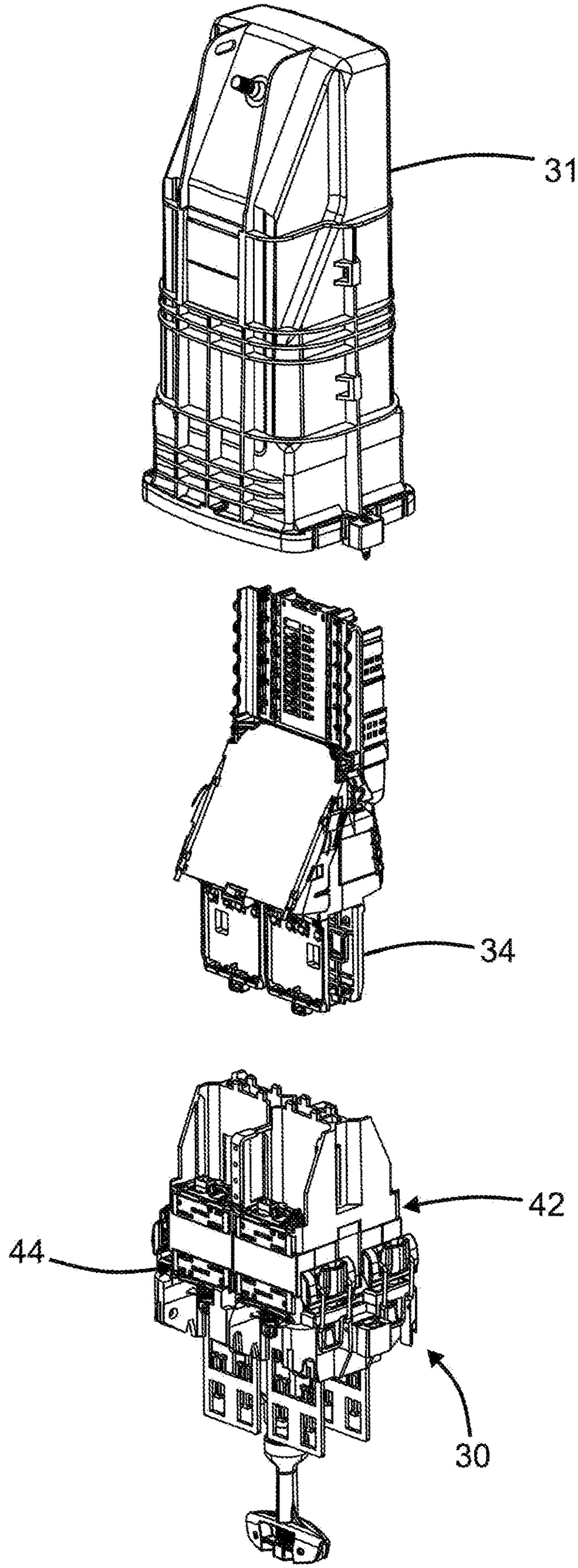
FIG. 16 is an exploded view of the enclosure of FIG. 1 showing an interior frame disconnected from an inner pressurization member of the sealing unit.

Referring to FIGS. 14 and 15, the sealing modules 300 are insertable into and removeable from mounting locations 400 defined by the inner and outer pressurization frames 306, 308. The sealing modules 300 are insertable into the mounting locations 400 in laterally inward insertion directions 402 and are removeable from the mounting locations 400 in laterally outward removal directions 404. The insertion and removal directions 402, 404 are perpendicular with respect to the axial direction of the enclosure. When the sealing modules 300 are loaded in the mounting locations 400, the sealing module latches 413 are located at exterior lateral sides of the sealing modules 300 so as to be readily accessible.

The sealing modules 300 can include lengths L, depths D and heights H. When the sealing modules 300 are mounted at the mounting locations 400, the heights H extend in the axial orientation of the enclosure and the depths D extend in the lateral orientation. The length L extends between opposite ends 301 of the sealing module 300 and is oriented perpendicular with respect to the depth D and the height H Referring to FIGS. 13, 14 and 19-21, the sealing module latch structures 314 are integrated with the inner and outer containment walls 302, 304 at outer lateral sides of the sealing modules 300. The sealing module latch structures 314 each have an elongate beam construction defining a length L1 that extends across at least 75 percent of the total length L of each cable sealing module 300. The elongate beams extend across lengths of the modules and are connected to the containment walls 302, 304 at centrally located connection locations 370 which are located at mid-regions along the lengths L, L1. The elongate beams each include a pair of cantilever latches 415 that extend along the lengths of the modules in opposite directions from the connection locations 370. Each of the cantilever latches 415 includes a free end including a latching surface 417 that faces in the laterally outward removal direction 404 during installation. When the sealing modules 300 are installed, the latching surfaces 417 oppose catch surfaces 419 defined on the inner or outer pressurization frames 306, 308 to inhibit unintentional removal of the sealing modules 300 from the mounting locations 400. The catch surfaces 419 face in the laterally inward insertion direction. The cantilever latches 415 can be flexed in the axial orientation and in the lateral orientation. The free ends of the cantilever latches 415 can also include ledge surfaces 421 surfaces that face in an axial direction and oppose axially facing seat surfaces 423 of the inner or outer pressurization frames 306, 308 when the cantilever latches 415 are latched in place with respect to the inner or outer pressurization frames 306, 308.

The cantilever latches 415 can each be axially flexed between a release position and a latching position. The cantilever latches 415 are biased toward the latching position by their own internal resiliency (e.g., elasticity). During insertion of one of the sealing modules into its corresponding mounting location 400, the cantilever latches 415 engage ramp surfaces 425 on the inner and outer pressurization frames 306, 308 causing the cantilever latches 415 to flex from the latching positions to the release positions. Once the latching surfaces 417 of the move past the catch surfaces 419, the latches snap-back to the latching positions in which the latching surfaces 417 oppose the catch surface 419 to latch the sealing module in place. Contact between the ledge surfaces 421 and the seat surfaces 423 stops the cantilever latches 415 at the latching positions as the latches resiliently move/snap from the release position to the latching position. It will be appreciated that the ramp surfaces 425 can be provided on either the pressurization frames 306, 308 or on the latching arms 415, or on both.

The cantilever latches 415 include inner cantilever latches 415*a* integrated with the inner sealant containment walls 302 and outer cantilever latches 415*b* integrated with the outer sealant containment walls 304. To release one of the sealing modules from its mounting location 400, the inner cantilever latches 415*a* can be manually flexed axially inwardly from the latching position to the release position and the outer cantilever latches 415*b* can be manually flexed axially outwardly from the latching position to the release position to allow the sealing module 300 to be pulled from the mounting location 400. Alternatively, the inner and outer cantilever latches 415*a*, 415*b* can be manually flexed in the insertion direction to disengage the ledge surfaces 421 from the seat surfaces 423. Once the ledge and seat surfaces 421, 423 have been disengaged, the inner cantilever latches 415*a* can be manually flexed axially outwardly and the outer cantilever latches 415*b* can be manually flexed axially inwardly to provide clearance between the latching surface 417 and the catch surface 419 and allow the sealing module 300 to be pulled from the mounting location 400. Thus, two different release approaches can be used to release the sealing modules 300 with the selected approach depending upon user preference. The second approach allows the inner and outer cantilever latches 415*a*, 415*b* to be forced toward each other thereby better enabling single-handed release of a set of the cantilever latches 415*a*, 415*b* at one end of one of the modules 300 by pinching the cantilever latches 415*a*, 415*b* together. Flat pressing surfaces 441 adjacent the ends of the cantilever latches 415*a*, 415*b* facilitate pressing the cantilever latches 415*a*, 415*b* together in the axial orientation. In contrast, the first approach involves forcing the cantilever latches 415*a*, 415*b* at one end of one of the modules 300 away from one another which is more suitable for two-handed release. Notches 443 and grip surfaces 445 function as finger grips that facilitate contacting the cantilever latches 415*a*, 415*b* to flex the cantilever latches 415*a*, 415*b* axially apart.

Figure 8:
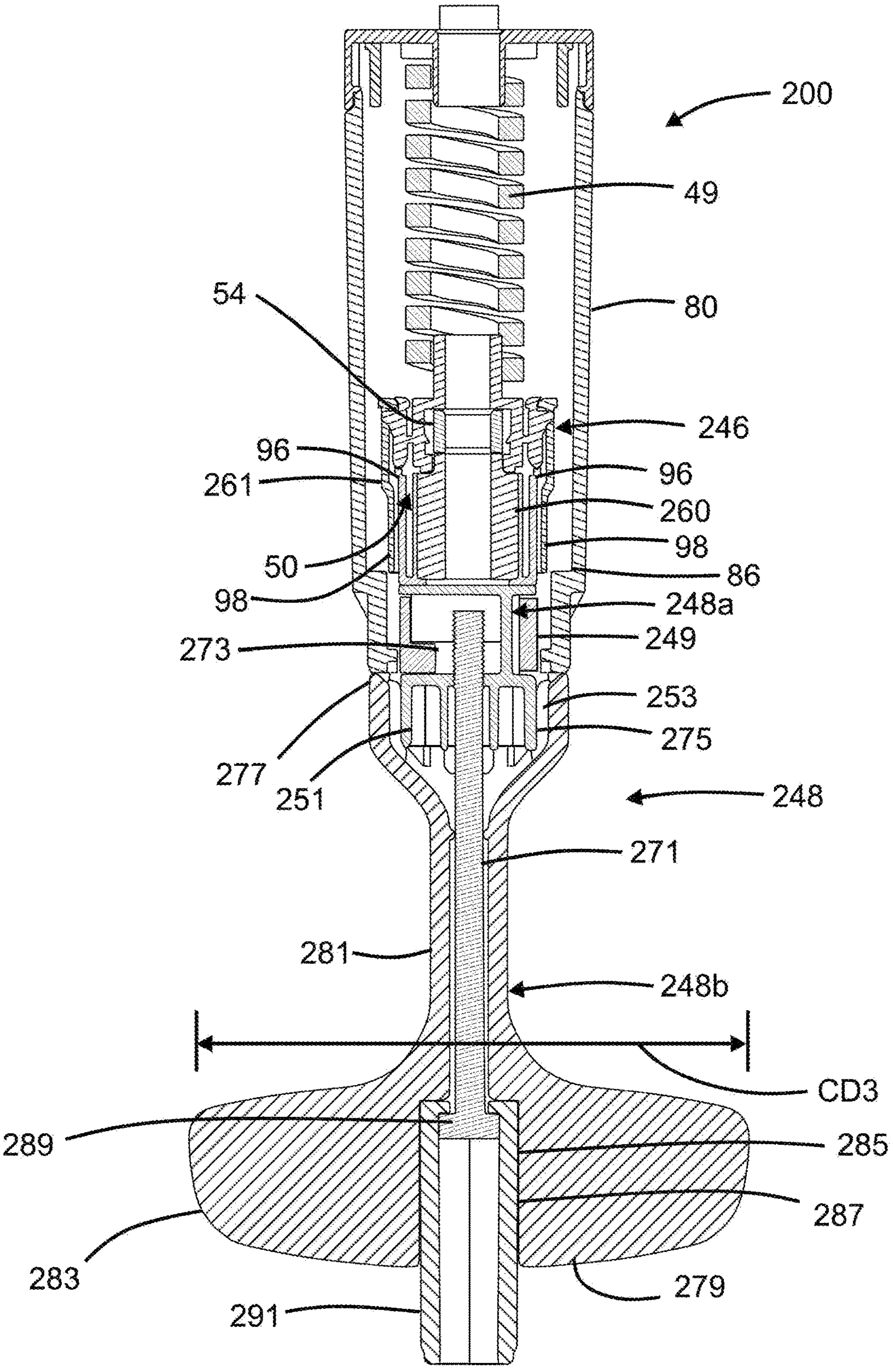
FIG. 8 is a cross-sectional depicting an actuation arrangement with detachable handle configuration in accordance with the principles of the present disclosure.

FIG. 8 depicts an alternative arrangement 200 usable as part of an actuation arrangement for pressurizing sealant such as the sealant 38 of cable sealing unit 30. In one example, the depicted arrangement 200 is adapted to threadingly interface with the actuator shaft 40 (see FIG. 10) to drive relative axial movement between the inner and outer pressurization members 42, 44. The arrangement 200 includes the outer sleeve 80 and the spring 49. The arrangement 200 also includes a linear drive component 246 that threadingly mounts on the actuator shaft 40 via drive nut 54 that is secured within a body 260 (e.g., a molded plastic body) which, like the body 60, is adapted to rotate in unison with the drive nut 54 relative to the actuator shaft 40. In other examples, threads can be unitarily integrated within a passage defined by the body 260 such that the nu tis integrated with the body 260. The linear drive component 246 also includes a constraint sleeve 261 that mounts on and is carried with the body 260. The constraint sleeve 261 defines the constraint cantilevers 98 for interacting with the outer sleeve 80 to constrain the ratchet arrangement 50 in the first torque-transfer mode.

Figure 9:
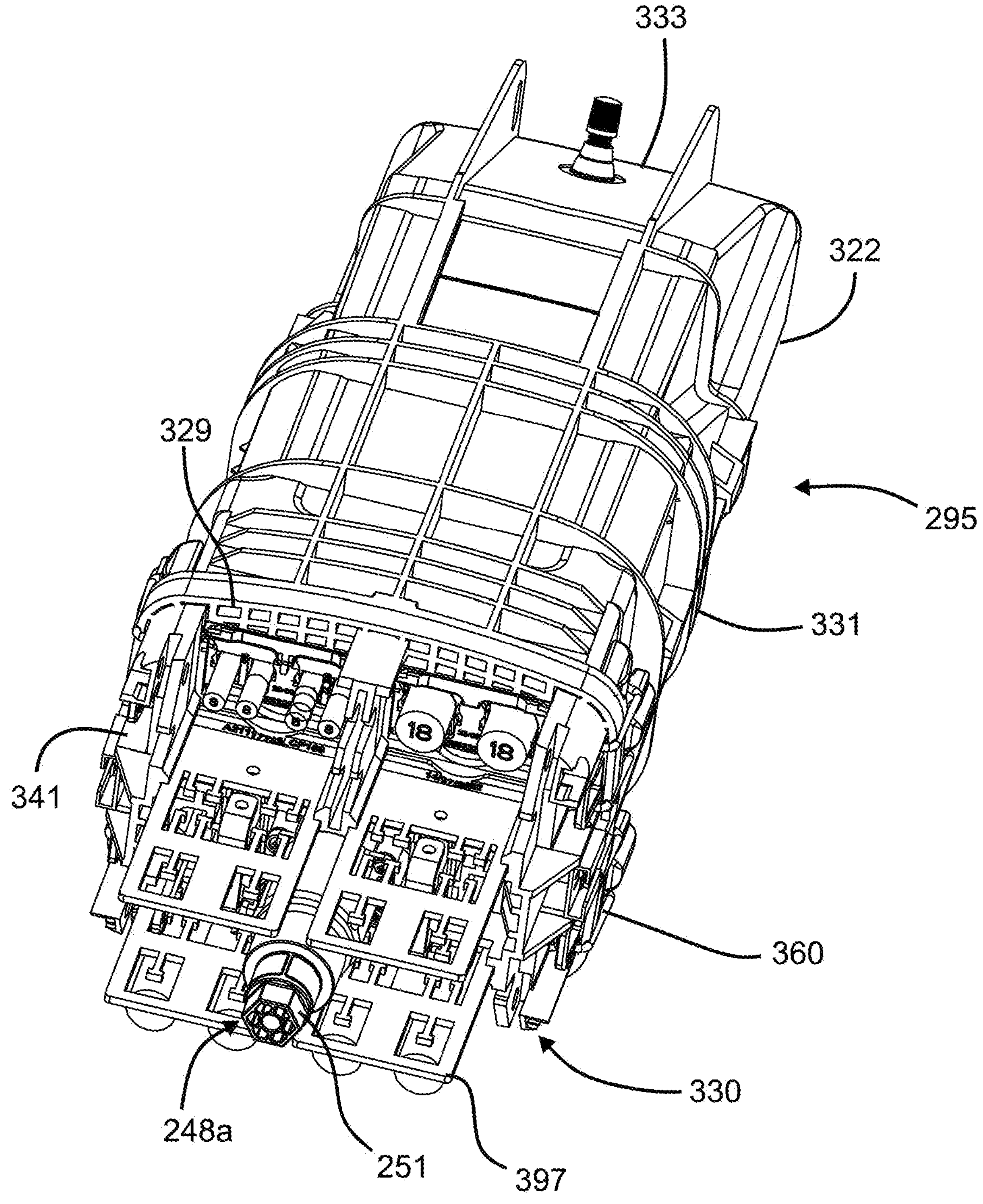
FIG. 9 is a perspective view of an enclosure incorporating the actuation arrangement of FIG. 8 with a detachable portion of the handle detached.

The arrangement 200 also includes a modified handle arrangement 248 including a first handle portion 248*a* and a second handle portion 248*b*. The ratchet arrangement 50 is defined between the first handle portion 248*a* and the body 260. For example, the body 260 can include a ratchet feature such as the first ratchet teeth 92 and the first handle portion 248*a* can include a ratchet feature such as the resilient ratchet cantilevers 96 defining the second ratchet teeth 94. The ratchet feature of the first handle portion can be at an inner axial end of the first handle portion 248*a*. The first handle portion 248*a* also includes an axially outer end defining a first torque-transfer feature 251 (e.g., a torque-receiving feature). In the depicted example, the first torque-transfer feature 251 has a non-circular configuration configured for transferring torque (e.g., includes one or more flats such as a hexagonal shape or other polygon or includes splines or the like). In the depicted example, the first torque transfer feature 251 is a male drive member having external flats, but in alternative examples could be female. The second handle portion 248*b* includes a second torque-transfer feature 253 (e.g., a torque transmitting feature) that mates in torque-transmitting relation with respect to the first torque-transfer feature 251. In the depicted example, the second torque-transfer feature 253 has a non-circular configuration configured for transferring torque (e.g., incudes one or more flats such as a hexagonal shape or other polygon or includes splines or the like). In the depicted example, the second torque-transfer feature 253 is a female feature depicted as a socket having internal flats, but in alternative examples could be male. The second handle portion 248*b* is detachably secured to the first handle portion by a threaded fastener 271 that threadingly engages the first handle portion 248*a* and that extends axially through the second handle portion 248*b*. In one example, the threaded fastener 271 threads within a nut 273 secured within a body 275 (e.g., a molded plastic body) of the first handle portion 248*a*. In other examples, the body 275 itself can integrally define internal threads that engage external threads of the fastener 271. In certain examples, the second handle portion 248*b* is a molded plastic part. The second handle portion 248*b* can be detached from the first handle portion 248*a* by unthreading the threaded fastener 271 from the first handle portion 248*a*. By detaching the second handle portion 248*a*, the likelihood of an unauthorized person depressurizing the sealant is reduced. Also, the overall length of the enclosure is reduced. FIG. 9 depicts the arrangement 200 integrated with an enclosure 295 with the second handle portion 248*b* detached from the first handle portion 248*a* thereby shortening the overall length of the enclosure 295.

In the depicted example, a pressurization indicator part 249 is mounted on and carried by the first handle portion 248*a*. The pressurization indicator part 249 can have a distinctive color different from the first handle portion 248*a* and the sleeve 80. During pressurization, the disappearance of the pressurization indicator part 249 within the sleeve 80 provides a visual indication that suitable pressurization has occurred. In the depicted example, disappearance of the indicator part 249 coincides with the constraint sleeve 261 reaching a position in which it is no longer constrained by the sleeve 80.

In certain examples, rotational driving torque can be applied to the first handle portion 248*a* by a structure other than the second handle portion 248*a* such as a wrench (e.g., a socket wrench) or a power driver or power drill. In certain examples, the first handle portion 248*a*, the handle 48 or the handle 248 can be referred to as a rotational driver or a rotational drive component since such structures drive rotation of the linear drive components 46, 246. The linear drive components 46, 246 convert rotational movement into linear movement which drives axial loading of the pressurization structures (e.g., via springs 49).

The second handle portion 248*b* as a length that extends axially between a first end 277 and a second end 279. The second handle portion 248*b* includes a hollow handle shaft 281 that extends between the first and second ends 277, 279. The second torque-transfer feature 253 is defined at the first end 277 of the second handle portion 248*b*. The second handle portion 248*b* includes an enlarged gripping portion 283 at the second end 279 of the second handle portion 248*b*. The enlarged gripping portion 283 has an enlarged outer cross-dimension CD3 as compared to the hollow handle shaft 281. The hollow handle shaft 281 co-axially aligns with the actuator shaft 40 when the second handle portion 248*b* is secured to the first handle portion 248*a* by the threaded fastener 271. The threaded fastener 271 extends axially through the hollow handle shaft 281. In the depicted example, the hollow handle shaft 281 and the enlarged gripping portion 283 cooperate to define a T-shaped outer profile.

Referring to FIG. 8, the enlarged gripping portion 283 defines a pocket 285 co-axially aligned with the hollow handle shaft 281. A sleeve 287 is positioned within the pocket 285 and can be rotated within the pocket about the axis of the shaft 281. A head 289 of the threaded fastener 271 is contained in torque transmitting relation within an interior of the sleeve 287 such that torque for turning the threaded fastener 271 can be manually applied through the sleeve 287. The sleeve 287 has an outer end portion 291 that extends axially outwardly beyond the enlarged gripping portion 283. In certain examples, a power driver can engage in torque transmitting relation with the interior of the sleeve 287 to drive rotation of the handle arrangement 248.

Figure 10:
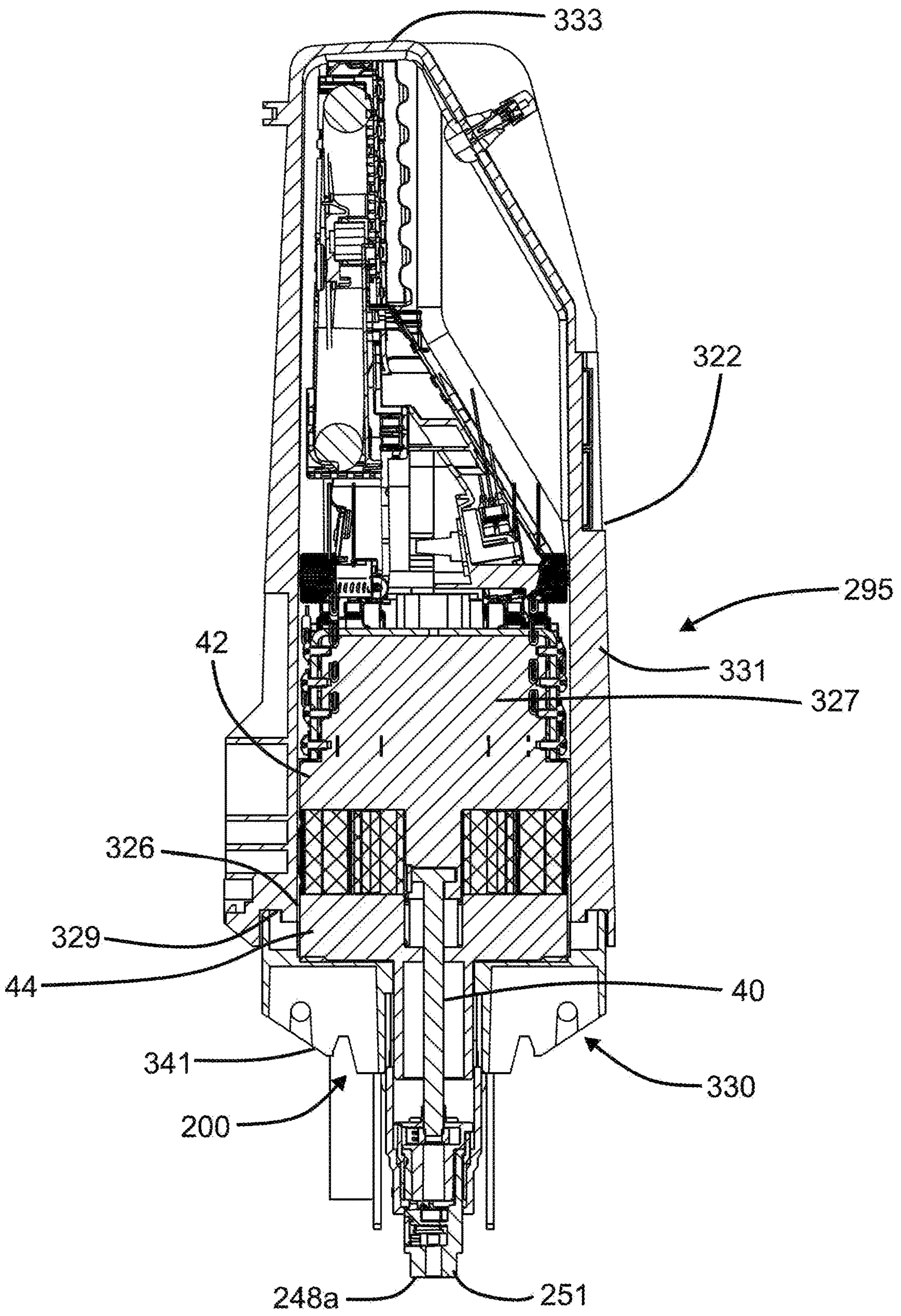
FIG. 10 is a longitudinal cross-sectional view cut through the enclosure of FIG. 9.
Figure 11:
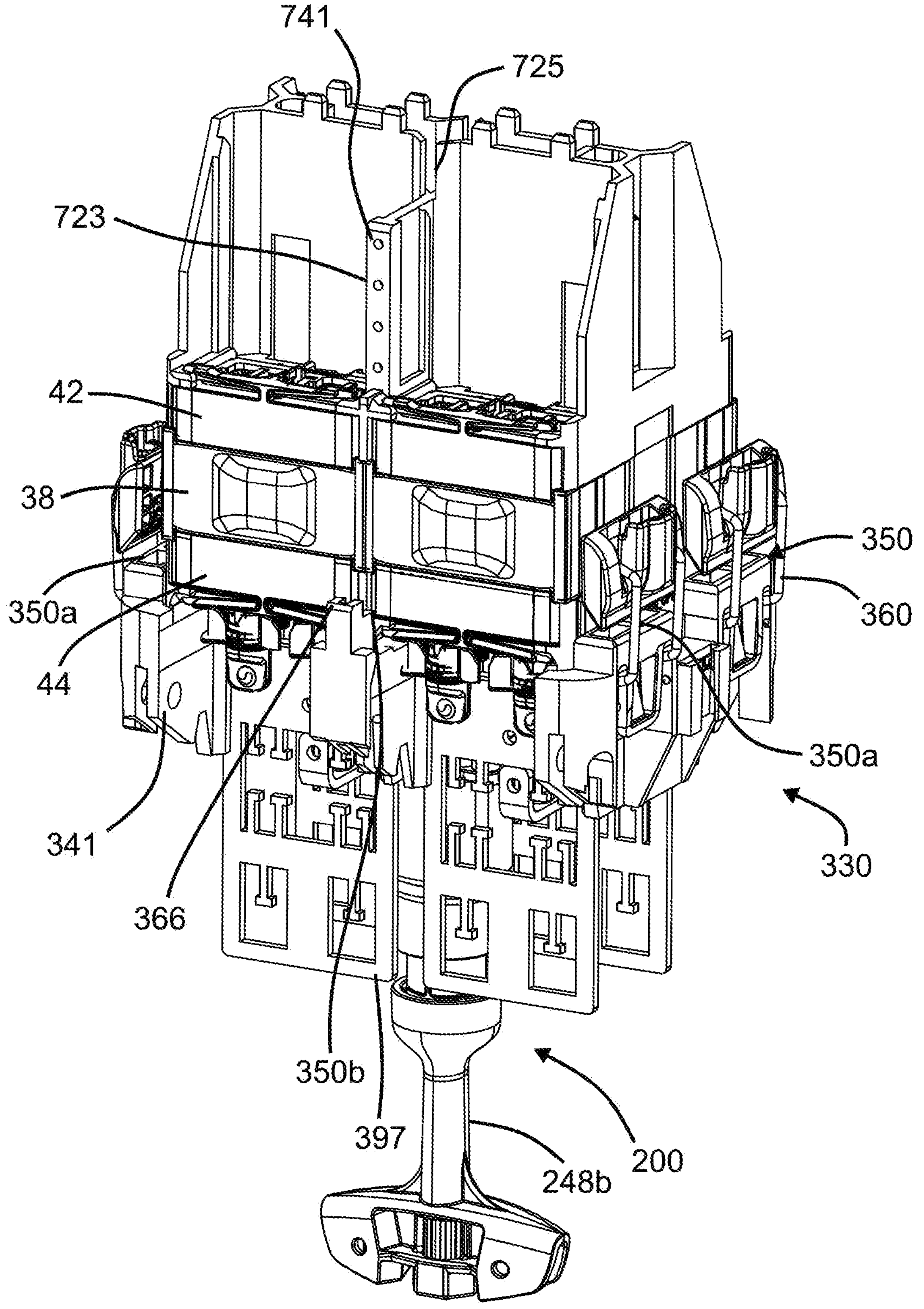
FIG. 11 depicts the enclosure of FIG. 9 with the dome removed and the detachable portion of the handle attached.

Referring to FIGS. 9 and 10, the enclosure 295 (e.g., a telecommunications enclosure) includes a housing 322 having an opening 326 that extends into an interior 327 of the housing 322. The enclosure includes a cable sealing unit 330 that mounts within the opening 326 for sealing about one or more cables desired to be routed into an interior 327 of the housing 322 through the opening 326. The cable sealing unit 330 can also provide peripheral sealing within the housing 322 about a perimeter boundary of the opening 326 and about a perimeter of the cable sealing unit 330. In the example shown, the housing 322 includes a cover 331 (e.g., a dome style cover) defining the opening 326 at an open end 329 of the cover 331. The cover 331 has a closed end 333 opposite the open end 329 and has a length that extends between the ends 329, 333. In one example, the housing 322 is a unitary, one-piece molded plastic dome body that extends from the closed end 333 axially to the open end 329. A base frame 341 latches to the open end 329 of the cover to retain the cable sealing unit 330 within the cover 331. An interior frame 334 supporting fiber optic components 336 (e.g., optical splice trays, optical splitter trays, etc.) can be carried with the sealing unit 330. In one example, cable sealing unit 330 includes sealant 38 (e.g., a sealant arrangement, a volume of sealant that may be formed by one or more sections or blocks of sealant (e.g., sealant modules each including sealant contained between inner and outer containment walls for each module), etc.) defining a plurality of cable pass-through locations (e.g., ports, interfaces between adjacent sections of sealant, etc.). When pressurized, the sealant 38 is configured for providing seals about structures (e.g., cables, plugs, etc.) routed though the pass-through locations of the sealant 38 and is also configured for providing a peripheral seal between the cover 331 and the cable sealing unit 330 about the boundary (e.g., perimeter, profile, etc.) of the opening 326.

The cable sealing unit 330 is axially retained in the cover 331 by the base frame 341. The outer pressurization member 44, the inner pressurization member 42 and the interior frame 334 are retained in the cover 331 by the base frame 341 and in certain examples can float axially relative to the base frame 341 in response to changes in the relative pressure between the inside and the outside of the enclosure 295. The inner pressurization member 42 and the interior frame 334 can be configured to be coupled together so as to move axially together as a unit. In certain examples, at least portions of the inner pressurization member 42 and the interior frame 334 can be unitarily formed with each other. The interior frame 334 can support a tower supporting a plurality of fiber management trays, and can also support cable anchoring locations for anchoring cables (e.g., via clamps, cable ties, anchoring blades, etc.) routed through the sealing unit into the interior of the housing. The base frame 341 is latched, clamped or otherwise secured to the cover 331 and once secured to the cover 331 is not axially moveable relative to the cover 331. The actuator arrangement for pressurizing the sealant 38 within the opening 326 once cables have been routed through the sealant during installation of the enclosure 295 in the field extends through the base frame 341 and is coupled to the inner pressurization member 42 by the threaded shaft 40. In one example, the actuator arrangement includes components such as the actuator shaft 40, the inner and outer pressurization members 42, 44 between which the sealant 38 is pressurized, the linear drive component 146, the handle arrangement 248, the spring 49 and the ratchet arrangement 50 for transferring torque from the handle arrangement 248 to the drive component 246 to compress the spring 49 and apply spring load to the pressurization members 42, 44 for pressurizing the sealant 38. Relative axial movement between the inner and outer pressurization members 42, 44 occurs during actuation and de-actuation of the actuator. Axial movement between the inner and outer pressurization members 42, 44 can be guided by one or more slide members (e.g., slide pins) coupled to and moveable with the inner pressurization member 42. In one example, the slide members are unitarily formed as an integral part of the inner pressurization member 42. The slide members can extend through and be slidably supported within openings defined by the base frame 341. When the sealant 38 is pressurized, the ability of the slide members to slide relative to the base frame 341 permits the inner and outer pressurization members 42, 44 to float axially relative to the base frame 341 and the cover 331 in response to changes in pressure within the housing or outside the housing. The base frame 341 retains the inner and outer pressurization members 42, 44 within the cover 331 while allowing the inner and outer pressurization members 42, 44, when in a state in which the sealant is pressurized, to move axially relative to the base frame 341 and the cover 331 in response to relative pressure changes between the inside and the outside of the housing 322. Axial movement of the inner and outer pressurization members 42, 44 relative to the base frame 341 and the cover 331 causes axial movement of the interior frame as well as the entire sealing unit relative to the base frame 341 and the cover 331. Cables anchored to the interior frame can also move with the inner and outer pressurization members 42, 44.

Figure 12:
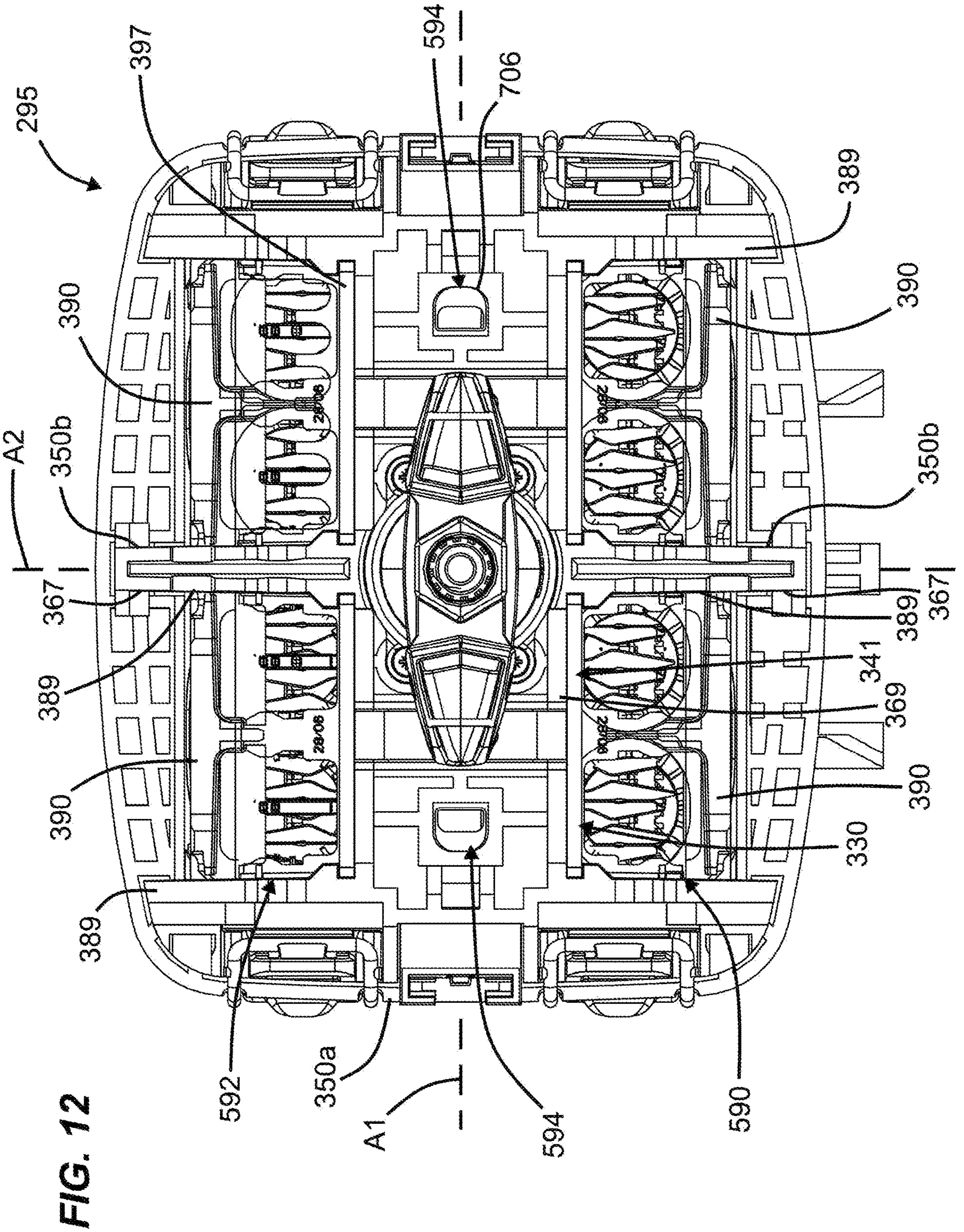
FIG. 12 is a bottom view of the enclosure of FIG. 9 with the detachable portion of the handle attached.
Figure 13:
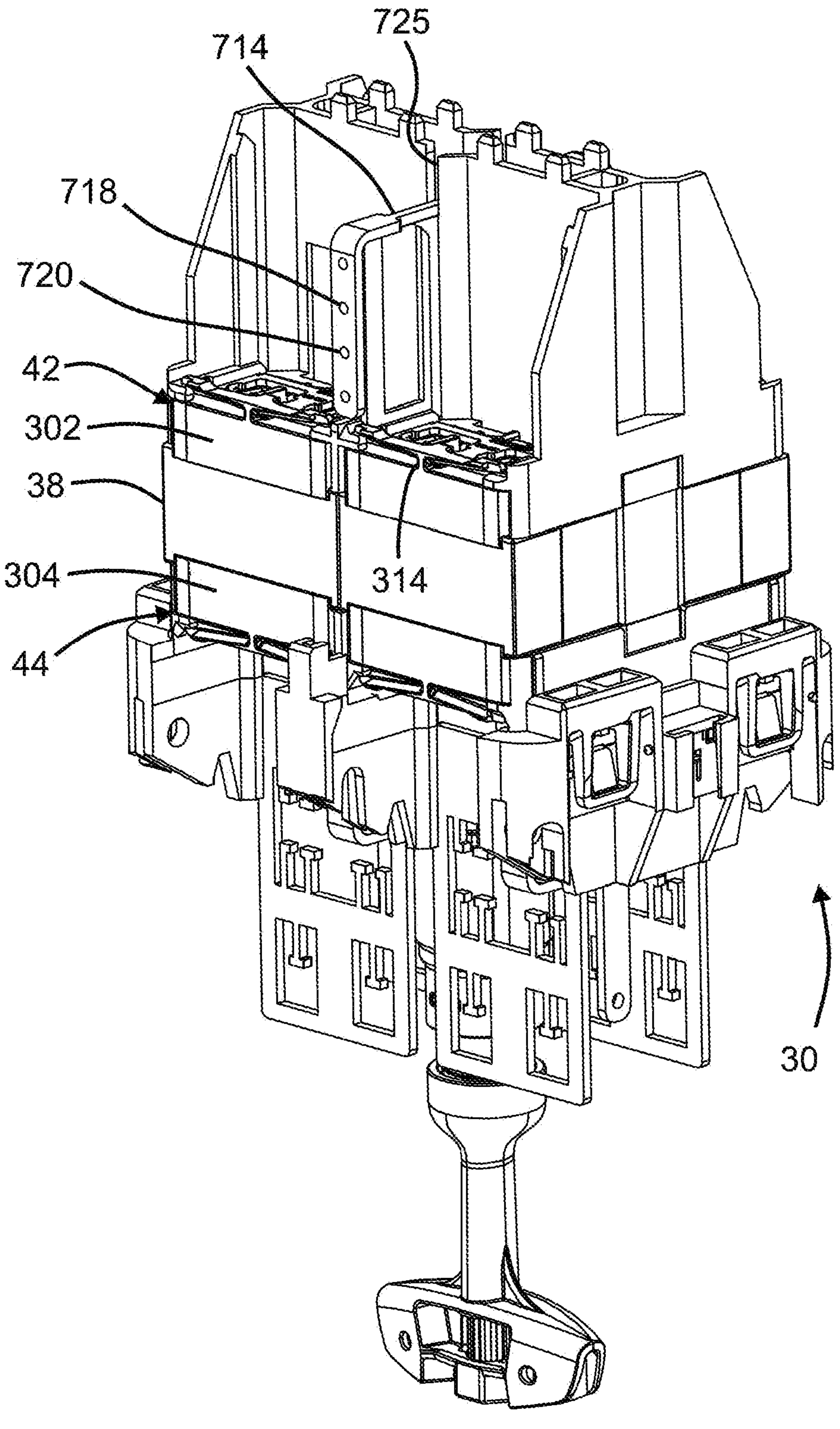
FIG. 13 is a perspective view of the base and sealing unit of the enclosure of FIG. 1.

The base frame 341 also includes a housing seat arrangement 350 on which the open end 329 of the dome cover 331 (e.g., the one-piece dome body) is supported when the cable sealing unit 330 is installed in the cover 331 through the open end. Latches 360 for securing the cover 331 to the sealing unit 330 can be coupled between the base frame 341 and the cover 331. The latches 350 can extend across the housing seat arrangement when latched and can be carried with the base frame 341. The housing seat arrangement 350 is adapted to support the open end 329 and sealing is not provided between the open end 329 of the dome of the dome and the housing seat arrangement 350. Instead, perimeter sealing within the cover 331 (e.g., about the perimeter of the opening/the perimeter of the cable sealing unit) is provided by the sealant 38 and no additional gaskets, o-rings or other sealing structures are required. When the sealing unit 330 is installed within the cover 331, the housing seat arrangement 350 is located outside the perimeter sealing provided by the sealant 38 with respect to an interior surface of the cover 331. In one example, the housing seat arrangement 350 is axially outwardly offset from the location of the perimeter sealing provided by the sealant 38 when the cable sealing unit 330 is installed in the cover 331. Referring to FIG. 12, the base frame 341 has an elongate shape when viewed axially from the bottom of the base frame 341. For example, when viewed axially as shown at FIG. 12, the base frame 341 is longer along a major axis A1 than along a minor axis A2. The housing seat arrangement 350 includes main housing seat locations 350*a* separated from one another by a major dimension of the base frame that extends along the major axis A1. The housing seat arrangement 350 also includes intermediate housing seat locations 350*b* located at intermediate locations between the main seat locations 350*a*. The housing seat arrangement 350 does not continuously support the open end 329 of the cover 331, but instead provide intermittent support with gaps in support provided between the various housing seat locations 350*a*, 350*b* where the open end of the cover 331 is not in contact or supported directly by the seat arrangement 350. In certain examples, the housing seat locations can include portions that fit within corresponding receptacles defined by the wall of the cover 331 at the open end to assist in maintaining alignment between the base frame 341 and the cover 331. For example, projections 366 at the intermediate seat locations 350*b* can fit axially within receptacles 367 defined by the wall of the housing 322 at the open end of the cover 331. The housing seat locations can be integrated with supports 389 (e.g., brackets, flanges) that project laterally outwardly from central body 369 of the base frame 341 and that separate the end of the cable sealing unit into different cable pass-through regions 390. Cable anchoring structures such as cable anchoring plates 397 can be mounted adjacent the central body 369. Each cable anchoring plate can include structure such as cable tie locations and each cable anchoring plate can be positioned at a different one of the cable pass-through regions 390. The housing seat arrangement 350 can also be referred to as a cover or dome seat arrangement. In one example, opposite edges of the cable anchoring plates 397 are received in axial slots 398 defined by the base frame 341. In one example, the cable anchoring plates 397 are capable of sliding axially relative to the base frame 341. The cable anchoring plates 397 can be located between the actuator and the cable pass-through locations. In a preferred example, the cable anchoring plates 397 are axially fixed relative to the inner pressurization member 42 so as to be axially movable with the inner pressurization member 42 relative to the base 32 and the cover 31 (e.g., the dome). In one example, the cable anchoring plates 397 are attached to the inner pressurization member 42 by fasteners (e.g., threaded fasteners such as bolts/screws). In one example, the cable anchoring plates 397 are connected to the ends of the slide members 320 of the inner pressurization member 42 (e.g., by the fasteners).

Referring to FIGS. 12 and 14, the sealant arrangement includes a first set 590 of the cable sealing modules 300 positioned on one side of the major axis A1 and a second set 592 of the cable sealing modules 300*c*, 300*d* on a second side of the major axis. A1. The first and second sets 590, 592 of cable sealing modules 300 are each arranged to abut end-to-end in a linear arrangement such that each set forms a separate line of sealing modules 300. Thus, first and second lines of sealing modules 300 are positioned on opposite sides of the major axis A1. Intermediate sealing modules 594 are positioned between the first set 590 of cable sealing modules 300 and the second set 592 of cable sealing modules 300 and are intersected by the major axis A1. The intermediate sealing modules 594 are smaller than the cable sealing modules 300 and are positioned adjacent the ends of the lines of sealing modules. The inner pressurization member 42 includes a core portion 701 surrounded by the sealing modules 300, 594. The core portion 701 is rectangular and includes opposite major sides 702 and opposite minor sides 704. Radially inwardly facing sides of the sealing modules 300 seal against the major sides 702 and radially inwardly facing sides of the sealing modules 594 seal against the minor sides 704. As used herein, radially inwardly means facing toward the axis of the actuator shaft 40. Radially outwardly facing surfaces of the sealing modules 300, 594 are adapted to seal against the interior of the cover 31 to form a circumferential seal with the interior of the cover 31 that surrounds the sealing portion of the sealing unit 30. The modules 300, 594 are all capable of being removed from between the inner and outer pressurization members 42, 44.

In the depicted example, when the sealing unit 30 is assembled, the intermediate sealing modules 594 are positioned between the first line of cable sealing modules 300 and the second line of cable sealing modules 300 and seal against radially inwardly facing surfaces of the cable sealing modules 300. In the depicted example, radial outer sides of the intermediate sealing modules 594 are flush with ends of the first line of cable sealing modules 300 and the second line of cable sealing modules 300. The sealing modules 300 each have a wrap-around configuration in which first and second volumes of sealant of each module 300 can be separated from one another to open each module and allow cable to be inserted and captured between the first and second volumes. In this way, it is not required to axially push cables through the modules. In contrast, the intermediate modules 594 each have only one volume of sealant 700 positioned axially between inner and outer containment walls 722, 724. The inner and outer containment walls 722, 724 define openings 706 sized to receive an electrical grounding structure 708 (see FIGS. 5, 38 and 39) which can be pushed axially through a selected one of the intermediate sealing modules 594 such that the volume of sealant 700 seals about the portion of the grounding structure that extends through the selected intermediate sealing module 594. In certain examples, each of the modules 594 can receive a separate grounding structure. Example grounding structures can include electrically conductive members such as bars, wires, rods, plates, or the like. In certain examples, other structures such as cables can be routed through at least one of the intermediate sealing modules 594.

Figure 39:
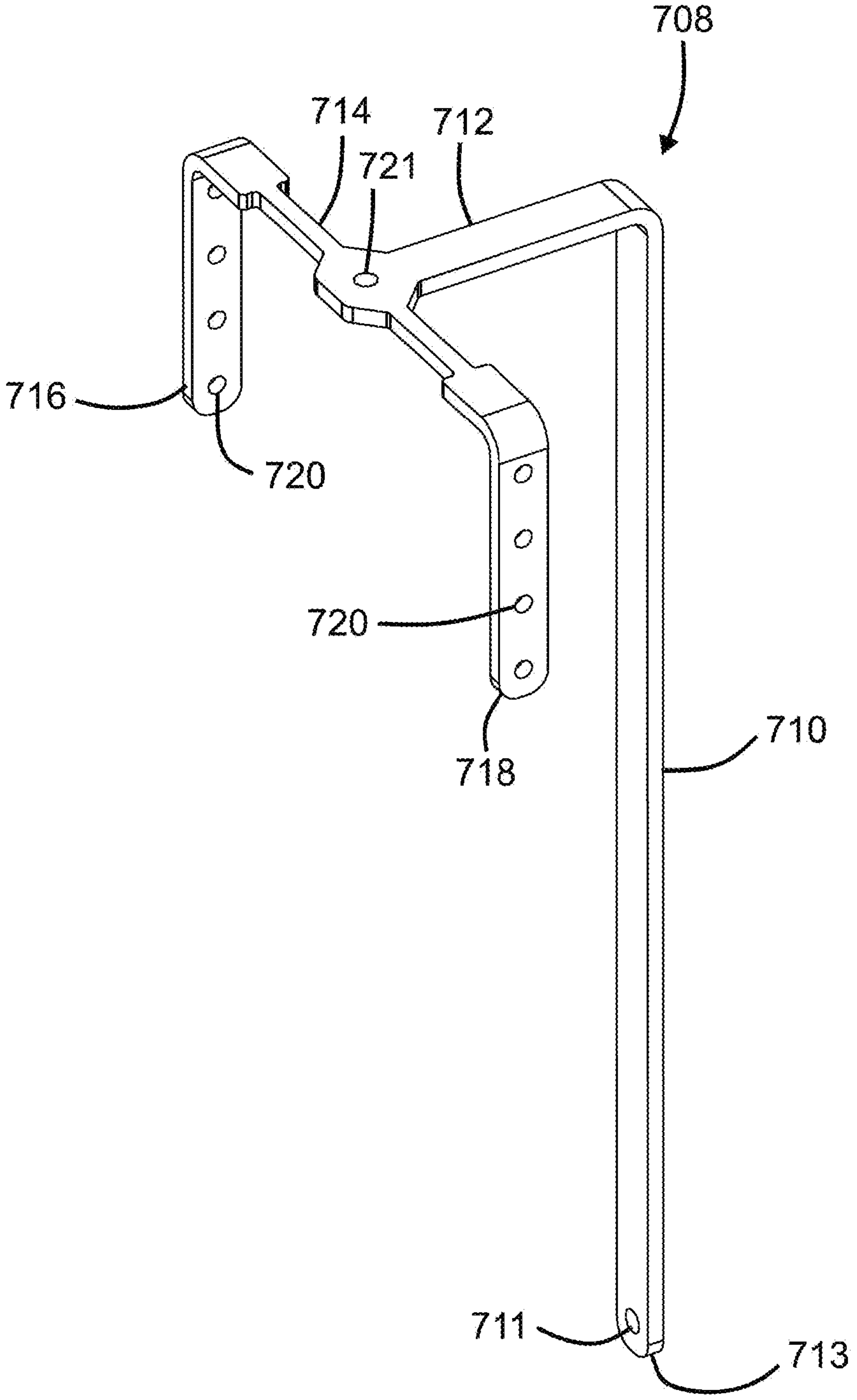
FIG. 39 is a perspective view of a electrical grounding structure that can be used with enclosures in accordance with the principles of the present disclosure.

Referring to FIG. 39, an example electrical grounding structure 708 is depicted. The electrical grounding structure 708 can have an electrically conductive construction and can include a metal construction bent to a desired shape. The electrical ground structure 708 includes a main leg 710 adapted to be pushed though and sealed by one of the intermediate sealing modules 594. A grounding cable that connects to earth ground can be terminated to a free end 713 of the electrical ground structure (e.g., by a fastener that fits in an opening 711 defined through the main leg 710). When the electrical ground structure 708 is installed through the sealing unit, the free end 713 of the electrical grounding structure is positioned at a location outside the enclosure. A secondary leg 712 integrally connects to the main leg 710 (e.g., at a bend) and is angled relative to the main leg 710. In one example, the secondary leg 712 is oriented at a perpendicular angle relative to the main leg 710 such that the main leg 710 and the secondary leg 712 cooperate to define an L-shaped member. A furcation member 714 connects to an end of the secondary leg 712 positioned away from the main leg 710. The furcation member 714 is depicted as being perpendicular to the secondary leg 712 and perpendicular to a reference plane including the L-shaped member. Termination bars 716, 718 are connected to ends of the furcation member 714. The termination bars 716, 718 can be parallel to each other and to parallel to the main leg 710 and can project from the furcation member 714 in the same direction the main leg 710 projects from the secondary leg 712. Each of the termination bars can define a plurality of termination openings 720 for receiving fasteners for electrically connecting grounding wires to the termination bars 716, 718. In one example, the opening 711 as well as the openings 720 can be internally threaded and the fasteners can be bolts. The electrical grounding structure 708 defines an anchoring opening 721 adjacent the furcation member 714 for anchoring the electrical grounding structure 708 to the inner pressurization member or the inner frame of the sealing unit via a fastener. As depicted at FIG. 4, the electrical grounding structure 708 is fastened to a support 709 of the inner pressurization member 42. When the electrical ground structure 708 is installed through the sealing unit, the termination bars 716, 718 are located inside the enclosure with the termination bar 716 positioned above the first line of cable sealing modules 300 and the termination bar 718 positioned above the second line of cable sealing modules 300. In certain examples, conductive shields of cables routed through the first line of cable sealing modules 300 are electrically connected to the termination bar 716 by grounding wires and conductive shields of cables routed through the second line of cable sealing modules 300 are electrically connected to the termination bar 718 by grounding wires. The openings 720 in the termination bars 716, 718 can align with openings 741 defined by termination bar supports 723 of the inner pressurization member 42. Fasteners such as screws can extend through the openings 720 and thread into the openings 741 to secure the termination bars 716, 718 to the inner pressurization member 42 and to connect grounding wires to the termination bars 716, 718. The furcation member 714 can extend through slots 725 defined by the inner pressurization member 42. In one example, the main leg 710 and the secondary leg 712 can extend along the major axis A1 and the furcation member 714 can extend along the minor axis A2.

Figure 27:
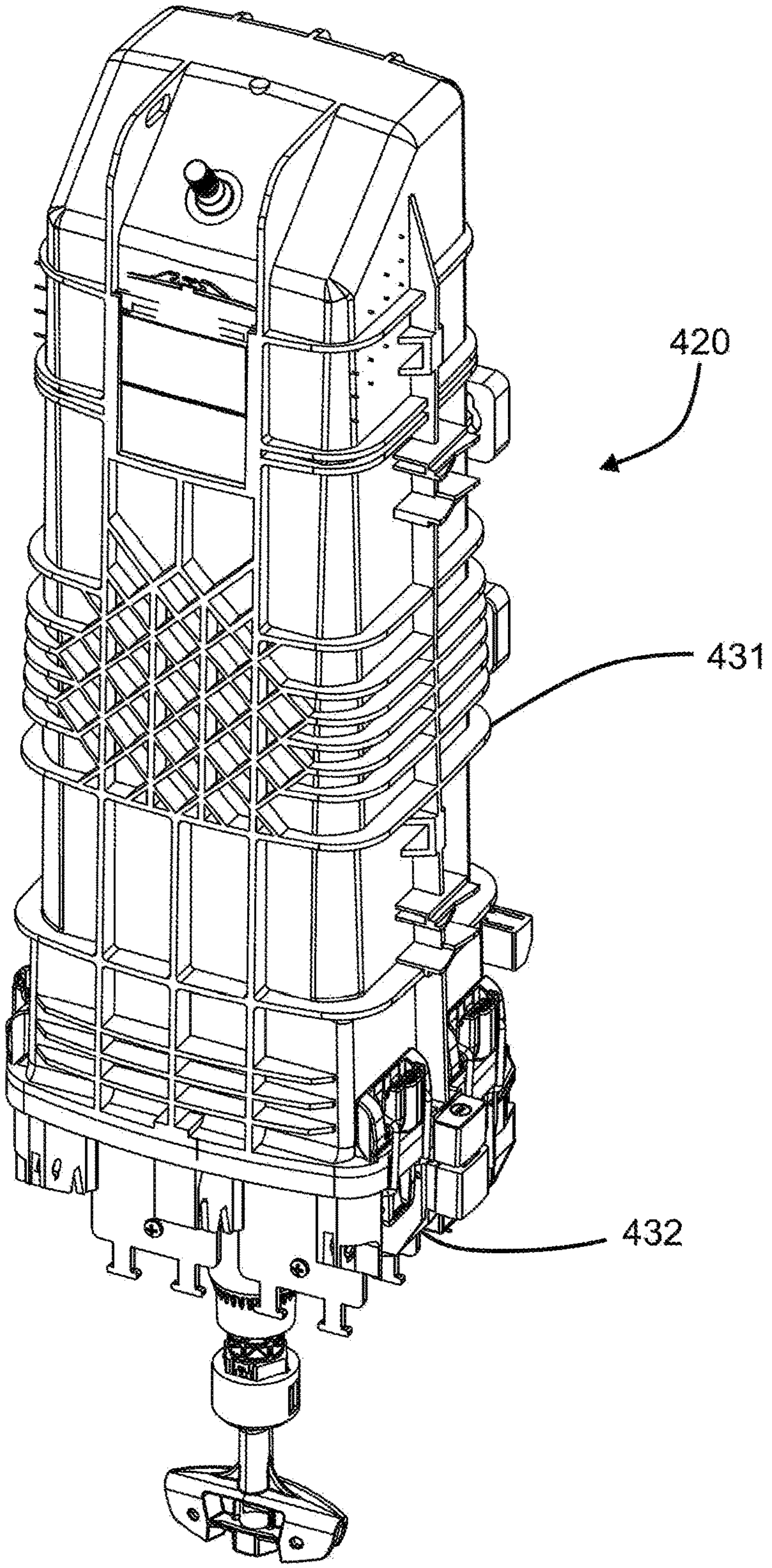
FIG. 27 is a perspective view of another enclosure in accordance with the principles of the present disclosure.
Figure 28:
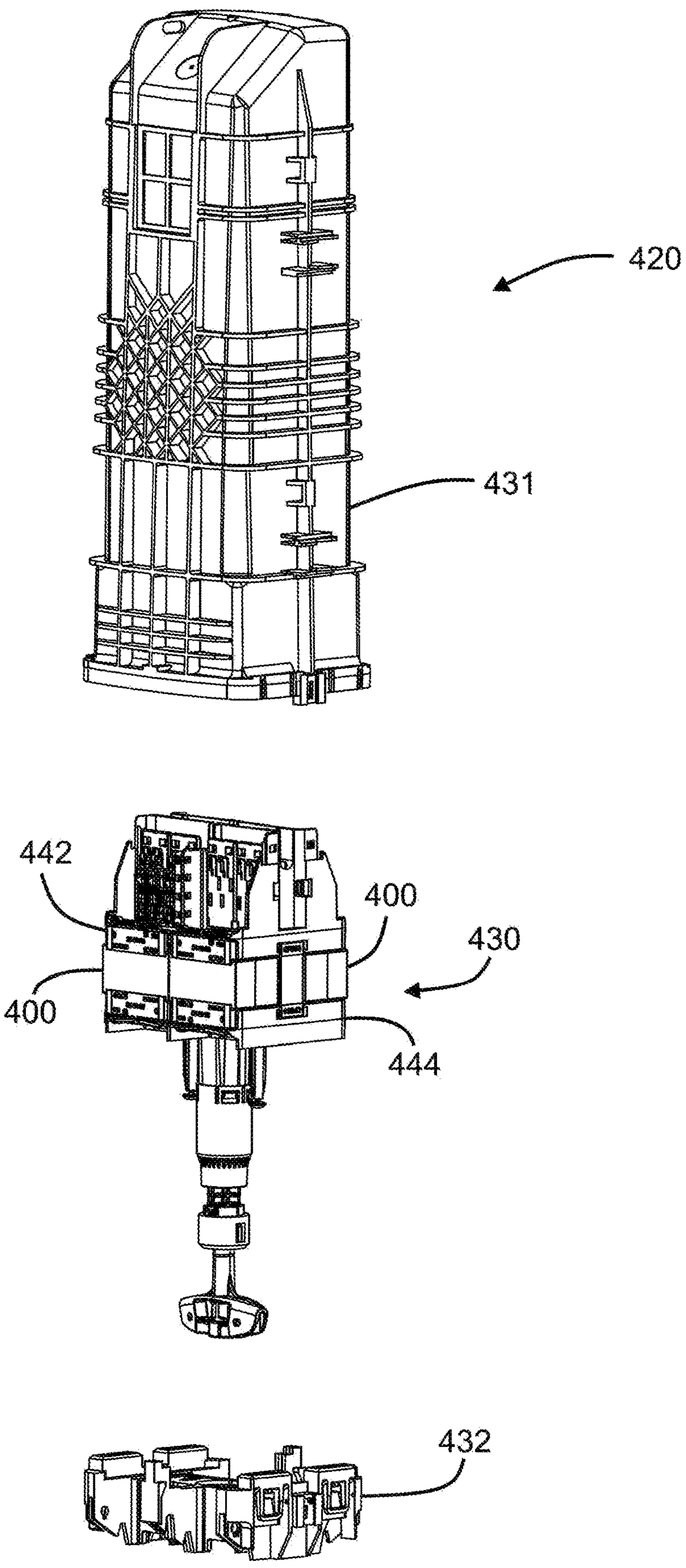
FIG. 28 is an exploded view of the enclosure of FIG. 27.
Figure 33:
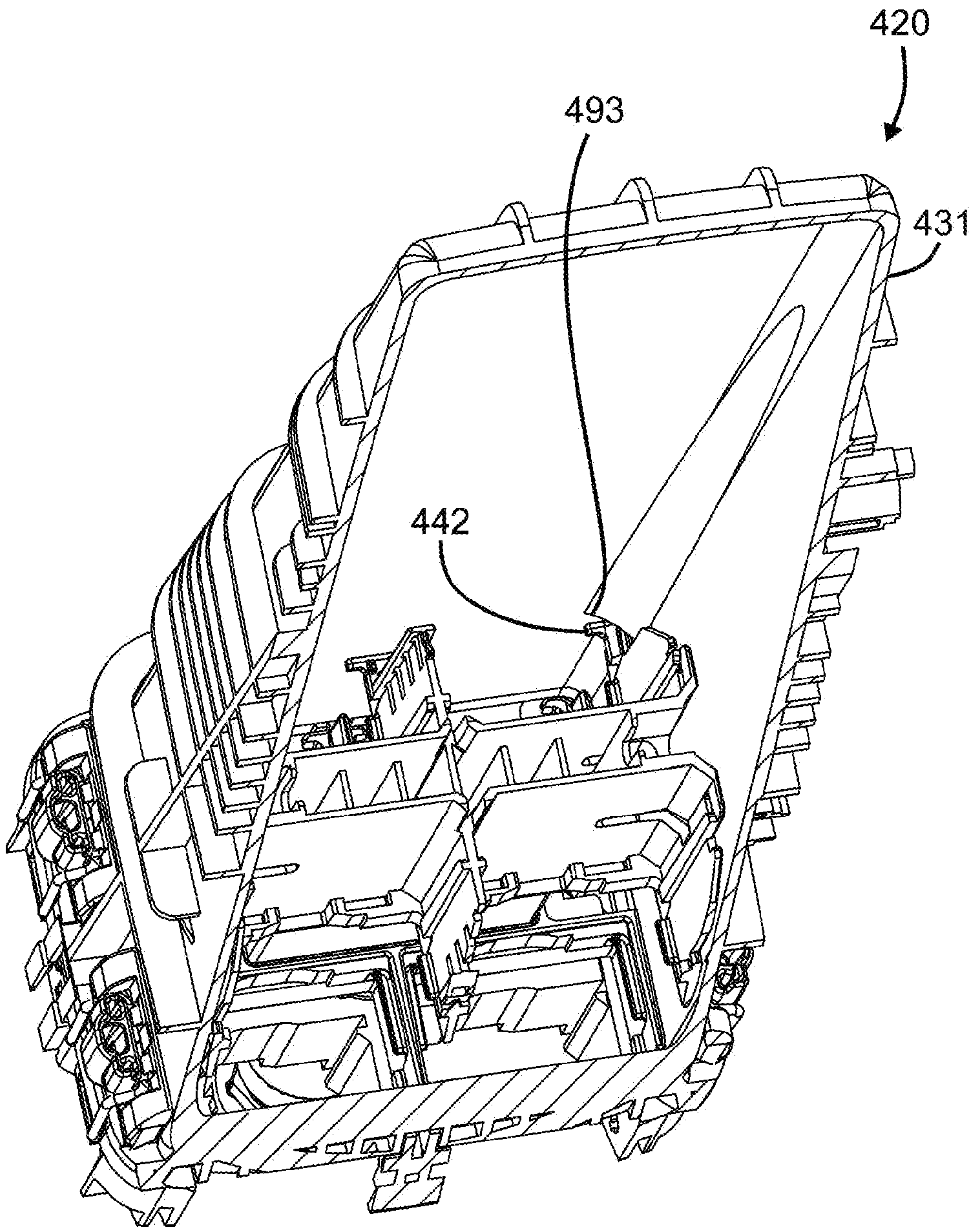
FIG. 33 is a cross-sectional view of the enclosure of FIG. 27 cut through a cover of the enclosure.

FIGS. 27 and 28 depict another enclosure 420 in accordance with the principles of the present disclosure. The enclosure 420 includes a housing having a cover 431 (e.g., a dome-style cover) and a base 432 adapted to latch to an open end of the cover 431. The enclosure 420 also includes a sealing unit 430 adapted to be loaded directly into the cover 431 through the open end of the cover 431. The base 432 is adapted to capture and retain a sealing portion of the sealing unit 430 within the cover 431. The sealing portion of the sealing unit 430 can include a plurality of sealing modules 400 adapted to be loaded between inner and outer pressurization structures 442, 444 (e.g., pressurization frames, pressurization members, etc.) of the sealing unit 430. Each of the sealing modules 400 can include a volume of sealant such as sealing gel for sealing about cables or grounding members routed into the interior of the enclosure 420 and forming a seal with respect to an interior surface of the cover 431 that extends about a perimeter of the sealing portion of the sealing unit 430. As shown at FIGS. 33-35, the inner and outer pressurization structures 442, 444 are captured within the cover 431 between one or more first stops 491 defined by the base 432 and one or more second stops 493 defined within the interior of the cover 431. It will be appreciated that an axial spacing between the first and second stops 491, 493, is fixed when the base 432 is latched to the cover 431. When the sealing portion of the sealing unit 430 is fully pressurized within the cover 431, an axial spacing between inner and outer stop contact surfaces 494, 495 respectively defined by the inner and outer pressurization structures 442, 444 is less than (e.g., at least 1 millimeter (mm) less than, or at least 2 mm less than, or at least 3 mm less than, or at least 4 mm less than, or at least 5 mm less than, or at least 10 mm less than) the fixed axial spacing between the first and second stops 491, 493. Therefore, when the sealing unit is pressurized, the inner and outer pressurization structures 442, 444 can float together in an axial orientation relative to the base 432 and the cover 431 in response to pressure changes between an interior of the enclosure and an exterior of the enclosure. The amount the inner and outer pressurization structures can float coincides with the difference in magnitude between the axial spacings.

Figure 29:
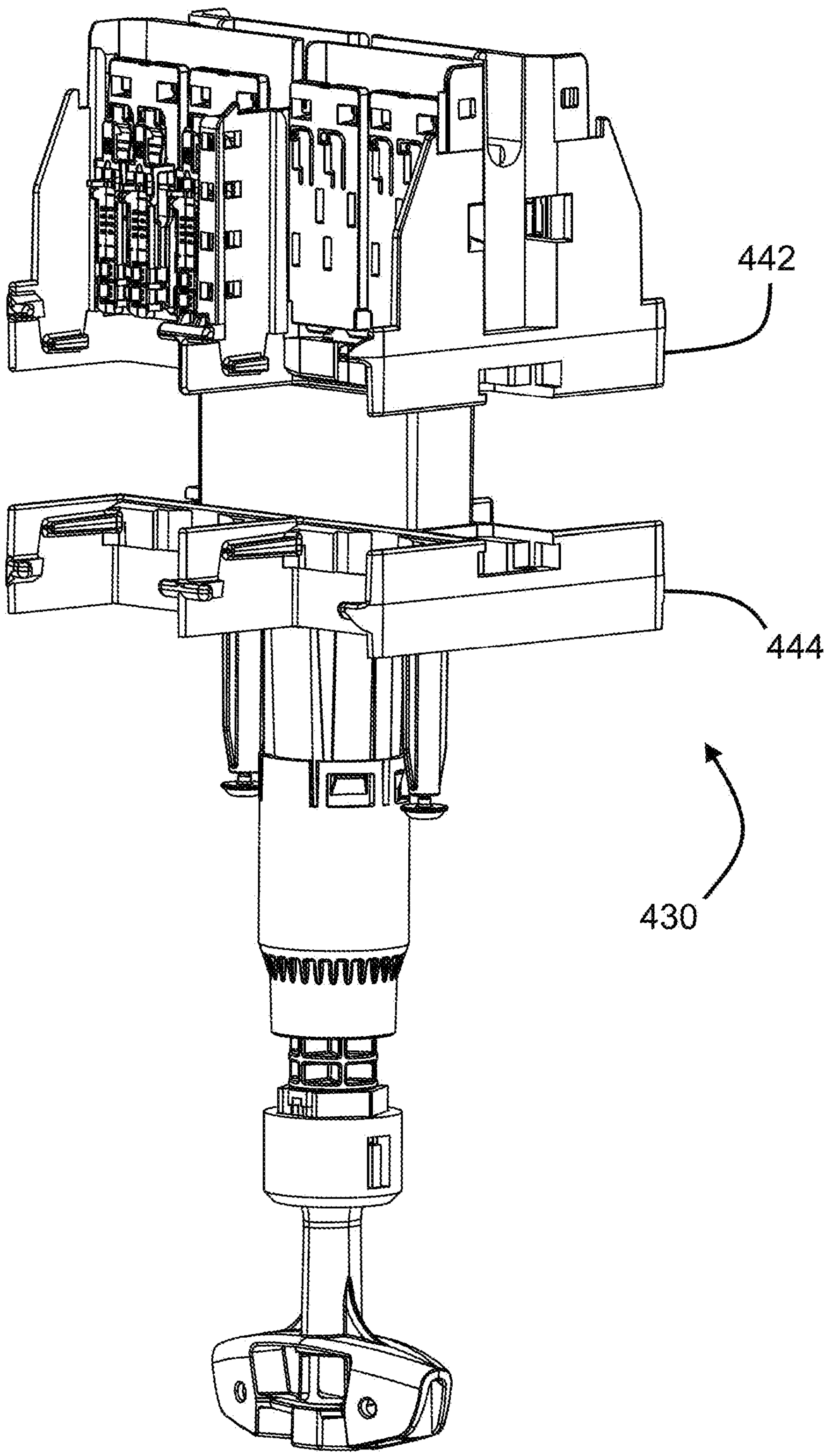
FIG. 29 is a perspective view of a sealing unit of the enclosure of FIG. 27 with sealing modules of the sealing unit removed.
Figure 30:
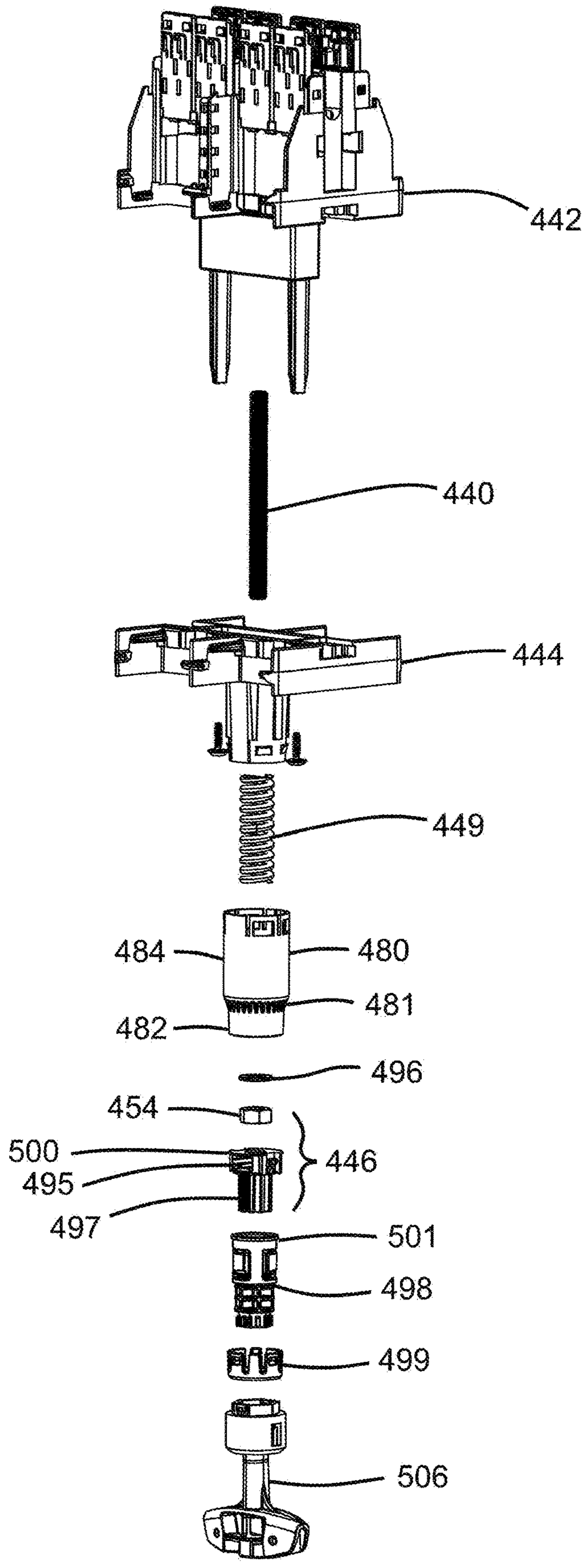
FIG. 30 is an exploded view of the sealing unit of FIG. 29.

Referring to FIGS. 29 and 30, the sealing unit 430 includes an actuation arrangement for biasing the inner and outer pressurization structures 442, 444 together to pressurize the sealant of the sealing unit 430 within the cover 431, and for depressurizing the sealing unit if it is desired to remove the sealing unit 430 from the cover 431 (e.g., to add cables through the sealing portion of the sealing unit 430). The actuation arrangement includes an actuator shaft 440 having exterior threads. The actuator shaft 440 can have one and fixed relative to the inner pressurization structure 442 and can be configured to pass through the outer pressurization structure 442. A linear drive component 446 including a main drive body 495 and a drive nut 454 is threadably mounted on the actuator shaft 440. The linear drive component 446 is threaded on the actuator shaft 440 to selectively compress or decompress a spring 449 used to bias the inner and outer pressurization structures 442, 444 together when compressed. A washer 496 can be provided between an end of the spring 449 and the drive nut 454 and the spring 449 can be positioned around the actuator shaft 440. The main drive body 495 transfers torque to the drive nut 454 and includes exterior ratchet teeth 497. A rotational drive component 498 is mounted on an carried with the main drive body 495. A retention sleeve 499 can be used to secure rotational drive component 498 to the main drive body 495 such that the rotational drive component 498 is axially carried with the main drive body 495 but also allows the rotational drive component 498 to rotate relative to the main drive body 495 when the actuation arrangement is in a non-torque transfer mode. In one example, the retention sleeve 499 can be secured to a head 500 of the main drive body 495 by a snap-fit connection (e.g., flexible latches of the retention sleeve 499 can engage catches on the head 500) and an end flange 501 of the main drive body 495 can be captured within the retention sleep 499 and retained adjacent to the head 500 of the main drive body 495.

Figure 32:
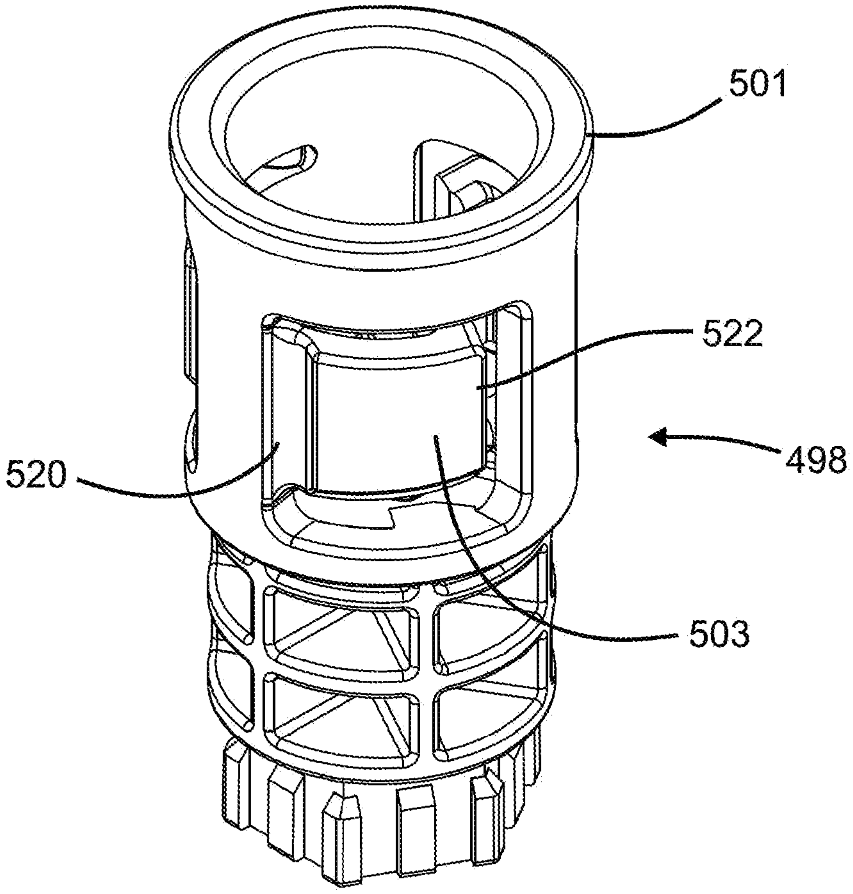
FIG. 32 is a perspective view of a rotational drive component of the actuation arrangement of the sealing unit of FIG. 30.

The rotational drive component 498 includes resilient ratchet cantilevers 503 having ratchet teeth that engage the exterior ratchet teeth 497 of the main drive body 495. The resilient ratchet cantilevers 503 are arranged to extend in a circumferential direction about an axis defined by the actuator shaft 440. As shown at FIG. 32, the resilient ratchet cantilevers 503 extend circumferentially about the axis as the ratchet cantilevers 503 extend from base ends 520 to free ends 522 of the resilient ratchet cantilevers 503. Ratchet teeth for engaging the ratchet teeth 497 are provided at the free ends 522 and the cantilevers 503 are configured to flex relative to the main body of the rotational drive component 498 at the base ends 520 to allow the ratchet teeth of the cantilevers 503 to ride over the ratchet teeth 497 when the cantilevers are not radially constrained by a sleeve 480.

Sleeve 480 is positioned over the rotational drive component 498. In one example, an inner end of the sleeve 480 can connect to the outer pressurization structure 442 by a snap-fit connection and is axially fixed relative to the outer pressurization structure 444. The sleeve 480 includes a reduced cross-dimension portion 482 and an increased cross-dimension portion 484 separated by a radial step 481. The resilient ratchet cantilevers 503 are configured to directly engage an interior of the sleeve 480. Similar to previously described examples, the actuation arrangement is configured to transition from a torque-transfer mode to a non-torque transfer mode when the cantilevers 503 move axially inwardly past the radial step 481 so as to be no longer radially confined/constrained by the reduced cross-dimension portion 482 of the sleeve 480. Other than the cantilevers 503 being arranged in a circumferential orientation relative to the actuator shaft axis and the cantilevers 503 directly contacting the interior of the sleeve 480 (i.e., no intermediate constraint cantilevers are provided), the actuation arrangement of FIG. 30 operates in the same way as previously described examples to selectively pressurize and depressurized the sealant of the cable sealing unit 430.

Figure 31:
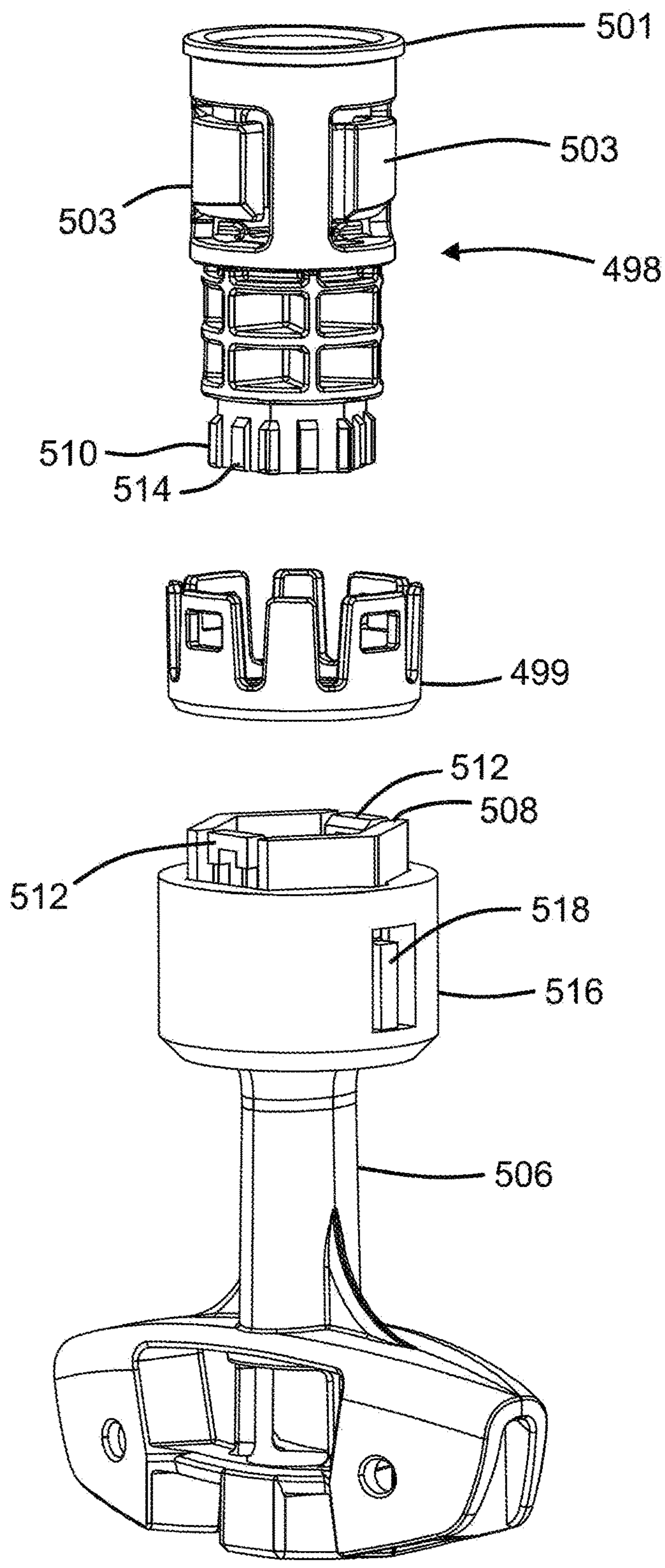
FIG. 31 is an enlarged view of a portion of an actuation arrangement of the sealing unit of FIG. 30.

An outer axial end of the rotational drive component 498 is adapted to be detachably connected to a torque driver for applying torque to the rotational drive component 498 for rotating the rotational drive component 498 about the axis of the actuator shaft. The torque driver can be a wrench, power driver or other type of torque transfer device. As depicted, the torque driver includes a handle 506 having a torque transfer interface 508 (e.g., depicted as a socket) adapted to snap over a corresponding torque transfer interface 510 (e.g., depicted as a polygonal end portion) of the rotational drive component 498. In the depicted example of FIG. 31, latches 512 at the torque transfer interface 508 snap over projections 514 provided at an exterior of the torque transfer interface 510. A retention collar 516 is positioned on the handle 506 and is secured to the handle 506 by a latching arrangement 518. When the retention collar 516 is latched in place relative to the handle 506, the retention collar 516 covers at least a portion of the torque transfer interface 508 and prevents the latches 512 from disengaging from the projections 514. By unlatching the retention collar 516 from the handle 506, the handle 506 can be disengaged from the rotational drive component 498 by disengaging the snap fit connection between the torque transfer interfaces 508, 510.

Figure 36:
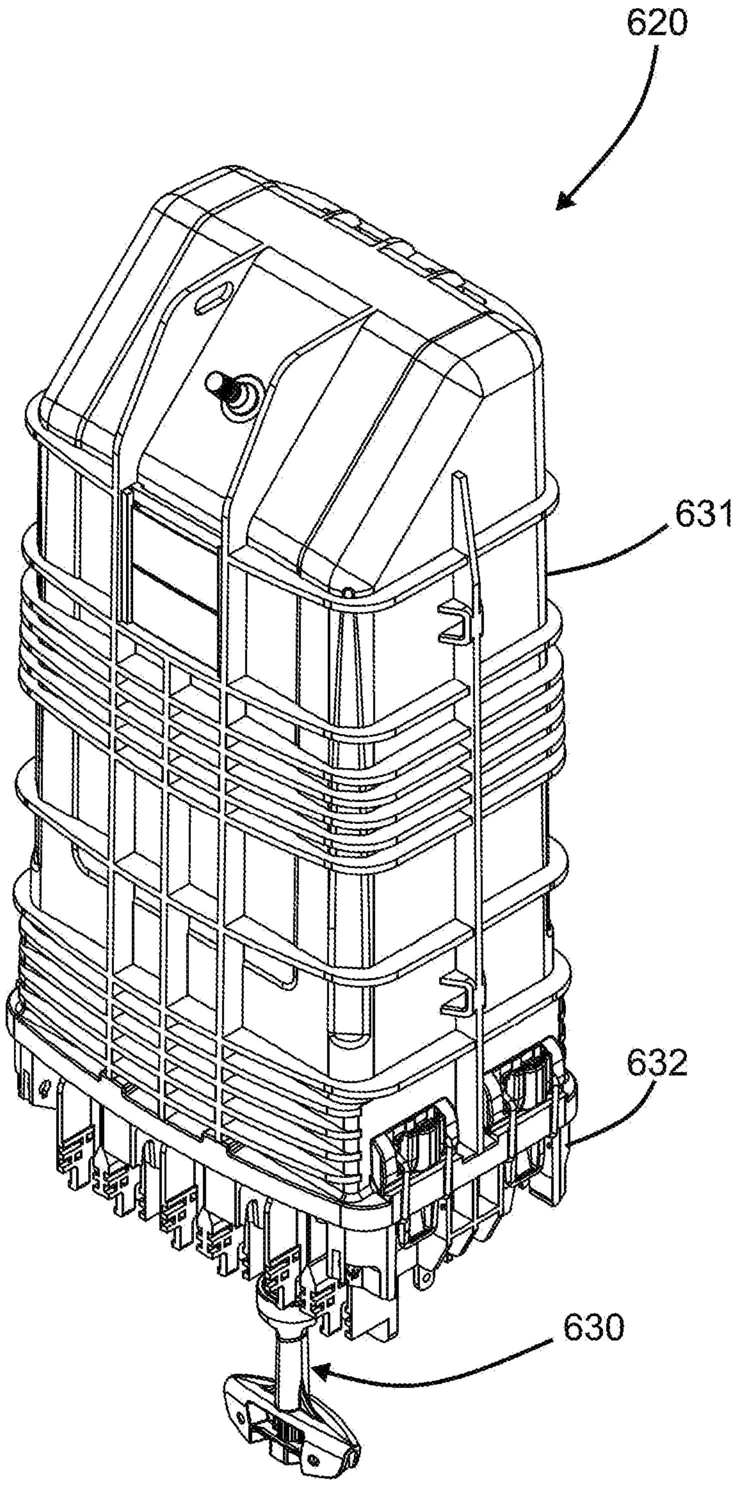
FIG. 36 is a perspective view of a further enclosure in accordance with the principles of the present disclosure.
Figure 37:
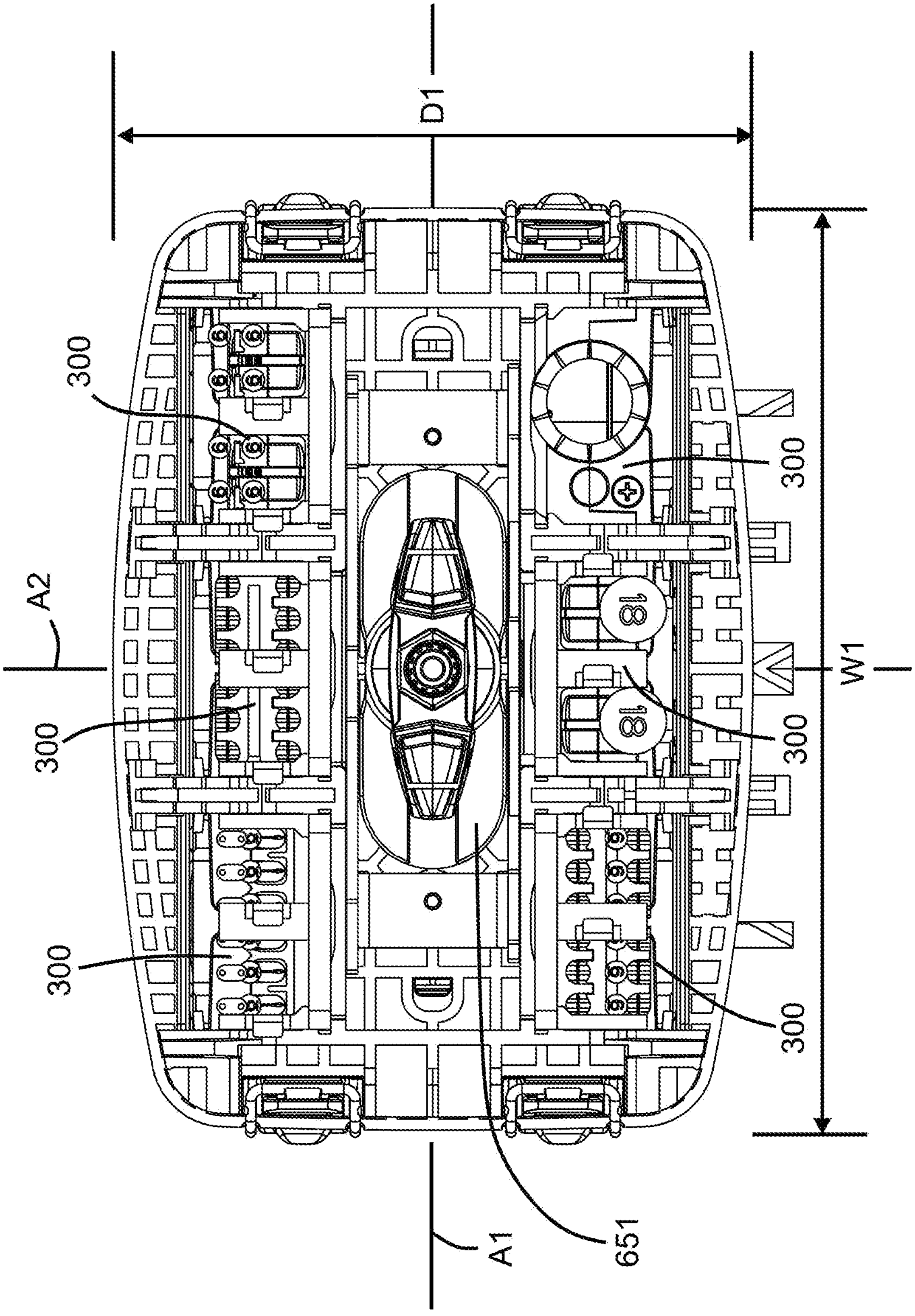
FIG. 37 is a bottom view of the enclosure of FIG. 36.
Figure 38:
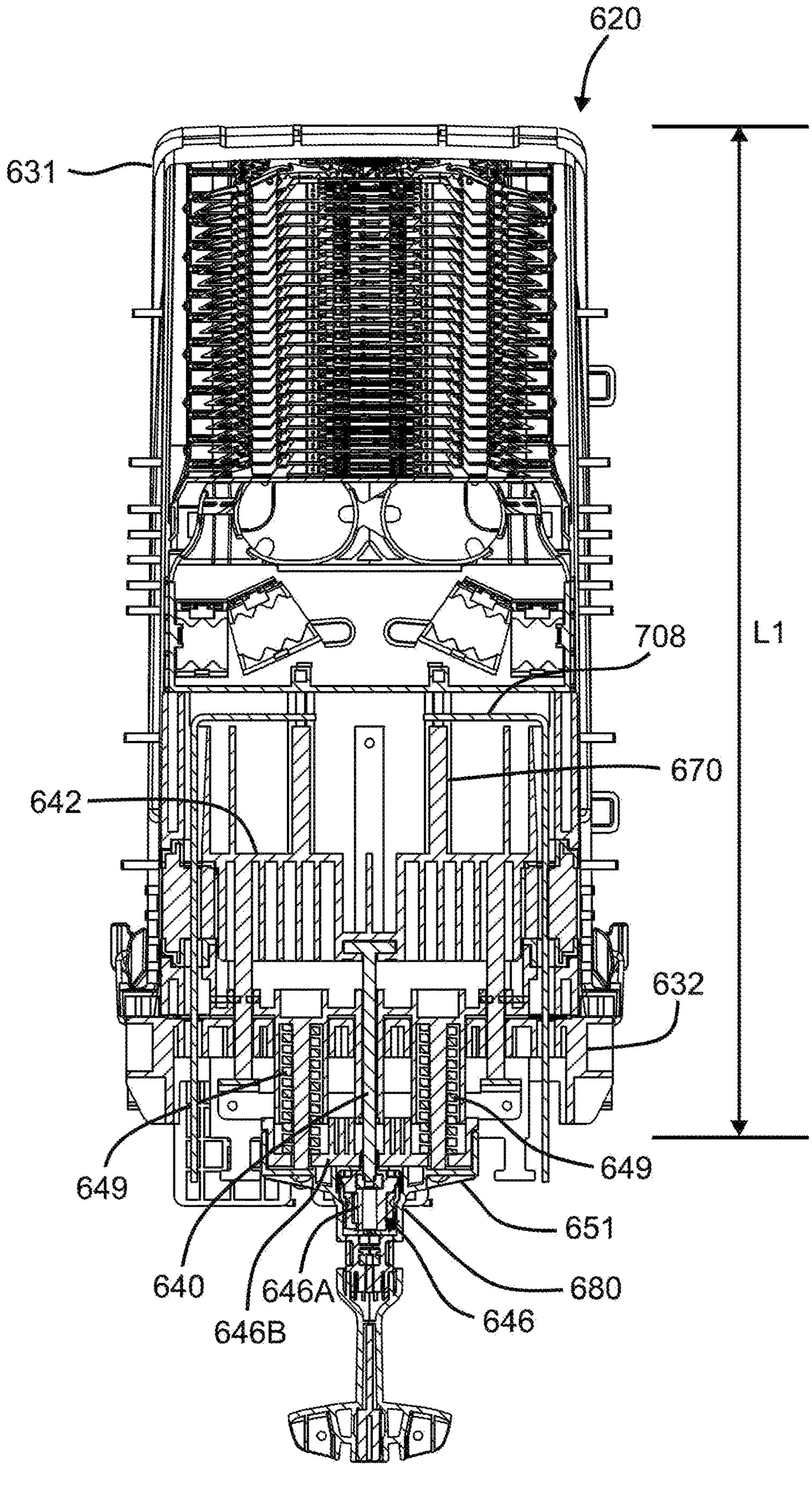
FIG. 38 is a cross-sectional view of the enclosure of FIG. 36.

Referring to FIGS. 36-38, another enclosure 620 in accordance with the principles of the present disclosure is depicted. Similar to previous embodiments disclosed herein, the enclosure 620 includes a cover 631 (e.g., a dome-style cover), a sealing unit 630 that fits directly within an open end of the cover 631, and a base 632 that fastens (e.g., latches) to the open end of the cover to retain the sealing unit 630 in the cover 631. The enclosure 620 is a larger, higher capacity enclosure than the previously described example enclosures and has a larger sealing portion. To distribute spring load across the sealant of the enlarged sealing portion, multiple springs 649 are provided for applying spring load to the sealant as compared to having only one centrally located spring. As depicted, two springs 649 are provided offset from a central actuator shaft 640 of the actuation arrangement of sealing unit 630. The enclosure 620 has a length L1, width W1, and a depth D1. The major axis A1 extends along the width W1 and the minor axis A2 extends along the depth D1. The length L1 is larger than the width W1 and the width W1 is larger than the depths D1. The springs 649 are positioned along a reference plane that extends along the width W and the length L and that bisects the depth D. The reference plane can include the major axis A1. Sets of cable sealing modules 300 each include three or more cable sealing modules can be positioned on opposite sides of the major axis A1. Similar to previous examples, the actuation arrangement of the sealing unit 630 includes a slip-ratchet arrangement that mounts on an actuator shaft 640 and includes a linear drive component 646. The linear drive component 646 includes a rotational portion 646A that is threaded on the actuator shaft 640 and a non-rotational portion 646B that moves axially with the rotational portion 646A but does not rotate with the rotational portion 646A. The non-rotational portion 646B is elongate along the width W of the enclosure and that is adapted to concurrently engage both the springs 649 such that the springs 649 are compressed as the rotational portion 646A of the linear drive component 646 is rotated in the pressurization direction on the actuator shaft 640.

In certain examples, springs can also be positioned along a reference plane that extends along the minor axis A2. The springs can be offset from the actuator shaft 640. In the case where sets of springs are provided along both axes A1, A2, the non-rotational portion 646B can be cross-shaped with each leg of the cross being configured for compressing one of the springs. In such examples, the width W and the depth D can be equal so the that axes A1, A2 are not minor or major axes.

The actuation arrangement is contained at least partially within an actuator cover 651 that is fastened to an outer pressurization member 642 of the sealing unit 630. The outer pressurization member 644 cooperates with an inner pressurization member 642 pressurize the sealant of the sealing unit 630 when the springs 649 are compressed by the actuator arrangement. The actuator cover 651 is elongate along the width W of the enclosure 620 and includes a sleeve portion 680 that provides a constraining function of the ratchet arrangement when the actuation arrangement is in the first torque-transfer mode (e.g., the bi-directional drive mode). The actuator cover 651 includes a constraining portion defined by the sleeve portion 680 constraining the ratchet arrangement such it operates in the first torque-transfer mode and a non-constraining portion that does not constrain the rational arrangement such that it operates in the second torque-transfer mode (e.g., the one-way slip mode). As depicted at FIG. 38, the electrical grounding structure 708 is fastened to a support 670 of the inner pressurization member 642. An additional support 670 is also provided for attaching an additional one of the electrical grounding structures 708 to the inner pressurization member 642. The supports 670 and the electrical grounding structures 708 can be symmetrically arranged on opposite sides of the minor axis A2.

In certain examples, an exterior ratchet structure (e.g., rotational drive component 498 or like structures disclosed herein) can function as a torque input structure for applying torque to the linear drive component for rotating the linear drive component relative to the threaded actuator shaft. In these examples, the ratchet arrangement between the torque input structure and the linear drive component can be used to transition the actuation arrangement between a bi-directional torque transfer mode and a one-directional torque-transfer mode depending upon whether the ratchet arrangement is radially constrained or not. In this example, when in the one-direction torque-transfer mode, continued rotation of the torque input structure (e.g., the rotation drive component 498) in a pressurization direction does not cause further rotation of the linear drive component in the pressurization direction (e.g., the ratchet arrangement slips). In another example, the torque input structure can be a structure for driving rotation of the linear drive component that does not slip (e.g., a handle, wrench, power driver or other structure can directly drive the linear drive component without an intermediate ratchet arrangement) and that always allows for bi-directional rotation of the linear drive component. In such an example, over-compression of the sealant can be prevented by providing a non-threaded section on the actuator shaft at a position corresponding to a desired maximum compression of the sealant. When the linear drive component reaches the non-threaded section of the actuation shaft, continued rotation of the torque input structure and the linear drive component in the pressurization direction does not cause further inward axial movement of the linear drive component. When the linear drive component is at the non-threaded section, the spring being compressed by movement of the linear drive component to pressurize the sealant can bias the linear drive component toward the threaded section of the actuator shaft such that rotation of the linear drive component in the de-pressurization direction will cause the linear drive component to re-engage the threaded section and move in an axial outward direction to de-compress the spring. An example of this type of configuration is disclosed by U.S. Provisional Application No. 63/435,681 which is hereby incorporated by reference in its entirety.

As used herein, de-pressurize means to reduce the pressure and pressurize means to increase the pressure.

It will be appreciated that a variety of different material types can be used as a sealant. Example materials include elastomers, including natural or synthetic rubbers. In still other embodiments, the sealant comprise gel and/or gel combined with another material such as an elastomer. The gel may, for example, comprise silicone gel, urea gel, urethane gel, thermoplastic elastomeric gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof).

Example Aspects

Aspect 1. An enclosure comprising:

- a housing defining an opening into an interior of the housing;
- a cable sealing unit that mounts within the opening for sealing about one or more cables desired to be routed into the interior of the housing through the opening, the cable sealing unit including:
  - a) an actuator shaft that includes exterior threads, the actuator shaft defining a shaft axis that extends through the opening into the interior of the housing when the cable sealing unit is mounted within the opening;
  - b) inner and outer sealant pressurization members;
  - c) sealant adapted to be pressurized between the inner and outer pressurization members;
  - d) a linear drive component mounted on the actuator shaft, the linear drive component including a drive nut including interior threads that mate with the exterior threads of the actuator shaft, wherein rotation of the linear drive component in a first rotational direction about the actuator shaft drives the linear drive component axially in a sealant pressurization direction along the shaft axis, and wherein rotation of the linear drive component in a second rotational direction about the actuator shaft drives the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis;

e) a handle mounted to be axially carried with the linear drive component as the linear drive component moves axially along the shaft axis; and f) a ratchet arrangement defined between the handle and the linear drive component, the ratchet arrangement being operable in a first torque-transfer mode and a second torque-transfer mode, the ratchet arrangement being configured to allow the handle to drive the linear drive component in the first and second rotational directions relative to the actuator shaft when in the first torque-transfer mode; and the ratchet arrangement being configured to allow the handle to drive the linear drive component only in second rotational direction and not in the first rotational direction relative to the actuator shaft when in the second torque-transfer mode.

Aspect 2. The enclosure of Aspect 1, wherein the ratchet arrangement transitions from the first torque-transfer mode to the second torque-transfer mode when the sealant reaches a predetermined pressurization level.

Aspect 3. The enclosure of Aspect 1, wherein the actuator shaft has an inner end non-rotatably connected to the inner pressurization member, wherein the actuator shaft extends through the outer pressurization member, wherein a spring is mounted on the actuator shaft axially between the linear drive component and the outer pressurization member, and wherein the spring is compressed between the outer pressurization member and the linear drive component when the linear drive component is moved in the sealant pressurization direction thereby causing the actuator shaft to be tensioned and pressurization loading to be applied to the sealant by the inner and outer pressurization members.

Aspect 4. The enclosure of Aspect 1, wherein the actuator shaft has an inner end non-rotatably connected to the inner pressurization member, wherein the actuator shaft extends through the outer pressurization member, wherein a spring is mounted on the actuator shaft axially between the linear drive component and the outer pressurization member, and wherein the spring is compressed between the outer pressurization member and the linear drive component when the linear drive component is moved in the sealant pressurization direction thereby causing the actuator shaft to be tensioned and the inner and outer pressurization members be forced together.

Aspect 5. The enclosure of Aspects 3 or 4, wherein the ratchet arrangement transitions from the first torque-transfer mode to the second torque-transfer mode when the spring reaches a predetermined amount of axial compression.

Aspect 6. The enclosure of Aspect 5, further comprising a sleeve positioned around the shaft, the spring, the linear drive component and a portion of the handle, the sleeve having a first portion for constraining outward radial movement of the ratchet arrangement such that the ratchet arrangement operates in the first torque-transfer mode and a second portion for allowing outward radial movement of the ratchet arrangement such that the ratchet arrangement operates in the second torque-transfer mode, wherein the ratchet arrangement is adapted to move axially relative to the sleeve to transition between the first and second torque-transfer modes, and wherein the first portion of the sleeve being located axially outwardly with respect to the second portion of the sleeve.

Aspect 7. The enclosure of Aspect 6, wherein the first portion of the sleeve has a first interior cross-dimension, and the second portion of the sleeve has a second interior cross-dimension, the first interior cross-dimension being smaller than the second interior cross-dimension.

Aspect 8. The enclosure of Aspect 7, wherein the sleeve includes an interior radial step where an interior of the sleeve changes from the first cross-dimension to the second cross-dimension.

Aspect 9. The enclosure of Aspect 6, wherein an end of the sleeve is biased toward the outer pressurization member by the spring.

Aspect 10. The enclosure of Aspect 6, wherein the ratchet arrangement transitions from the first torque-transfer mode to the second torque transfer mode when the ratchet arrangement reaches an axial position relative to the sleeve in which the ratchet arrangement is no longer constrained by the first portion of the sleeve and is permitted to move radially outwardly by clearance space provided by the second portion of the sleeve.

Aspect 11. The enclosure of Aspect 8, wherein the ratchet arrangement includes first ratchet teeth carried with the linear drive component and second ratchet teeth carried with the handle, wherein the second ratchet teeth are positioned radially outside the first ratchet teeth, wherein the second ratchet teeth include resilient ratchet cantilevers that flex to allow each of the second ratchet teeth to move between an inward radial position and an outward radial position, and wherein the resilient ratchet cantilevers bias the second ratchet teeth toward the inward radial positions.

Aspect 12. The enclosure of Aspect 11, wherein the first and second ratchet teeth have locking engagement surfaces configured such that when the handle is rotated in the second rotational direction the first and second ratchet teeth engage each other in a manner that does not encourage the second ratchet teeth to ride over the first ratchet teeth regardless of whether the ratchet arrangement is in the first or second torque-transfer mode such that torque for rotating the linear drive component in the second rotational direction is transferrable from handle to the linear drive component regardless of whether the ratchet arrangement is in the first or second torque-transfer mode, wherein the first and second ratchet teeth have ramp engagement surfaces configured such that when the handle is rotated in the first rotational direction the first and second ratchet teeth engage each other in a manner that encourages the second ratchet teeth to ride over the first ratchet teeth regardless of whether the ratchet arrangement is in the first or second torque-transfer mode, wherein when the handle is rotated in the first rotational direction while the ratchet arrangement is in the first torque-transfer mode radial constraint provided by the first portion of the sleeve prevents the second ratchet teeth from moving from the inward radial position to the outward radial position to ride over the first ratchet teeth such that torque for rotating the linear drive component in the first rotational direction is transferrable from handle to the linear drive component through the ratchet arrangement, and wherein when the handle is rotated in the first rotational direction while the ratchet arrangement is in the second torque-transfer mode radial clearance provided by the second portion of the sleeve allows the second ratchet teeth to move from the inward radial position to the outward radial position to ride over the first ratchet teeth such that torque for rotating the linear drive component in the first rotational direction is not transferrable from handle to the linear drive component through the ratchet arrangement.

Aspect 13. The enclosure of Aspect 11, wherein in the first torque-transfer mode the second ratchet teeth each remain in the inward radial position when the handle is rotated in the second rotational direction such that engagement between the first and second ratchet teeth transfers torque from the handle to the linear drive component to drive the linear drive component in the second rotational direction, wherein in the second torque-transfer mode the second ratchet teeth each remain in the inward radial position when the handle is rotated in the second rotational direction such that engagement between the first and second ratchet teeth transfers torque from the handle to the linear drive component to drive the linear drive component in the second rotational direction, wherein in the first torque-transfer mode radial constraint provided by the first portion of the sleeve prevents the second ratchet teeth from moving to the outward radial position when the handle is rotated in the first rotational direction such that engagement between the first and second ratchet teeth transfers torque from the handle to the linear drive component to drive the linear drive component in the first rotational direction, and wherein in the second torque-transfer mode radial clearance provided by the second portion of the sleeve allows the second ratchet teeth to move to the outward radial position when the handle is rotated in the first rotational direction such that the second ratchet teeth ride over the first ratchet teeth to prevent sufficient torque from being transferred from the handle to the linear drive component to drive the linear drive component in the first rotational direction.

Aspect 14. The enclosure of Aspect 12, wherein the linear drive component includes constraint cantilevers positioned radially between the ratchet cantilevers and the sleeve.

Aspect 15. The enclosure of Aspect 14, wherein the constraint cantilevers extend in an axial outward direction from base ends to free ends, and wherein the ratchet arrangement changes from the first torque-transfer mode to the second torque-transfer mode when the free ends of the constraint cantilevers move axially inwardly past the radial step of the sleeve.

Aspect 16. The enclosure of Aspect 15, wherein the ratchet cantilevers extend in an axial inward direction from base ends to free ends.

Aspect 17. The enclosure of Aspect 1, wherein the handle includes a first handle portion defining a ratchet feature of the ratchet arrangement, the first handle portion also including an axially outer end defining a first torque-transfer feature, the handle also including a second handle portion including a second torque-transfer feature that mates in torque-transmitting relation with respect to the first torque-transfer feature, the second handle portion being detachably secured to the first handle portion by a threaded fastener that threadingly engages the first handle portion and that extends axially through the second handle portion, wherein the second handle portion can be detached from the first handle portion by unthreading the threaded fastener from the first handle portion.

Aspect 18. The enclosure of Aspect 17, wherein the first torque-transfer feature is a male feature and the second torque transfer feature is a female feature.

Aspect 19. The enclosure of Aspect 17, wherein the rachet feature includes ratchet cantilevers for engaging ratchet teeth of the linear drive component.

Aspect 20. The enclosure of Aspect 17, wherein the second handle portion as a length that extends axially between a first end and a second end, wherein the second handle portion includes a hollow handle shaft that extends between the first and second ends, wherein the second torque-transfer feature is defined at the first end of the second handle portion, wherein the second handle portion includes an enlarged gripping portion at the second end of the second handle portion, wherein the enlarged gripping portion has an enlarged outer cross-dimension as compared to the hollow handle shaft, wherein the hollow handle shaft co-axially aligns with the actuator shaft when the second handle portion is secured to the first handle portion by the threaded fastener, and wherein the threaded fastener extends axially through the hollow handle shaft.

Aspect 21. The enclosure of Aspect 20, wherein the hollow handle shaft and the enlarged gripping portion cooperate to define a T-shaped outer profile.

Aspect 22. The enclosure of Aspect 20, wherein the enlarged gripping portion defines a pocket co-axially aligned with the hollow handle shaft, wherein a sleeve positioned within the pocket and can be rotated within the pocket relative to the enlarged gripping portion, wherein a head of the threaded fastener is contained in torque transmitting relation within an interior of the sleeve such that torque for turning the threaded fastener can be applied through the sleeve, and wherein the sleeve has an outer end portion that extends axially outwardly beyond the enlarged gripping portion.

Aspect 23. An enclosure comprising:

a housing defining an opening into an interior of the housing;

a cable sealing unit that mounts within the opening for sealing about one or more cables desired to be routed into the interior of the housing through the opening, the cable sealing unit including:

a) an actuator shaft that includes exterior threads, the actuator shaft defining a shaft axis that extends through the opening into the interior of the housing when the cable sealing unit is mounted within the opening;

b) inner and outer sealant pressurization members;

c) sealant adapted to be pressurized between the inner and outer pressurization members;

d) a linear drive component mounted on the actuator shaft such that rotation of the linear drive component in a first rotational direction about the actuator shaft drives the linear drive component axially in a sealant pressurization direction along the shaft axis, and rotation of the linear drive component in a second rotational direction about the actuator shaft drives the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis; and e) a handle for driving rotation of the linear drive component, the handle including a first handle portion including an axially inner end for transferring torque to the linear drive component, the first handle portion also includes an axially outer end defining a first torque-transfer feature, the handle also includes a second handle portion including a second torque-transfer feature that mates in torque-transmitting relation with respect to the first torque-transfer feature, the second handle portion is detachably secured to the first handle portion by a threaded fastener that threadingly engages the first handle portion and that extends axially through the second handle portion, wherein the second handle portion can be detached from the first handle portion by unthreading the threaded fastener from the first handle portion.

Aspect 24. The enclosure of Aspect 23, wherein the first torque-transfer feature is a male feature and the second torque-transfer feature is a female feature.

Aspect 25. The enclosure of Aspect 23, wherein the second handle portion as a length that extends axially between a first end and a second end, wherein the second handle portion includes a hollow handle shaft that extends between the first and second ends, wherein the second torque-transfer feature is defined at the first end of the second handle portion, wherein the second handle portion includes an enlarged gripping portion at the second end of the second handle portion, wherein the enlarged gripping portion has an enlarged outer cross-dimension as compared to the hollow handle shaft, wherein the hollow handle shaft co-axially aligns with the actuator shaft when the second handle portion is secured to the first handle portion by the threaded fastener, and wherein the threaded fastener extends axially through the hollow handle shaft.

Aspect 26. The enclosure of Aspect 25, wherein the hollow handle shaft and the enlarged gripping portion cooperate to define a T-shaped outer profile.

Aspect 27. The enclosure of Aspect 25, wherein the enlarged gripping portion defines a pocket co-axially aligned with the hollow handle shaft, wherein a sleeve is positioned within the pocket and can be rotated within the pocket relative to the enlarged gripping portion, wherein a head of the threaded fastener is contained in torque transmitting relation within an interior of the sleeve such that torque for turning the threaded fastener can be applied through the sleeve, and wherein the sleeve has an outer end portion that extends axially outwardly beyond the enlarged gripping portion.

Aspect 28. An enclosure comprising:

a dome including a dome body having a unitary, one-piece molded plastic construction that extends between an open end and a closed end;

a cable sealing unit that mounts within the open end of the dome body, the cable sealing unit including:

a) inner and outer sealant pressurization members;

b) sealant adapted to be pressurized between the inner and outer pressurization members for providing cable sealing for also providing radial sealing with an interior surface of the dome body;

c) an actuator for moving at least one of the first and second pressurization members to pressurize the sealant; and d) a base frame arrangement for retaining the cable sealing unit in the dome, the base frame arrangement including a dome seating arrangement including a plurality of dome seat locations for supporting the open end of the dome body at intermittent locations about a perimeter of the dome body.

Aspect 29. The enclosure of Aspect 28, wherein the base frame arrangement includes projections that fit axially into receptacles defined by a wall of the dome body at the open end of the dome body, the projections being located adjacent at least some of the dome seat locations.

Aspect 30. The enclosure of Aspect 28, further comprising latches that engage the dome body and the base frame arrangement for securing the sealing unit in the open end of the dome body.

Aspect 31. The enclosure of Aspect 30, wherein the base frame retains the inner and outer pressurization members within the dome body while allowing the inner and outer pressurization members, when in a state in which the sealant is pressurized, to move axially relative to the base frame and the dome body in response to relative pressure changes between the inside and the outside of the enclosure.

Aspect 32. An enclosure comprising:

a housing defining an opening into an interior of the housing;

a cable sealing unit that mounts within the opening for sealing about one or more cables desired to be routed into the interior of the housing through the opening, the cable sealing unit including:

a) an actuator shaft that includes exterior threads, the actuator shaft defining a shaft axis that extends through the opening into the interior of the housing when the cable sealing unit is mounted within the opening;

b) inner and outer sealant pressurization members;

c) sealant adapted to be pressurized between the inner and outer pressurization members;

d) a linear drive component mounted on the actuator shaft, the linear drive component including a drive nut including interior threads that mate with the exterior threads of the actuator shaft, wherein rotation of the linear drive component in a first rotational direction about the actuator shaft drives the linear drive component axially in a sealant pressurization direction along the shaft axis, and wherein rotation of the linear drive component in a second rotational direction about the actuator shaft drives the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis;

e) a rotational drive component mounted to be axially carried with the linear drive component as the linear drive component moves axially along the shaft axis; and f) a ratchet arrangement defined between the rotational drive component and the linear drive component, the ratchet arrangement being operable in a first torque-transfer mode and a second torque-transfer mode, the ratchet arrangement being configured to allow the rotational drive component to drive the linear drive component in the first and second rotational directions relative to the actuator shaft when in the first torque-transfer mode; and the ratchet arrangement being configured to allow the rotational drive component to drive the linear drive component only in second rotational direction and not in the first rotational direction relative to the actuator shaft when in the second torque-transfer mode.

Aspect 33. The enclosure of Aspect 32, wherein the actuator shaft has an inner end non-rotatably connected to the inner pressurization member, wherein the actuator shaft extends through the outer pressurization member, wherein a spring is mounted on the actuator shaft axially between the linear drive component and the outer pressurization member, and wherein the spring is compressed between the outer pressurization member and the linear drive component when the linear drive component is moved in the sealant pressurization direction thereby causing the actuator shaft to be tensioned and pressurization loading to be applied to the sealant by the inner and outer pressurization members.

Aspect 34. The enclosure of Aspect 32, wherein the actuator shaft has an inner end non-rotatably connected to the inner pressurization member, wherein the actuator shaft extends through the outer pressurization member, wherein a spring is mounted on the actuator shaft axially between the linear drive component and the outer pressurization member, and wherein the spring is compressed between the outer pressurization member and the linear drive component when the linear drive component is moved in the sealant pressurization direction thereby causing the actuator shaft to be tensioned and the inner and outer pressurization members be forced together.

Aspect 35. The enclosure of Aspects 33 or 34, wherein the ratchet arrangement transitions from the first torque-transfer mode to the second torque-transfer mode when the spring reaches a predetermined amount of axial compression.

Aspect 36. The enclosure of Aspect 35, further comprising a sleeve positioned around the shaft, the spring, the linear drive component and a portion of the rotational drive component, the sleeve having a first portion for constraining outward radial movement of the ratchet arrangement such that the ratchet arrangement operates in the first torque-transfer mode and a second portion for allowing outward radial movement of the ratchet arrangement such that the ratchet arrangement operates in the second torque-transfer mode, wherein the ratchet arrangement is adapted to move axially relative to the sleeve to transition between the first and second torque-transfer modes, and wherein the first portion of the sleeve being located axially outwardly with respect to the second portion of the sleeve.

Aspect 37. The enclosure of Aspect 36, wherein the first portion of the sleeve has a first interior cross-dimension, and the second portion of the sleeve has a second interior cross-dimension, the first interior cross-dimension being smaller than the second interior cross-dimension.

Aspect 38. The enclosure of Aspect 37, wherein the sleeve includes an interior radial step where an interior of the sleeve changes from the first cross-dimension to the second cross-dimension.

Aspect 39. The enclosure of Aspect 36, wherein an end of the sleeve is biased toward the outer pressurization member by the spring.

Aspect 40. The enclosure of Aspect 36, wherein the ratchet arrangement transitions from the first torque-transfer mode to the second torque transfer mode when the ratchet arrangement reaches an axial position relative to the sleeve in which the ratchet arrangement is no longer constrained by the first portion of the sleeve and is permitted to move radially outwardly by clearance space provided by the second portion of the sleeve.

Aspect 41. The enclosure of Aspect 38, wherein the ratchet arrangement includes first ratchet teeth carried with the linear drive component and second ratchet teeth carried with the rotational drive component, wherein the second ratchet teeth are positioned radially outside the first ratchet teeth, wherein the second ratchet teeth include resilient ratchet cantilevers that flex to allow each of the second ratchet teeth to move between an inward radial position and an outward radial position, and wherein the resilient ratchet cantilevers bias the second ratchet teeth toward the inward radial positions.

Aspect 42. The enclosure of Aspect 41, wherein the first and second ratchet teeth have locking engagement surfaces configured such that when the rotational drive component is rotated in the second rotational direction the first and second ratchet teeth engage each other in a manner that does not encourage the second ratchet teeth to ride over the first ratchet teeth regardless of whether the ratchet arrangement is in the first or second torque-transfer mode such that torque for rotating the linear drive component in the second rotational direction is transferrable from rotational drive component to the linear drive component regardless of whether the ratchet arrangement is in the first or second torque-transfer mode, wherein the first and second ratchet teeth have ramp engagement surfaces configured such that when the rotational drive component is rotated in the first rotational direction the first and second ratchet teeth engage each other in a manner that encourages the second ratchet teeth to ride over the first ratchet teeth regardless of whether the ratchet arrangement is in the first or second torque-transfer mode, wherein when the rotational drive component is rotated in the first rotational direction while the ratchet arrangement is in the first torque-transfer mode radial constraint provided by the first portion of the sleeve prevents the second ratchet teeth from moving from the inward radial position to the outward radial position to ride over the first ratchet teeth such that torque for rotating the linear drive component in the first rotational direction is transferrable from rotational drive component to the linear drive component through the ratchet arrangement, and wherein when the rotational drive component is rotated in the first rotational direction while the ratchet arrangement is in the second torque-transfer mode radial clearance provided by the second portion of the sleeve allows the second ratchet teeth to move from the inward radial position to the outward radial position to ride over the first ratchet teeth such that torque for rotating the linear drive component in the first rotational direction is not transferrable from rotational drive component to the linear drive component through the ratchet arrangement.

Aspect 43. The enclosure of Aspect 41, wherein in the first torque-transfer mode the second ratchet teeth each remain in the inward radial position when the rotational drive component is rotated in the second rotational direction such that engagement between the first and second ratchet teeth transfers torque from the rotational drive component to the linear drive component to drive the linear drive component in the second rotational direction, wherein in the second torque-transfer mode the second ratchet teeth each remain in the inward radial position when the rotational drive component is rotated in the second rotational direction such that engagement between the first and second ratchet teeth transfers torque from the rotational drive component to the linear drive component to drive the linear drive component in the second rotational direction, wherein in the first torque-transfer mode radial constraint provided by the first portion of the sleeve prevents the second ratchet teeth from moving to the outward radial position when the rotational drive component is rotated in the first rotational direction such that engagement between the first and second ratchet teeth transfers torque from the rotational drive component to the linear drive component to drive the linear drive component in the first rotational direction, and wherein in the second torque-transfer mode radial clearance provided by the second portion of the sleeve allows the second ratchet teeth to move to the outward radial position when the rotational drive component is rotated in the first rotational direction such that the second ratchet teeth ride over the first ratchet teeth to prevent sufficient torque from being transferred from the rotational drive component to the linear drive component to drive the linear drive component in the first rotational direction.

Aspect 44. The enclosure of Aspect 42, wherein the linear drive component includes constraint cantilevers positioned radially between the ratchet cantilevers and the sleeve.

Aspect 45. The enclosure of Aspect 44, wherein the constraint cantilevers extend in an axial outward direction from base ends to free ends, and wherein the ratchet arrangement changes from the first torque-transfer mode to the second torque-transfer mode when the free ends of the constraint cantilevers move axially inwardly past the radial step of the sleeve.

Aspect 46. The enclosure of Aspect 45, wherein the ratchet cantilevers extend in an axial inward direction from base ends to free ends.

Aspect 47. The enclosure of Aspect 32, wherein the rotational drive component is a handle.

Aspect 48. The enclosure of Aspect 47, wherein the handle includes a first handle portion defining a ratchet feature of the ratchet arrangement, the first handle portion also including an axially outer end defining a first torque-transfer feature, the handle also including a second handle portion including a second torque-transfer feature that mates in torque-transmitting relation with respect to the first torque-transfer feature, the second handle portion being detachably secured to the first handle portion by a threaded fastener that threadingly engages the first handle portion and that extends axially through the second handle portion, wherein the second handle portion can be detached from the first handle portion by unthreading the threaded fastener from the first handle portion.

Aspect 49. The enclosure of Aspect 48, wherein the first torque-transfer feature is a male feature and the second torque transfer feature is a female feature.

Aspect 50. The enclosure of Aspect 48, wherein the rachet feature includes ratchet cantilevers for engaging ratchet teeth of the linear drive component.

Aspect 51. The enclosure of Aspect 48, wherein the second handle portion as a length that extends axially between a first end and a second end, wherein the second handle portion includes a hollow handle shaft that extends between the first and second ends, wherein the second torque-transfer feature is defined at the first end of the second handle portion, wherein the second handle portion includes an enlarged gripping portion at the second end of the second handle portion, wherein the enlarged gripping portion has an enlarged outer cross-dimension as compared to the hollow handle shaft, wherein the hollow handle shaft co-axially aligns with the actuator shaft when the second handle portion is secured to the first handle portion by the threaded fastener, and wherein the threaded fastener extends axially through the hollow handle shaft.

Aspect 52. The enclosure of Aspect 51, wherein the hollow handle shaft and the enlarged gripping portion cooperate to define a T-shaped outer profile.

Aspect 53. The enclosure of Aspect 51, wherein the enlarged gripping portion defines a pocket co-axially aligned with the hollow handle shaft, wherein a sleeve positioned within the pocket and can be rotated within the pocket relative to the enlarged gripping portion, wherein a head of the threaded fastener is contained in torque transmitting relation within an interior of the sleeve such that torque for turning the threaded fastener can be applied through the sleeve, and wherein the sleeve has an outer end portion that extends axially outwardly beyond the enlarged gripping portion.

Aspect 54. An enclosure comprising:

a housing defining an opening into an interior of the housing;

a cable sealing unit that mounts within the opening for sealing about one or more cables desired to be routed into the interior of the housing through the opening, the cable sealing unit including:

a) an actuator shaft that includes exterior threads, the actuator shaft defining a shaft axis that extends through the opening into the interior of the housing when the cable sealing unit is mounted within the opening;

b) inner and outer sealant pressurization frames; and c) a sealing module that mounts at a mounting location between the inner and outer pressurization frames, the sealing module including a volume of sealant contained between inner and outer sealant containment walls of the sealing module, the sealing module including a latch structure for latching the sealing module within the mounting location, the latch structure having an elongate beam construction that is connected to the inner or outer sealant containment wall by a centrally located connection location located at a mid-region of the elongate beam construction, the elongate beam construction including a pair of resilient cantilever latches that project in opposite directions from the centrally located connection location, the resilient cantilever latches having free end portions including latch surfaces that oppose catch surfaces of the inner or outer pressurization frame to retain the sealing module in the mounting location.

Aspect 55. The enclosure of Aspect 54, wherein the sealing module has a length that extends between opposite ends of the sealing module, and wherein the elongate beam construction has a length that extends along at least 75 percent of the length of the sealing module such that the free end portions of the resilient cantilever latches terminate adjacent each end of the sealing module.

Aspect 56. The enclosure of Aspect 55, wherein the sealing module includes two of the latch structures, wherein one of the latch structures is an inner latch structure integrated with the inner sealant containment wall and another of the latch structures is an outer latch structure integrated with the outer sealant containment wall, and wherein the inner latch structure include inner resilient cantilever latches and the outer latch structure includes outer resilient cantilever latches.

Aspect 57. The enclosure of Aspect 56, wherein the inner and outer resilient cantilever latches at one of the ends of the sealing module can be unlatched from the inner and outer pressurization frames by flexing the inner and outer resilient cantilever latches away from each other, and wherein the inner and outer resilient cantilever latches at the end of the sealing module can be unlatched from the inner and outer pressurization frames by flexing the inner and outer resilient cantilever latches toward each other.

Aspect 58. A cable sealing module adapted to be mounted at a mounting location of a sealing unit, the cable sealing module comprising:

a volume of sealant contained between inner and outer sealant containment walls of the sealing module, the sealing module including a latch structure for latching the sealing module within the mounting location, the latch structure having an elongate beam construction that is connected to the inner or outer sealant containment wall by a centrally located connection location located at a mid-region of the elongate beam construction, the elongate beam construction including a pair of resilient cantilever latches that project in opposite directions from the centrally located connection location, the resilient cantilever latches having free end portions including latch surfaces adapted to oppose catch surfaces at the mounting location to retain the sealing module in the mounting location.

Aspect 59. The cable sealing module of Aspect 58, wherein the sealing module has a length that extends between opposite ends of the sealing module, and wherein the elongate beam construction has a length that extends along at least 75 percent of the length of the sealing module such that the free end portions of the resilient cantilever latches terminate adjacent each end of the sealing module.

Aspect 60. The cable sealing module of Aspect 59, wherein the sealing module includes two of the latch structures, wherein one of the latch structures is an inner latch structure integrated with the inner sealant containment wall and another of the latch structures is an outer latch structure integrated with the outer sealant containment wall, and wherein the inner latch structure include inner resilient cantilever latches and the outer latch structure includes outer resilient cantilever latches.

Aspect 61. An enclosure comprising:
- a dome including a dome body that extends between an open end and a closed end;
- a cable sealing unit that mounts within the open end of the dome body, the cable sealing unit including:
  - a) inner and outer sealant pressurization members;
  - b) sealant adapted to be pressurized between the inner and outer pressurization members for providing cable sealing for also providing sealing with an interior surface of the dome body;
  - d) an actuator for moving at least one of the first and second pressurization members to pressurize the sealant; and
  - e) a base for retaining the cable sealing unit in the dome body, the base including a dome seating arrangement for supporting the open end of the dome body, the base including a fastening arrangement for securing the base to the open end of the dome such that the base is axially fixed relative to the dome body:
- wherein the inner and outer pressurization members, when in a state in which the sealant is pressurized, are free to move axially relative to the base and the dome body in response to relative pressure changes between the inside and the outside of the enclosure.

Aspect 62. The enclosure of Aspect 61, wherein a range of axial movement of the inner and outer pressurization members relative to the base and the dome body is defined by a stop within the dome body and a stop corresponding to the base.

Aspect 63. The enclosure of Aspect 61, wherein the inner pressurization member is coupled to an interior frame including cable anchoring locations at which cables routed though the cable sealing unit into the dome body are anchored, wherein the interior frame is configured to move together with the inner and outer pressurization members relative to the dome body and the base in response to relative pressure changes between the inside and the outside of the enclosure.

Aspect 64. The enclosure of Aspect 63, wherein the actuator moves together with the inner and outer pressurization members relative to the dome body and the base in response to relative pressure changes between the inside and the outside of the enclosure.

Aspect 65. An enclosure comprising:
- a dome including a dome body that extends between an open end and a closed end;
- a cable sealing unit that mounts within the open end of the dome body, the cable sealing unit including:
  - a) inner and outer sealant pressurization members;
  - b) sealant adapted to be pressurized between the inner and outer pressurization members for providing cable sealing for also providing sealing with an interior surface of the dome body;
  - d) an actuator for moving at least one of the first and second pressurization members to pressurize the sealant; and
  - e) a base for retaining the cable sealing unit in the dome body, wherein a fastening arrangement is used for securing the base to the open end of the dome such that the base is axially fixed relative to the dome body.

Aspect 66. The enclosure of Aspect 65, wherein the inner pressurization member is not axially fixed relative to the base and the dome.

Aspect 67. The enclosure of Aspect 66, wherein the outer pressurization member is not axially fixed relative to the base and the dome.

Aspect 68. The enclosure of any of Aspects 65-67, wherein the inner and outer pressurization members are captured within the dome between the base and at least one stop within the dome, and wherein a first axial spacing between the base and the at least one stop is less than a second axial spacing between inner and outer stop contact surfaces of the inner and outer pressurization members when the inner and outer pressurization members are in a state in which the sealant is pressurized within the dome.

Aspect 69. The enclosure of Aspect 68, wherein the first axial spacing is at least 1 mm, or 2 mm, or 3 mm, or 4 mm, or 5 mm or 10 mm less than the second axial spacing.

Aspect 70. The enclosure of any of Aspects 65-69, wherein the inner and outer pressurization members, when in a state in which the sealant is pressurized within the dome, are free to move together axially relative to the base and the dome body in response to relative pressure changes between the inside and the outside of the enclosure.

Aspect 71. The enclosure of Aspect 70, wherein the inner and outer pressurization members can float together relative to the base and the dome at least 1 mm, 2 mm, 3 mm, 4 mm, 5 mm or 10 mm.

Aspect 72. The enclosure of any of Aspects 65-71, wherein the sealant does not make sealing contact with the base.

Aspect 73. The enclosure of any of Aspects 65-72, further comprising an inner cable anchoring structure positioned within the enclosure that is connected to the inner pressurization member so as to be axially moveable with the inner pressurization member.

Aspect 74. The enclosure of any of Aspects 65-73, further comprising an outer cable anchoring structure positioned outside the enclosure that is connected to the inner pressurization member so as to be axially moveable with the inner pressurization member.

Aspect 75. The enclosure of Aspect 73 or 74, wherein the first and/or second cable anchoring structures include cable tie locations or cable clamping locations.

Aspect 76. The enclosure of any of Aspects 73-75, wherein the first and/or second cable anchoring structures include cable anchoring plates or cable anchoring frames.

Aspect 77. The enclosure of any of Aspects 73-76, wherein cables can be anchored at the cable anchoring structures by straps, clamps, blades, or ties.

Aspect 78. The enclosure of any of Aspects 65-77, wherein the inner pressurization member is connected to and axially moveable with a frame supporting trays within the dome.

Aspect 79. An enclosure comprising:

a housing defining an opening into an interior of the housing;

a cable sealing unit that mounts within the opening for sealing about one or more cables desired to be routed into the interior of the housing through the opening, the cable sealing unit including:

a first line of cable sealing modules;

a second line of cable sealing modules arranged parallel to the first line of cable sealing modules;

intermediate sealing modules positioned between the first and second lines of cable sealing modules.

Aspect 80. The enclosure of Aspect 79, wherein sealant of the intermediate sealing modules seals against radially inwardly facing sides of sealant of the cable sealing modules of the first and second lines of cable sealing modules.

Aspect 81. The enclosure of Aspect 78 or 79, wherein the cable sealing modules have a wrap-around configuration and the intermediate sealing modules push-through, non-wrap-around configuration.

Aspect 82. The enclosure of any of Aspects 78-81, further comprising an electrical grounding member that extends through and is sealed by one of the intermediate sealing modules.

Aspect 83. The enclosure of Aspect 82, wherein the electrical grounding member includes a main leg that extends through the intermediate sealing module, a secondary leg angled relative to the main leg, a furcation member connected to the secondary member at a location offset from the main leg by the secondary leg, and grounding termination bars that project from ends of the furcation member.

Aspect 84. The enclosure of Aspect 83, wherein the grounding termination bars are parallel to one another and parallel to the main leg.

Aspect 85. The enclosure of Aspect 84, wherein the secondary leg is perpendicular to the main leg and the grounding termination bars project from the furcation member in a same direction that the main leg projects from the secondary leg.

Aspect 86. An electrical grounding member for use in a telecommunication enclosure, the electrical grounding member comprising:

a main leg;

a secondary leg angled relative to the main leg;

a furcation member connected to the secondary member at a location offset from the main leg by the secondary leg; and grounding termination bars that project from ends of the furcation member.

Aspect 87. The electrical grounding member of Aspect 86, wherein the grounding termination bars are parallel to one another and parallel to the main leg.

Aspect 88. The electrical grounding member of Aspect 87, wherein the secondary leg is perpendicular to the main leg and the grounding termination bars project from the furcation member in a same direction that the main leg projects from the secondary leg.

What is claimed is:

1. An enclosure comprising:

a housing defining an opening into an interior of the housing;

a cable sealing unit that mounts within the opening for sealing about one or more cables desired to be routed into the interior of the housing through the opening, the cable sealing unit including:

a) an actuator shaft that includes exterior threads, the actuator shaft defining a shaft axis that extends through the opening into the interior of the housing when the cable sealing unit is mounted within the opening;

b) inner and outer sealant pressurization members;

c) sealant adapted to be pressurized between the inner and outer pressurization members; and d) a drive arrangement including a linear drive component mounted on the actuator shaft, the linear drive component including a drive nut including interior threads that mate with the exterior threads of the actuator shaft, the drive arrangement including a torque input structure for allowing torque to be applied to the linear drive component for rotating the linear drive component about the actuator shaft, the drive arrangement being operable in a first state in which rotation of the torque input structure in a first rotational direction about the shaft axis drives the linear drive component axially in a sealant pressurization direction along the shaft axis and rotation of the torque input structure in a second rotational direction about the shaft axis drives the linear drive component axially in a sealant de-pressurization direction along the shaft axis, the drive arrangement also being operable in a second state in which rotation of the torque input structure in the first rotational direction about the shaft axis does not drive the linear drive component axially in a sealant pressurization direction along the shaft axis and rotation of the torque input structure in the second rotational direction about the shaft axis does drive the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis.

2. The enclosure of claim 1, wherein the torque input structure includes a rotational drive component mounted to be axially carried with the linear drive component as the linear drive component moves axially along the shaft axis; and wherein the drive arrangement includes a ratchet arrangement defined between the rotational drive component and the linear drive component, the ratchet arrangement being operable in a first torque-transfer mode corresponding to the first state and a second torque-transfer mode corresponding to the second state, the ratchet arrangement being configured to allow the rotational drive component to drive the linear drive component in the first and second rotational directions relative to the actuator shaft when in the first torque-transfer mode; and the ratchet arrangement being configured to allow the rotational drive component to drive the linear drive component only in the second rotational direction and not in the first rotational direction relative to the actuator shaft when in the second torque-transfer mode.

3. The enclosure of claim 2, wherein the actuator shaft has an inner end non-rotatably connected to the inner pressurization member, wherein the actuator shaft extends through the outer pressurization member, wherein a spring is mounted on the actuator shaft axially between the linear drive component and the outer pressurization member, and wherein the spring is compressed between the outer pressurization member and the linear drive component when the linear drive component is moved in the sealant pressurization direction thereby causing the actuator shaft to be tensioned and pressurization loading to be applied to the sealant by the inner and outer pressurization members.

4. The enclosure of claim 2, wherein the actuator shaft has an inner end non-rotatably connected to the inner pressurization member, wherein the actuator shaft extends through the outer pressurization member, wherein a spring is mounted on the actuator shaft axially between the linear drive component and the outer pressurization member, and wherein the spring is compressed between the outer pressurization member and the linear drive component when the linear drive component is moved in the sealant pressurization direction thereby causing the actuator shaft to be tensioned and the inner and outer pressurization members be forced together.

5. The enclosure of claim 3, wherein the ratchet arrangement transitions from the first torque-transfer mode to the second torque-transfer mode when the spring reaches a predetermined amount of axial compression.

6. The enclosure of claim 5, further comprising a sleeve positioned around the shaft, the spring, the linear drive component and a portion of the rotational drive component, the sleeve having a first portion for constraining outward radial movement of the ratchet arrangement such that the ratchet arrangement operates in the first torque-transfer mode and a second portion for allowing outward radial movement of the ratchet arrangement such that the ratchet arrangement operates in the second torque-transfer mode, wherein the ratchet arrangement is adapted to move axially relative to the sleeve to transition between the first and second torque-transfer modes, and wherein the first portion of the sleeve is located axially outwardly with respect to the second portion of the sleeve.

7. The enclosure of claim 6, wherein the first portion of the sleeve has a first interior cross-dimension, and the second portion of the sleeve has a second interior cross-dimension, the first interior cross-dimension being smaller than the second interior cross-dimension.

8. The enclosure of claim 7, wherein the sleeve includes an interior radial step where an interior of the sleeve changes from the first cross-dimension to the second cross-dimension.

9. The enclosure of claim 6, wherein an end of the sleeve is biased toward the outer pressurization member by the spring.

10. The enclosure of claim 6, wherein the ratchet arrangement transitions from the first torque-transfer mode to the second torque-transfer mode when the ratchet arrangement reaches an axial position relative to the sleeve in which the ratchet arrangement is no longer constrained by the first portion of the sleeve and is permitted to move radially outwardly by clearance space provided by the second portion of the sleeve.

11. The enclosure of claim 8, wherein the ratchet arrangement includes first ratchet teeth carried with the linear drive component and second ratchet teeth carried with the rotational drive component, wherein the second ratchet teeth are positioned radially outside the first ratchet teeth, wherein the second ratchet teeth include resilient ratchet cantilevers that flex to allow each of the second ratchet teeth to move between an inward radial position and an outward radial position, and wherein the resilient ratchet cantilevers bias the second ratchet teeth toward the inward radial positions.

12. The enclosure of claim 11, wherein the first and second ratchet teeth have locking engagement surfaces configured such that when the rotational drive component is rotated in the second rotational direction the first and second ratchet teeth engage each other in a manner that does not encourage the second ratchet teeth to ride over the first ratchet teeth regardless of whether the ratchet arrangement is in the first or second torque-transfer mode such that torque for rotating the linear drive component in the second rotational direction is transferrable from the rotational drive component to the linear drive component regardless of whether the ratchet arrangement is in the first or second torque-transfer mode, wherein the first and second ratchet teeth have ramp engagement surfaces configured such that when the rotational drive component is rotated in the first rotational direction the first and second ratchet teeth engage each other in a manner that encourages the second ratchet teeth to ride over the first ratchet teeth regardless of whether the ratchet arrangement is in the first or second torque-transfer mode, wherein when the rotational drive component is rotated in the first rotational direction while the ratchet arrangement is in the first torque-transfer mode radial constraint provided by the first portion of the sleeve prevents the second ratchet teeth from moving from the inward radial position to the outward radial position to ride over the first ratchet teeth such that torque for rotating the linear drive component in the first rotational direction is transferrable from the rotational drive component to the linear drive component through the ratchet arrangement, and wherein when the rotational drive component is rotated in the first rotational direction while the ratchet arrangement is in the second torque-transfer mode radial clearance provided by the second portion of the sleeve allows the second ratchet teeth to move from the inward radial position to the outward radial position to ride over the first ratchet teeth such that torque for rotating the linear drive component in the first rotational direction is not transferrable from the rotational drive component to the linear drive component through the ratchet arrangement.

13. The enclosure of claim 11, wherein in the first torque-transfer mode the second ratchet teeth each remain in the inward radial position when the rotational drive component is rotated in the second rotational direction such that engagement between the first and second ratchet teeth transfers torque from the rotational drive component to the linear drive component to drive the linear drive component in the second rotational direction, wherein in the second torque-transfer mode the second ratchet teeth each remain in the inward radial position when the rotational drive component is rotated in the second rotational direction such that engagement between the first and second ratchet teeth transfers torque from the rotational drive component to the linear drive component to drive the linear drive component in the second rotational direction, wherein in the first torque-transfer mode radial constraint provided by the first portion of the sleeve prevents the second ratchet teeth from moving to the outward radial position when the rotational drive component is rotated in the first rotational direction such that engagement between the first and second ratchet teeth transfers torque from the rotational drive component to the linear drive component to drive the linear drive component in the first rotational direction, and wherein in the second torque-transfer mode radial clearance provided by the second portion of the sleeve allows the second ratchet teeth to move to the outward radial position when the rotational drive component is rotated in the first rotational direction such that the second ratchet teeth ride over the first ratchet teeth to prevent sufficient torque from being transferred from the rotational drive component to the linear drive component to drive the linear drive component in the first rotational direction.

14. The enclosure of claim 12, further comprising constraint cantilevers positioned radially between the ratchet cantilevers and the sleeve, the constraint cantilevers being carried with the linear drive component.

15. The enclosure of claim 14, wherein the constraint cantilevers extend in an axial outward direction from base ends to free ends, and wherein the ratchet arrangement changes from the first torque-transfer mode to the second torque-transfer mode when the free ends of the constraint cantilevers move axially inwardly past the radial step of the sleeve.

16. The enclosure of claim 15, wherein the ratchet cantilevers extend in an axial inward direction from base ends to free ends.

17. The enclosure of claim 12, wherein the rotational drive component is a handle.

18. The enclosure of claim 17, wherein the handle includes a first handle portion defining a ratchet feature of the ratchet arrangement, the first handle portion also including an axially outer end defining a first torque-transfer feature, the handle also including a second handle portion including a second torque-transfer feature that mates in torque-transmitting relation with respect to the first torque-transfer feature, the second handle portion being detachably secured to the first handle portion by a threaded fastener that threadingly engages the first handle portion and that extends axially through the second handle portion, wherein the second handle portion can be detached from the first handle portion by unthreading the threaded fastener from the first handle portion.

19. The enclosure of claim 18, wherein the first torque-transfer feature is a male feature and the second torque-transfer feature is a female feature.

20. The enclosure of claim 18, wherein the ratchet feature includes ratchet cantilevers for engaging ratchet teeth of the linear drive component.

21. The enclosure of claim 18, wherein the second handle portion has a length that extends axially between a first end and a second end, wherein the second handle portion includes a hollow handle shaft that extends between the first and second ends, wherein the second torque-transfer feature is defined at the first end of the second handle portion, wherein the second handle portion includes an enlarged gripping portion at the second end of the second handle portion, wherein the enlarged gripping portion has an enlarged outer cross-dimension as compared to the hollow handle shaft, wherein the hollow handle shaft co-axially aligns with the actuator shaft when the second handle portion is secured to the first handle portion by the threaded fastener, and wherein the threaded fastener extends axially through the hollow handle shaft.

22. The enclosure of claim 21, wherein the hollow handle shaft and the enlarged gripping portion cooperate to define a T-shaped outer profile.

23. The enclosure of claim 21, wherein the enlarged gripping portion defines a pocket co-axially aligned with the hollow handle shaft, wherein a sleeve is positioned within the pocket and can be rotated within the pocket relative to the enlarged gripping portion, wherein a head of the threaded fastener is contained in torque-transmitting relation within an interior of the sleeve such that torque for turning the threaded fastener can be applied through the sleeve, and wherein the sleeve has an outer end portion that extends axially outwardly beyond the enlarged gripping portion.

24. The enclosure of claim 12, wherein the ratchet cantilevers extend in a circumferential direction from base ends to free ends.

25. The enclosure of claim 24, wherein the ratchet cantilevers directly engage the sleeve.

26. The enclosure of claim 2, wherein the actuator shaft has an inner end non-rotatably connected to the inner pressurization member, wherein the actuator shaft extends through the outer pressurization member, wherein springs are mounted axially between the linear drive component and the outer pressurization member at locations offset from the actuator shaft, and wherein the springs are compressed between the outer pressurization member and the linear drive component when the linear drive component is moved in the sealant pressurization direction thereby causing the actuator shaft to be tensioned and pressurization loading to be applied to the sealant by the inner and outer pressurization members.

27. An enclosure comprising:

a housing defining an opening into an interior of the housing;

a cable sealing unit that mounts within the opening for sealing about one or more cables desired to be routed into the interior of the housing through the opening, the cable sealing unit including:

a) an actuator shaft that includes exterior threads, the actuator shaft defining a shaft axis that extends through the opening into the interior of the housing when the cable sealing unit is mounted within the opening;

b) inner and outer sealant pressurization members;

c) sealant adapted to be pressurized between the inner and outer pressurization members;

d) a linear drive component mounted on the actuator shaft, the linear drive component including a drive nut including interior threads that mate with the exterior threads of the actuator shaft, wherein rotation of the linear drive component in a first rotational direction about the actuator shaft drives the linear drive component axially in a sealant pressurization direction along the shaft axis, and wherein rotation of the linear drive component in a second rotational direction about the actuator shaft drives the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis;

e) a handle mounted to be axially carried with the linear drive component as the linear drive component moves axially along the shaft axis; and f) a ratchet arrangement defined between the handle and the linear drive component, the ratchet arrangement being operable in a first torque-transfer mode and a second torque-transfer mode, the ratchet arrangement being configured to allow the handle to drive the linear drive component in the first and second rotational directions relative to the actuator shaft when in the first torque-transfer mode; and the ratchet arrangement being configured to allow the handle to drive the linear drive component only in the second rotational direction and not in the first rotational direction relative to the actuator shaft when in the second torque-transfer mode.

28. An enclosure comprising:

a housing defining an opening into an interior of the housing;

a cable sealing unit that mounts within the opening for sealing about one or more cables desired to be routed into the interior of the housing through the opening, the cable sealing unit including:

a) an actuator shaft that includes exterior threads, the actuator shaft defining a shaft axis that extends through the opening into the interior of the housing when the cable sealing unit is mounted within the opening;

b) inner and outer sealant pressurization members;

c) sealant adapted to be pressurized between the inner and outer pressurization members;

d) a linear drive component mounted on the actuator shaft such that rotation of the linear drive component in a first rotational direction about the actuator shaft drives the linear drive component axially in a sealant pressurization direction along the shaft axis, and rotation of the linear drive component in a second rotational direction about the actuator shaft drives the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis; and e) a handle for driving rotation of the linear drive component, the handle including a first handle portion including an axially inner end for transferring torque to the linear drive component, the first handle portion also including an axially outer end defining a first torque-transfer feature, the handle also including a second handle portion including a second torque-transfer feature that mates in torque-transmitting relation with respect to the first torque-transfer feature, the second handle portion being detachably secured to the first handle portion by a threaded fastener that threadingly engages the first handle portion and that extends axially through the second handle portion, wherein the second handle portion can be detached from the first handle portion by unthreading the threaded fastener from the first handle portion.

29. An enclosure comprising:

a housing defining an opening into an interior of the housing;

a cable sealing unit that mounts within the opening for sealing about one or more cables desired to be routed into the interior of the housing through the opening, the cable sealing unit including:

a) an actuator shaft that includes exterior threads, the actuator shaft defining a shaft axis that extends through the opening into the interior of the housing when the cable sealing unit is mounted within the opening;

b) inner and outer sealant pressurization members;

c) sealant adapted to be pressurized between the inner and outer pressurization members;

d) a linear drive component mounted on the actuator shaft, the linear drive component including a drive nut including interior threads that mate with the exterior threads of the actuator shaft, wherein rotation of the linear drive component in a first rotational direction about the actuator shaft drives the linear drive component axially in a sealant pressurization direction along the shaft axis, and wherein rotation of the linear drive component in a second rotational direction about the actuator shaft drives the linear drive component axially in a sealant de-pressurization direction along the shaft axis, wherein the sealant is pressurized between the inner and outer sealant pressurization members when the linear drive component is driven in the sealant pressurization direction along the shaft axis, and wherein the sealant between the inner and outer sealant pressurization members is de-pressurized when the linear drive component is driven in the sealant de-pressurization direction along the shaft axis;

e) a rotational drive component mounted to be axially carried with the linear drive component as the linear drive component moves axially along the shaft axis; and f) a ratchet arrangement defined between the rotational drive component and the linear drive component, the ratchet arrangement being operable in a first torque-transfer mode and a second torque-transfer mode, the ratchet arrangement being configured to allow the rotational drive component to drive the linear drive component in the first and second rotational directions relative to the actuator shaft when in the first torque-transfer mode; and the ratchet arrangement being configured to allow the rotational drive component to drive the linear drive component only in the second rotational direction and not in the first rotational direction relative to the actuator shaft when in the second torque-transfer mode.

* * * * *